(12) United States Patent
Funada et al.

(10) Patent No.: US 6,192,152 B1
(45) Date of Patent: Feb. 20, 2001

(54) IMAGE PROCESSING APPARATUS

(75) Inventors: Masahiro Funada; Michio Kawase; Shinobu Arimoto, all of Yokohama (JP)

(73) Assignee: Canon Kabushiki Kaisha, Tokyo (JP)

(*) Notice: Under 35 U.S.C. 154(b), the term of this patent shall be extended for 0 days.

(21) Appl. No.: 08/064,790

(22) Filed: May 21, 1993

Related U.S. Application Data

(63) Continuation-in-part of application No. 07/561,097, filed on Aug. 1, 1990.

(30) Foreign Application Priority Data

Aug. 2, 1989 (JP) .................................... 1-199369
Aug. 2, 1989 (JP) .................................... 1-199370

(51) Int. Cl.[7] .................................................. G06K 9/48
(52) U.S. Cl. ................ 382/199; 382/263; 382/264; 382/266; 382/269; 358/455; 358/466
(58) Field of Search .................. 358/445, 462, 358/463, 406, 455, 466; 382/199, 263, 264, 266–269

(56) References Cited

U.S. PATENT DOCUMENTS

| | | | |
|---|---|---|---|
| 4,314,281 | * 2/1982 | Wiggins et al. | 358/406 |
| 4,318,134 | * 3/1982 | Partridge et al. | 358/486 |
| 4,433,346 | * 2/1984 | Stoffel et al. | 358/462 |
| 4,447,830 | * 5/1984 | Stoffel | 358/486 |
| 4,499,493 | * 2/1985 | Nishimura | 358/463 |
| 4,503,556 | * 3/1985 | Scherl et al. | 358/462 |
| 4,686,579 | * 8/1987 | Sakamoto | 358/282 |
| 4,701,807 | 10/1987 | Ogino | 358/284 |
| 4,707,745 | 11/1987 | Sakano | 358/283 |
| 4,723,129 | 2/1988 | Endo et al. | 346/1.1 |
| 4,723,173 | 2/1988 | Tanioka | 358/282 |
| 4,729,035 | 3/1988 | Tanioka | 358/282 |
| 4,740,796 | 4/1988 | Endo et al. | 346/1.1 |
| 4,821,334 | 4/1989 | Ogino et al. | 382/50 |
| 4,903,145 | * 2/1990 | Funada | 358/462 |
| 4,905,294 | 2/1990 | Sugiura et al. | 382/9 |
| 4,907,283 | * 3/1990 | Tanaka et al. | 382/9 |
| 4,926,268 | * 5/1990 | Horie et al. | 358/458 |
| 4,953,013 | * 8/1990 | Tsuji et al. | 358/462 |
| 4,953,114 | * 8/1990 | Sato | 382/50 |
| 5,001,576 | * 3/1991 | Tanaka et al. | 358/462 |
| 5,014,124 | * 5/1991 | Fujisawa | 358/462 |
| 5,018,024 | * 5/1991 | Tanioka | 358/462 |
| 5,029,227 | * 7/1991 | Kawamura | 382/54 |
| 5,113,252 | * 5/1992 | Horie et al. | 358/451 |
| 5,119,185 | * 6/1992 | Ikeda et al. | 358/500 |
| 5,157,741 | * 10/1992 | Katayama | 358/462 |
| 5,177,795 | * 1/1993 | Tanioka et al. | 358/450 |
| 5,229,868 | * 7/1993 | Kanno et al. | 358/462 |
| 5,239,383 | * 8/1993 | Ikeda et al. | 358/300 |
| 5,267,330 | * 11/1993 | Masuda | 358/457 |
| 5,301,039 | * 4/1994 | Tanioka | 358/457 |
| 5,321,523 | * 6/1994 | Hashimoto | 358/455 |
| 5,572,606 | * 11/1996 | Tanioka | 382/270 |

FOREIGN PATENT DOCUMENTS

| | | |
|---|---|---|
| 3434732 | 4/1985 | (DE) . |
| 63-82058 | 4/1988 | (JP) . |
| 63-263974 | 10/1988 | (JP) . |
| 1-229635 | 9/1989 | (JP) . |
| 8904575 | 5/1989 | (WO) . |

* cited by examiner

*Primary Examiner*—Madeleine Nguyen
(74) *Attorney, Agent, or Firm*—Fitzpatrick, Cella, Harper & Scinto

(57) ABSTRACT

An image processing apparatus includes a first detection unit for detecting an edge of an input image on the basis of an input image signal, a second detection unit for detecting a screen portion of the input image on the basis of the input image signal, a processing unit for executing processing of the input image signal according to detection results of the first and second detection units, and a setting unit for setting detection modes of the first and second detection units.

18 Claims, 50 Drawing Sheets

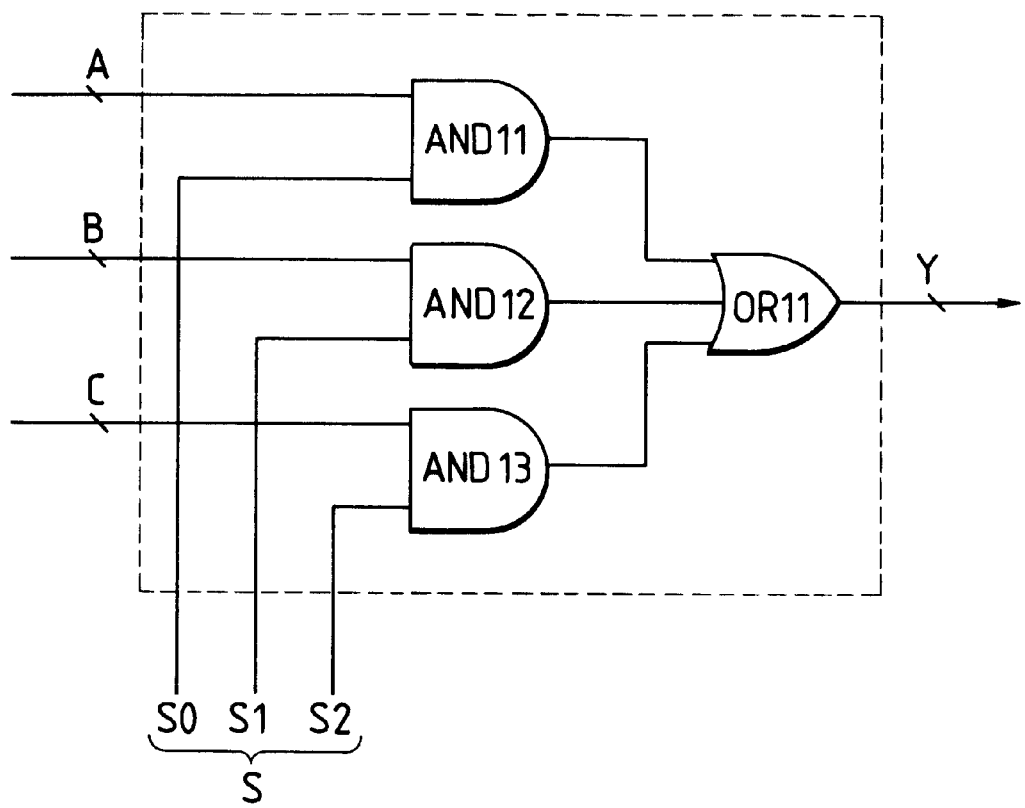

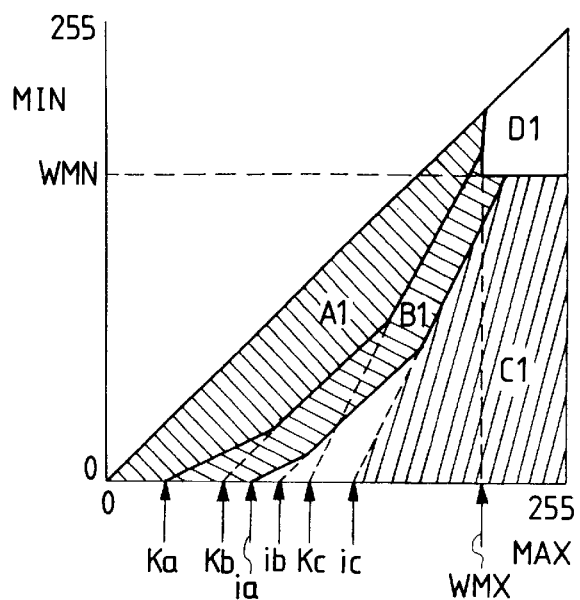
FIG. 15
FIG. 16
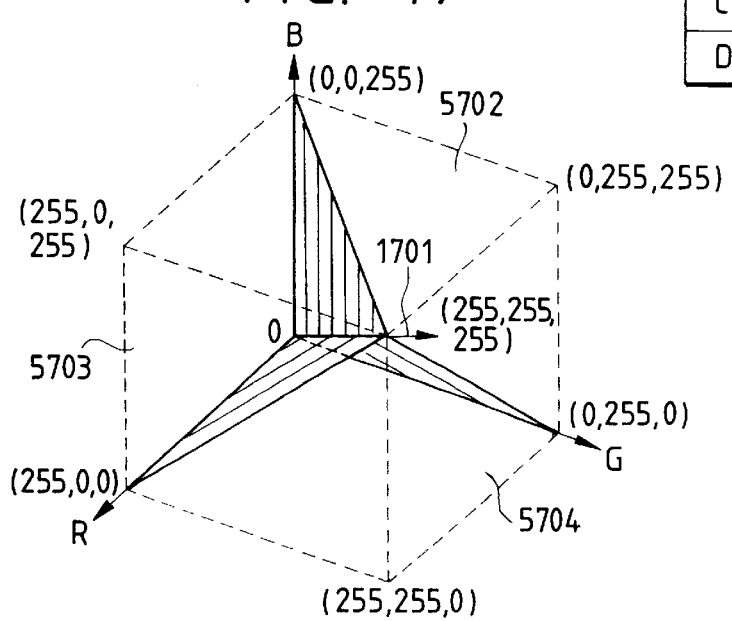
FIG. 17

FIG. 25

| KIND OF MODE | FEATURE | MODE SW SIGNAL | |
| --- | --- | --- | --- |
| | | MOD0 | MOD1 |
| CHARACTER MODE | CHARACTER IS CLEARLY COPIED | 0 | 1 |
| PHOTOGRAPH MODE | PHOTOGRAPH (INCLUDING SCREEN) IS REARISTICALLY COPIED | 1 | 0 |
| CHARACTER/ PHOTOGRAPH MODE | ORIGINAL OF CHARACTER/ PHOTOGRAPH (INCLUDING SCREEN) IS COPIED | 1 | 1 |
| MAP MODE | CHARACTER IN SCREEN SUCH AS MAP IS CLEARLY COPIED | 0 | 0 |

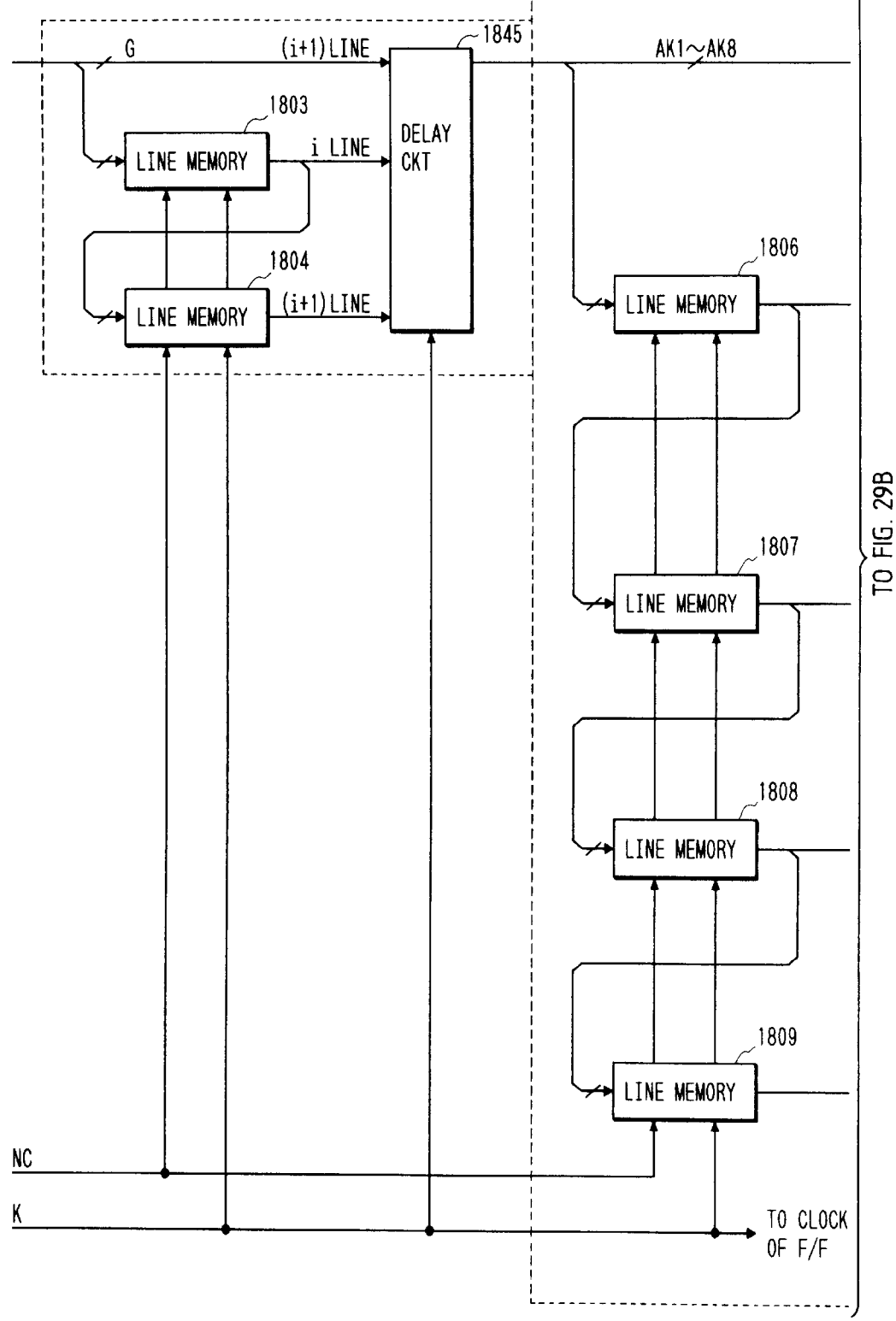

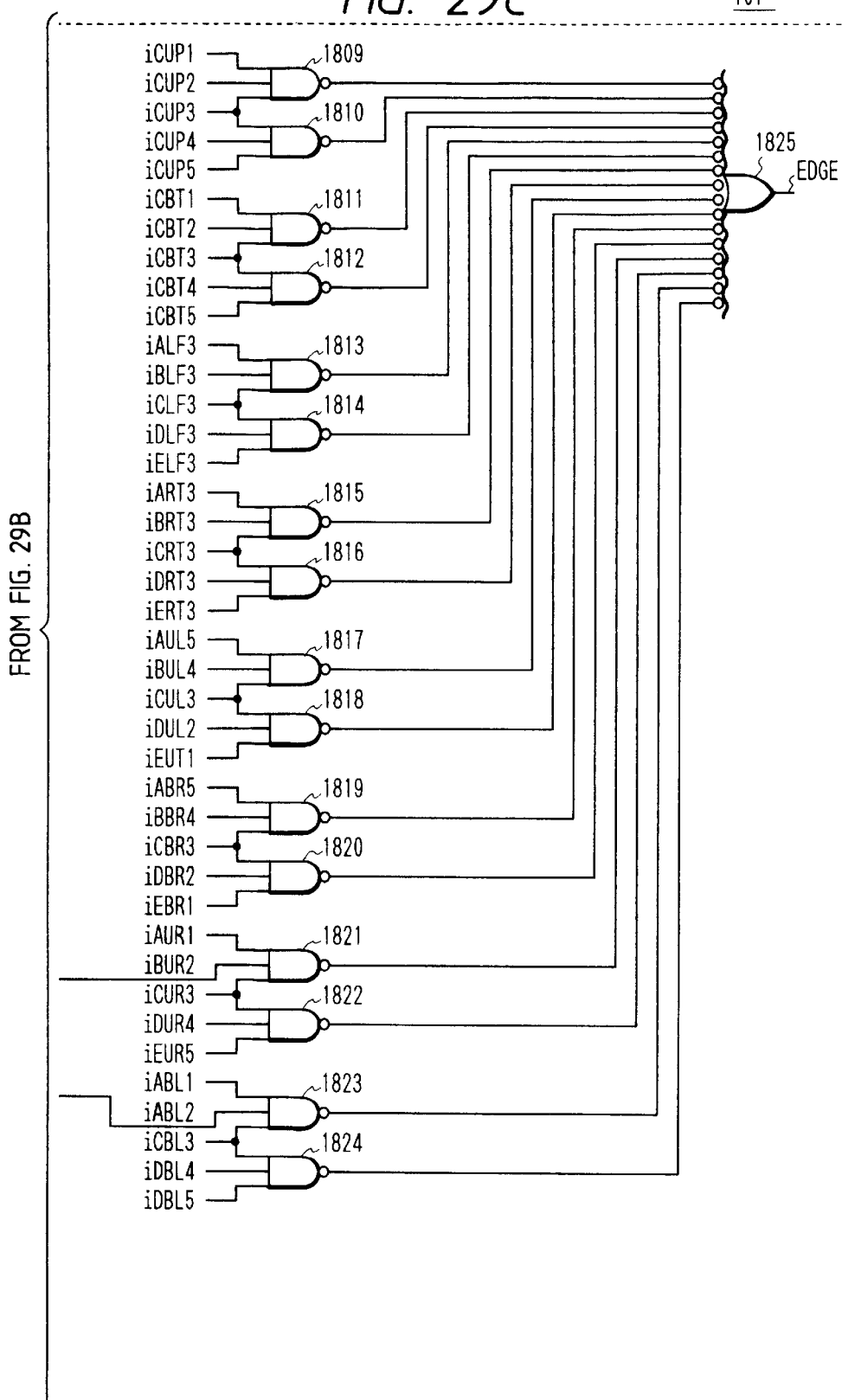

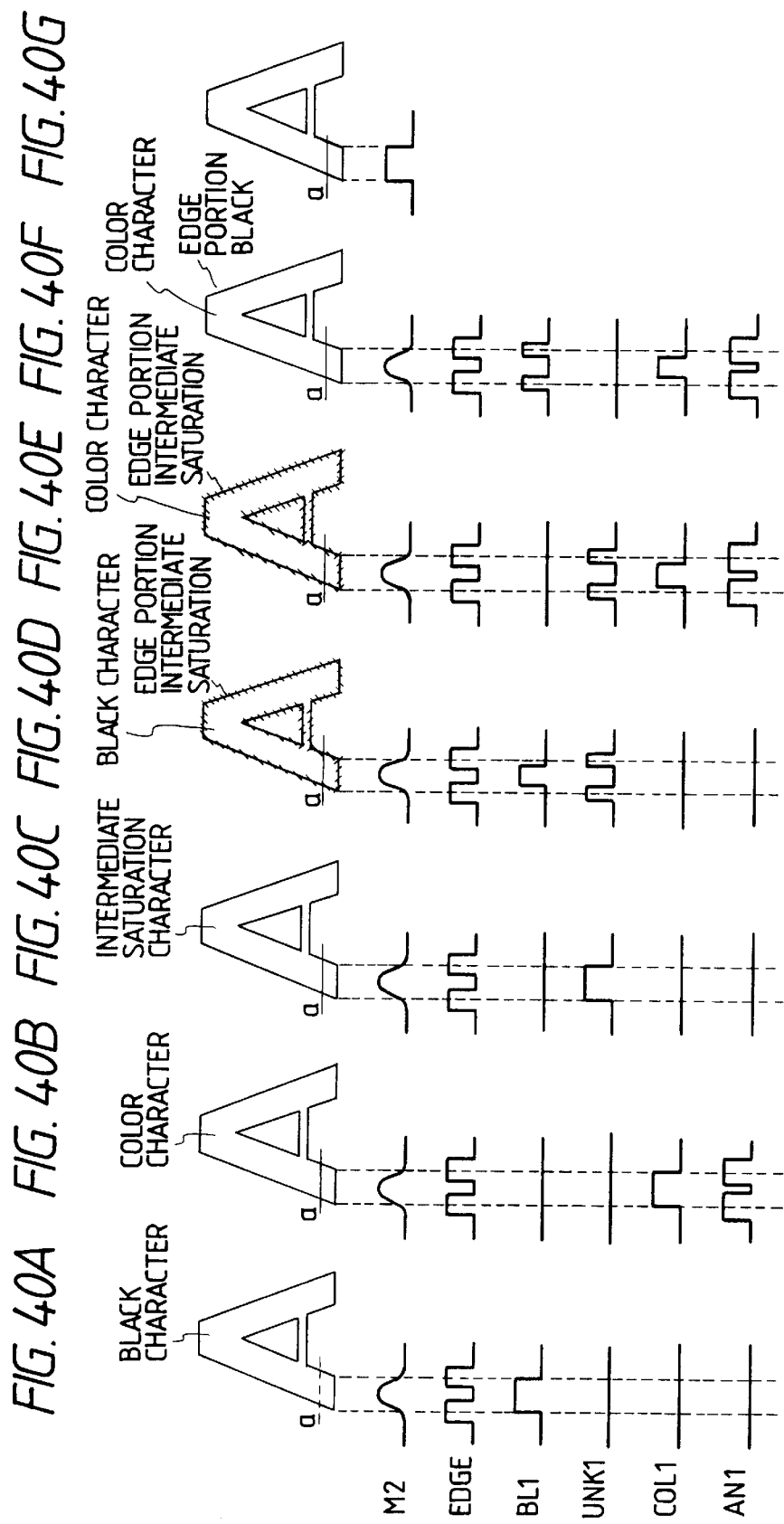

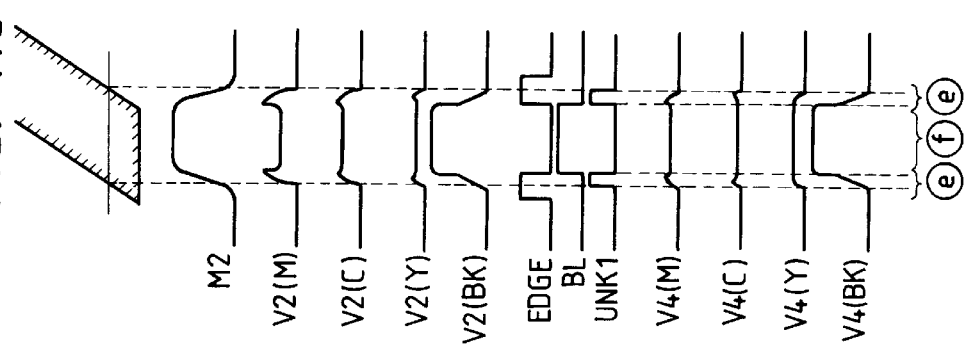
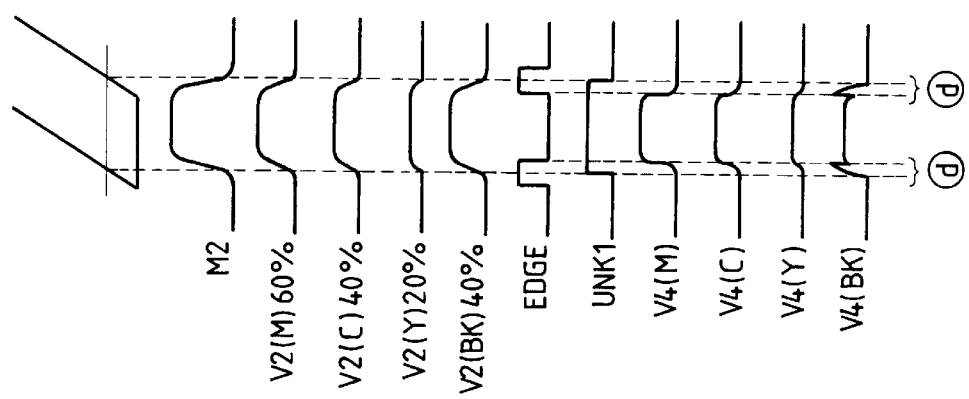
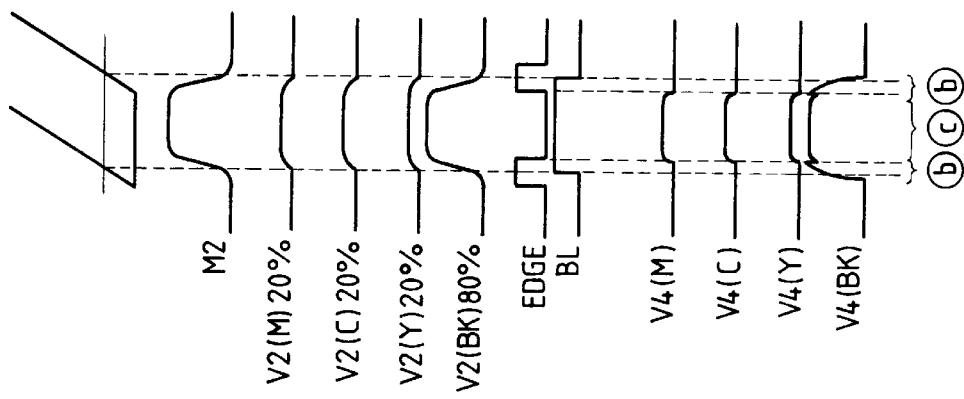

FIG. 42

| | EDGE | BL 1 | UNK 1 | COL 1 | CAN 1 | PHASE = 0, 1, 2 (M, C, Y) V4 | PHASE = 3 (BR) V4 |
|---|---|---|---|---|---|---|---|
| (a) | 1 | 1 | 0 | 0 | 0 | 0 | M2 |
| (b) | 1 | 1 | 0 | 0 | 1 | V2 | V2 |
| (c) | 1 | 0 | 1 | 0 | 0 | V2/2 | $1/2 + 1/2 M2$ |
| (d) | 1 | 0 | 1 | 0 | 1 | V2 | V2 |
| (e) | 1 | 0 | 0 | 1 | x | V2 | V2 |
| (f) | 0 | 1 | 0 | 0 | 0 | 3/4 V2 | $3/4 V2 + 1/4 M2$ |
| (g) | 0 | 1 | 0 | 0 | 1 | V2 | V2 |
| (h) | 0 | 0 | x | x | x | V2 | V2 |

| PHASE | EDGE | BL 1 | UNK 1 | COL 1 | CAN 1 | GAIN 1 | GAIN 2 |
|---|---|---|---|---|---|---|---|
| 0~2 | 1 | 1 | 0 | 0 | 0 | 0 | 0 |
|  | 1 | 1 | 0 | 0 | 1 | 4 | 0 |
|  | 1 | 0 | 1 | 0 | 1 | 2 | 0 |
|  | 1 | 0 | 1 | 0 | 1 | 4 | 0 |
|  | 1 | 0 | 0 | 1 | X | 4 | 0 |
|  | 0 | 1 | 0 | 0 | 0 | 3 | 0 |
|  | 0 | 1 | 0 | 0 | 1 | 4 | 0 |
|  | 0 | 0 | X | X | X | 4 | 0 |
| 3 | 1 | 1 | 0 | 0 | 0 | 0 | 4 |
|  | 1 | 1 | 0 | 0 | 1 | 4 | 0 |
|  | 1 | 0 | 1 | 0 | 0 | 2 | 2 |
|  | 1 | 0 | 1 | 0 | 1 | 4 | 0 |
|  | 1 | 0 | 0 | 1 | X | 4 | 0 |
|  | 0 | 1 | 0 | 0 | 0 | 3 | 1 |
|  | 0 | 1 | 0 | 0 | 1 | 4 | 0 |
|  | 0 | 0 | X | X | X | 4 | 0 |

| | FIL(1) | FIL(0) | FILTER PROC | LOGICAL EXPRESSION |
|---|---|---|---|---|
| (a) | 0 | 1 | LOW-LEVEL EDGE EMPHASIS | {UNK1 ∩ $\overline{CAN1}$} ∪ COL1} ∩ EDGE |
| (b) | 1 | 1 | HIGH-LEVEL EDGE EMPHASIS | BL1 ∩ EDGE ∩ $\overline{CAN1}$ |
| (c) | x | 0 | SMOOTHING | OTHER THAN ABOVE |

| EDGE | BL 1 | UNK 1 | COL 1 | CAN 1 | GAM |
|------|------|-------|-------|-------|-----|
| 1 | 1 | 0 | 0 | 0 | 3 |
| 1 | 1 | 0 | 0 | 1 | 0 |
| 1 | 0 | 1 | 0 | 0 | 2 |
| 1 | 0 | 1 | 0 | 1 | 0 |
| 1 | 0 | 0 | 1 | X | 1 |
| 1 | 0 | 0 | 0 | X | 0 |
| 0 | X | X | X | X | 0 |

IMAGE PROCESSING APPARATUS

This application is a continuation-in-part of application Ser. No. 07/561,097, filed Aug. 1, 1990.

BACKGROUND OF THE INVENTION

1. Field of the Invention

The present invention relates to an image processing apparatus for processing an input image signal and, more particularly, to an image processing apparatus having a function of judging a feature of an input image.

2. Related Background Art

Methods of separating an image into an edge area including a character and a halftone area including a photograph image and executing proper processing for the separated areas are proposed in the following patents or applications by the same assignee as that of the present application.

(1) U.S. Pat. No. 4,701,807
(2) U.S. patent application Ser. No. 456,615 (U.S. Pat. No. 4,953,114)
(3) U.S. patent application Ser. No. 437,310 (U.S. Pat. No. 5,018,024)
(4) U.S. Pat. No. 4,723,173
(5) U.S. patent application Ser. No. 512,494 (U.S. Pat. No. 5,267,330)
(6) U.S. Pat. No. 4,686,579
(7) U.S. Pat. No. 4,729,035
(8) U.S. Pat. No. 4,905,294
(9) U.S. Pat. No. 4,821,334
(10) U.S. patent application Ser. No. 332,384 (U.S. Pat. No. 5,301,039)
(11) U.S. patent application Ser. No. 378,488 (U.S. Pat. No. 5,029,227)
(12) U.S. patent application Ser. No. 325,020 (U.S. Pat. No. 5,572,606)
(13) U.S. patent application Ser. No. 287,627 (U.S. Pat. No. 5,177,795)
(14) U.S. patent application Ser. No. 282,896 (U.S. Pat. No. 4,926,268)
(15) U.S. patent application Ser. No. 519,500 (U.S. Pat. No. 5,113,252)
(16) U.S. patent application Ser. No. 519,448 (U.S. Pat. No. 5,239,383)
(17) U.S. patent application Ser. No. 519,447 (U.S. Pat. No. 5,119,185)

However, there is a room for improvement in the above-mentioned techniques. In particular, in some originals, a halftone area expressed by dots (or screen) is erroneously judged as an edge portion, or a very thin character is erroneously judged as a screen portion. Thus, a portion of image is subjected to undesirable processing by a so-called "judgement error", thus considerably impairing image quality.

Therefore, for example, a judgement error easily occurs in an original such as a map in which characters are mixed in a screen portion, and characters are undesirably blurred.

SUMMARY OF THE INVENTION

It is an object of the present invention to provide an image processing apparatus which can solve the conventional problems.

It is another object of the present invention to provide an image processing apparatus which can execute proper processing according to a feature of an input image.

In order to achieve the above objects, according to the present invention, there is provided an image processing apparatus comprising first detection means for detecting an edge of an input image on the basis of an input image signal, second detection means for detecting a screen portion of the input image on the basis of the input image signal, processing means for executing processing of the input image signal according to the detection results of the first and second detection means, and setting means for setting detection modes of the first and second detection means.

It is still another object of the present invention to provide an image processing apparatus which can reliably grasp a feature of an input image.

In order to achieve the above object, according to the present invention, there is provided an image processing apparatus comprising first detection means for detecting a change in density of an input image signal, second detection means for detecting a change in density in a specific direction of the input image signal, processing means for executing processing of the input image signal on the basis of the detection results of the first and second detection means, and setting means for setting detection modes of the first and second detection means.

It is still another object of the present invention to provide an image processing apparatus which can satisfactorily reproduce an original such as a map in which characters are mixed in a screen portion.

In order to achieve the above object, according to the present invention, there is provided an image processing apparatus comprising detection means for detecting a feature of an input image on the basis of an input image signal, and setting means for setting a detection mode of the detection means, wherein the detection mode includes a map detection mode.

It is still another object of the present invention to provide an image processing apparatus suitable for high-speed processing.

It is still another object of the present invention to provide an image processing apparatus having good color reproducibility.

It is another object of the present invention to provide an image processing apparatus with a simple circuit arrangement.

The above and other objects of the present invention will be apparent from the following description of the embodiments taken in conjunction with the accompanying drawings and the appended claims.

BRIEF DESCRIPTION OF THE DRAWINGS

FIG. 13 is a block diagram for explaining a detailed arrangement of a selector shown in FIG. 10;

FIG. 14 is a table for explaining an operation function of FIG. 13;

FIG. 15 is a chart for explaining pixel color judgement divisions of the image reading apparatus according to the present invention;

FIG. 16 is a table for explaining area divisions and an output signal from the MAX/MIN detector;

FIG. 17 is a chart showing color balance characteristics of a 3-line sensor shown in FIG. 4;

FIG. 25 is a table for explaining kinds of mode of mode signals output from a CPU shown in FIG. 24;

FIGS. 40A to 40G are charts for explaining character judgement signal characteristics output from a feature extraction unit shown in FIG. 7;

FIGS. 41A to 41C are charts showing signal output characteristics of respective units of a color signal processing unit shown in FIG. 7;

FIG. 42 is a view for explaining calculation processing of an adder in the color signal processing unit shown in FIG. 7;

DETAILED DESCRIPTION OF THE PREFERRED EMBODIMENTS

Figure 1:
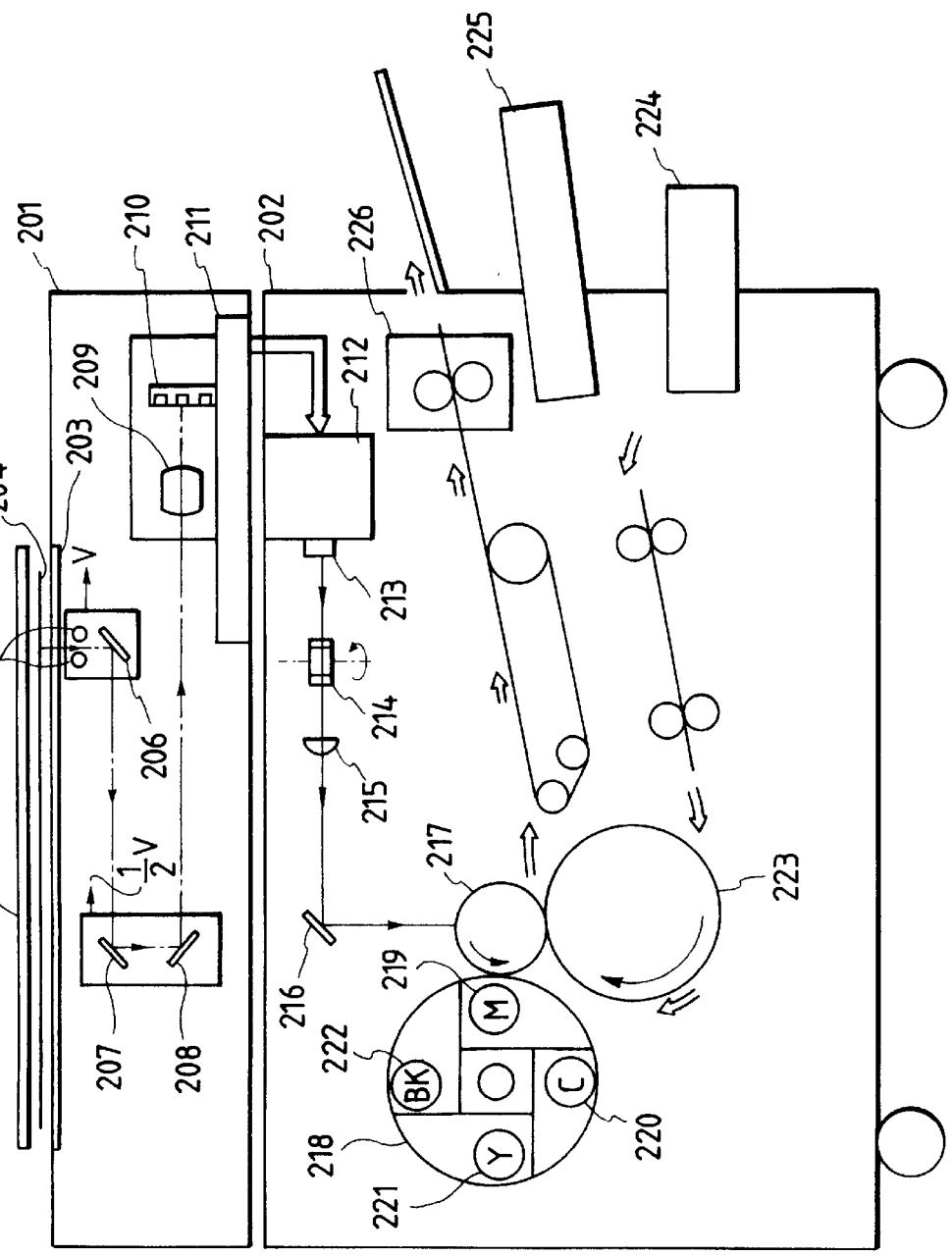
FIG. 1 is a sectional view showing an arrangement of an image reading apparatus according to an embodiment of the present invention.

FIG. 1 is a sectional view of an image reading apparatus according to an embodiment of the present invention, and exemplifies a full-color digital copying machine.

In FIG. 1, an image scanner unit 201 reads an original, and executes digital signal processing. A printer unit 202 prints out an image corresponding to an original image read by the image scanner unit 201 in full colors.

The image scanner unit 201 includes a mirror surface pressing plate 200, an original table glass (to be referred to as a platen hereinafter) 203 on which an original 204 including a simple binary image, a halftone image including a screen (or dot) image, a color image, and the like is placed, a lamp 205 for exposing the original 204 placed on the platen 203, and scanning mirrors 206 to 208 for focusing light reflected through a focusing lens 209 by the original 204 on a 3-line sensor (image scanner unit) 210 comprising, e.g., a charge-coupled device such as a CCD. The 3-line sensor 210 outputs a color analog image signal to a signal processing unit (image processing unit) 211 as full-color data red (R), green (G), and blue (b) components. The scanning mirrors 205 and 206 are mechanically moved at a speed v in a direction perpendicular to an electrical scanning direction of the line sensor, and the scanning mirrors 207 and 208 are mechanically moved in the same direction at a speed v/2, thereby scanning the entire surface of the original.

The signal processing unit (image processing unit) 211 electrically processes the read color analog image signals to separate them into magenta (M), cyan (C), yellow (Y), and black (Bk) components, and sends these components to the printer unit 202. In each original scanning in the image scanner unit 201, one of the M, C, Y, and Bk components is supplied to the printer unit 202, and one print-out is completed by a total of four original scanning operations.

The M, C, Y, and Bk image signals sent from the image scanner unit 201 are sent to a laser driver 212. The laser driver 212 modulates and drives a semiconductor laser 213 according to the image signals. A laser beam scans a photosensitive drum 217 via a polygonal mirror 214, an f-θ lens 215, and a mirror 216.

A rotary developer 218 is constituted by magenta, cyan, yellow, and black developing units 219, 220, 221, and 222. The four developing units are alternately brought into contact with the photosensitive drum 217 to develop an electrostatic latent image formed on the drum 217 with a toner (developing agent).

A paper sheet fed from a paper feed cassette 224 or 225 is wound around a transfer drum 223, and the toner image on the photosensitive drum 217 is transferred to the paper sheet.

In this manner, four color images, i.e., magenta (M), cyan (C), yellow (Y), and black (Bk1) images are sequentially transferred, and the paper sheet is then exhausted through a fixing unit 226.

Figure 2:
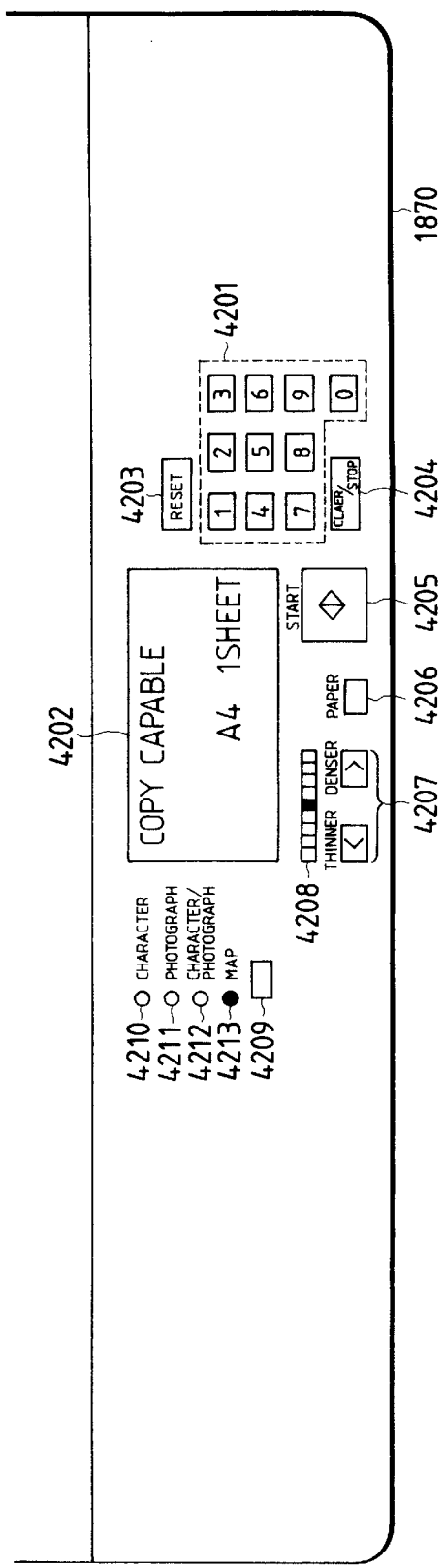
FIG. 2 is a plan view for explaining an arrangement of an operation unit in the image reading apparatus according to the present invention.

FIG. 2 is a plan view for explaining an arrangement of an operation unit in the image reading apparatus according to the present invention. A ten-key pad 4201 is used to input numerical values of 0 to 9 to set, e.g., a copy count.

A liquid crystal display 4202 signals the present system mode state or the like to an operator.

A reset key 4203 is used to initialize the presently set mode.

A clear/stop key 4204 is used to stop processing during a system operation, and is used to clear a numerical value, e.g., a copy count set by the ten-key pad when the system is not in operation. A copy key 4205 is used to start a copy operation.

A paper size selection key 4206 is used to select a paper size. Upon depression of the paper size selection key 4206, a paper size, e.g., "A4" is displayed on the liquid crystal display 4202.

Density keys 4207 are used to adjust a copy density from low level to high level or vice versa. Upon depression of one of the density keys 4207, a set density level is displayed stepwise on a density level indicator 4208 comprising, e.g., LEDs.

An original kind mode selection key 4209 constitutes a mode setting means according to the present invention. This key is depressed to select one of different kinds of modes such as a character mode, a photograph mode, a character/photograph mode, a map mode, and the like depending on a kind of original, and one of mode indicators 4210 to 4213 corresponding to a selected mode is turned on. The illustrated state corresponds to a state wherein the map mode is selected.

Original kind modes will be explained below.

In the character mode, a character original can be clearly copied. This mode is best suitable for, e.g., a character original printed out by a wordprocessor.

The photograph mode attaches an importance on colors and gray scale levels of an original in order to realistically reproduce a photograph (including dots), and is best suitable for a normal color photograph original.

In the character/photograph mode, in an original including both characters and photographs (including dots or screen), characters can be clearly copied, and photographs can be realistically reproduced while separating characters and photographs. For example, this mode is best suitable for newspapers in which both characters and photographs are mixed.

In the map mode, characters in a screen portion such as a map can be clearly expressed. This mode is best suitable for a color print or black-and-white characters, line, symbols, and the like.

For a normal original, the character/photograph mode is selected by the original kind mode selection key 4209 so that a photograph portion can be realistically copied, and a character portion can be clearly copied.

However, when the character/photograph mode is selected for an original including, e.g., fine and complicated characters, character edges are difficult to be detected, and are recognized as a portion of a photograph (screen). In some cases, such an original image cannot be clearly reproduced.

When a photograph original includes a sharp edge portion, a photograph image is recognized as a character, and an edge is unnaturally emphasized, resulting in poor appearance.

In an original image such as a map in which characters are written in a screen image as a background image, the characters are detected as the screen image, and characters cannot be clearly copied.

In order to eliminate such drawbacks, one of the character, photograph, and map modes is selected by the original kind mode selection key 4209, so that an optimal image can be formed.

Figure 3:
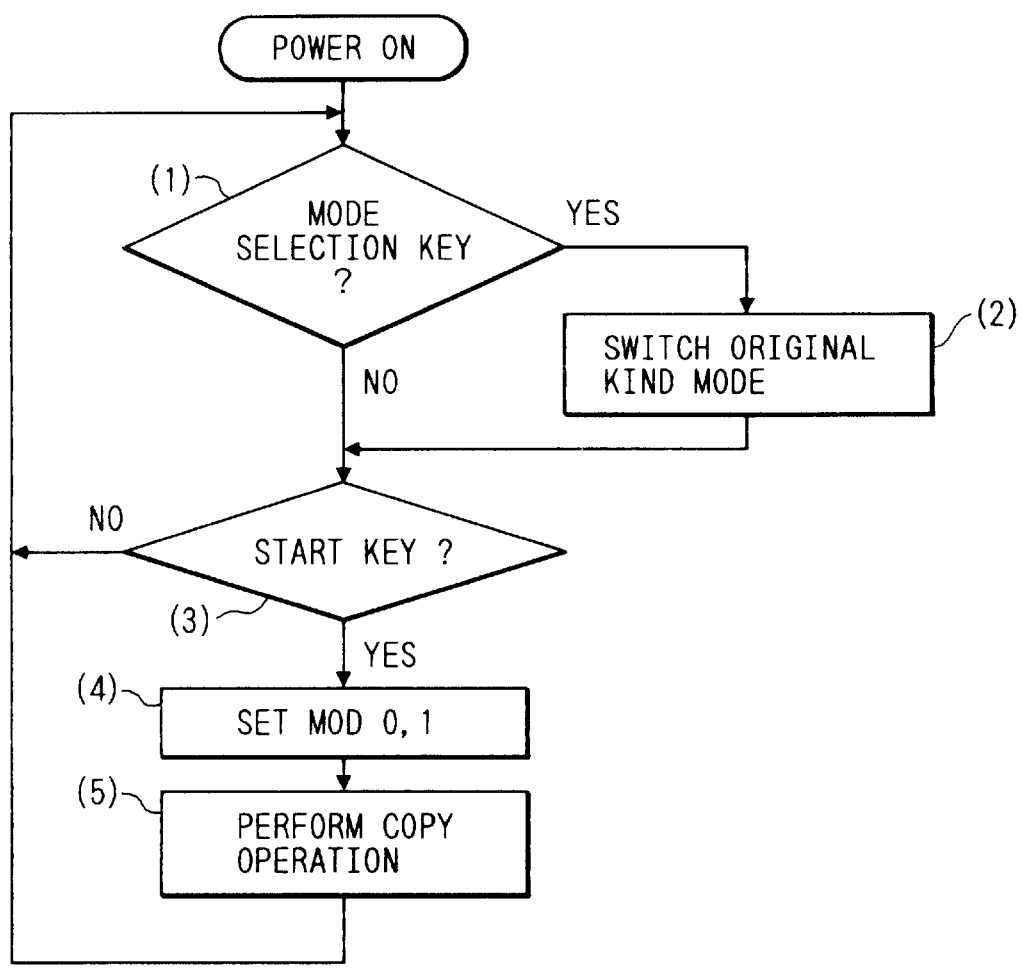
FIG. 3 is a flow chart for explaining an original kind mode selection processing sequence according to the present invention.

FIG. 3 is a flow chart for explaining the original kind mode selection processing according to the present invention. (1) to (5) designate steps.

When the power switch is turned on, it is checked in step (1) if a desired original kind mode is input by the original kind mode selection key 4209 at the operation unit. If YES in step (1), the flow advances to step (3) and subsequent steps; otherwise, the original kind modes (character, photograph, character/photograph, and map) designated by the key are sequentially switched in step (2) and a depression of a start key (copy key 4205) is waited in step (3). Original kind mode selection signals MOD0 and MOD1 corresponding to the selected original kind mode are set in step (4). The original kind mode selection signals MOD0 and MOD1 are output to the signal processing unit 211 to execute a copy operation in step (5).

Figure 4:
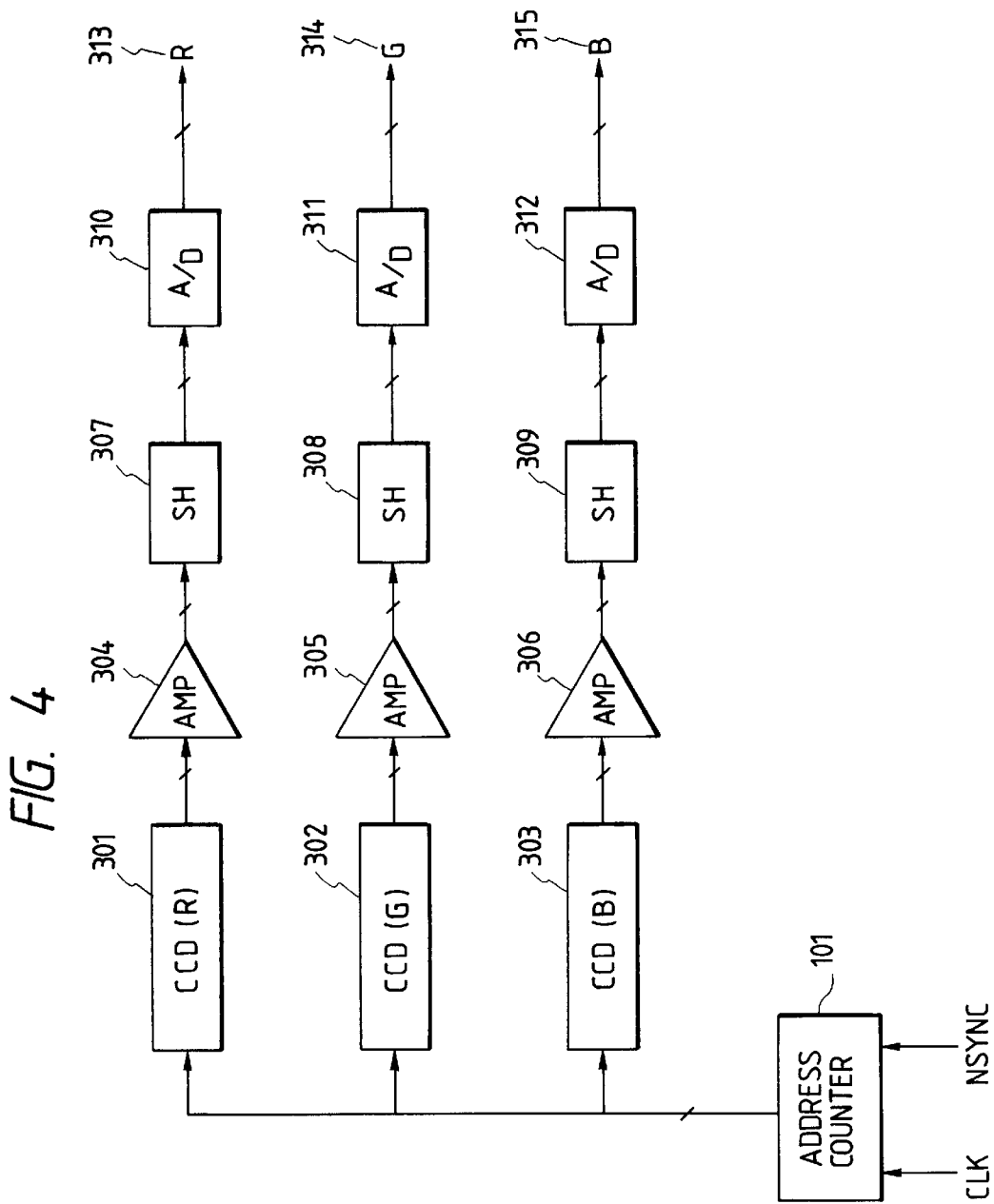
FIG. 4 is a block diagram for explaining an arrangement of an image scanner unit shown in FIG. 1.

FIG. 4 is a block diagram for explaining an arrangement of the image scanner unit shown in FIG. 1. The image scanner unit includes a counter 101 for outputting a main scan address 102 for designating a main scan position for line sensors 301 to 303 constituting the 3-line sensor 210. More specifically, when a horizontal sync signal HSYNC is "1", the counter 101 is set to have a predetermined value by a CPU (not shown), and is incremented in response to a pixel clock signal CLK.

An image formed on the 3-line sensor 210 is photoelectrically converted into R, G, and B component read signals by the three line sensors 301 to 303, respectively. These signals are output through amplifiers 304 to 306, sample & hold (SH) circuits 307 to 309, and A/D converters 310 to 312 as 8-bit digital image signals 313 (corresponding to R), 314 (corresponding to G), and 315 (corresponding to B).

The arrangement of the signal processing unit (image processing unit) 211 shown in FIG. 1 will be described below with reference to FIGS. 5 and 6.

Figure 5:
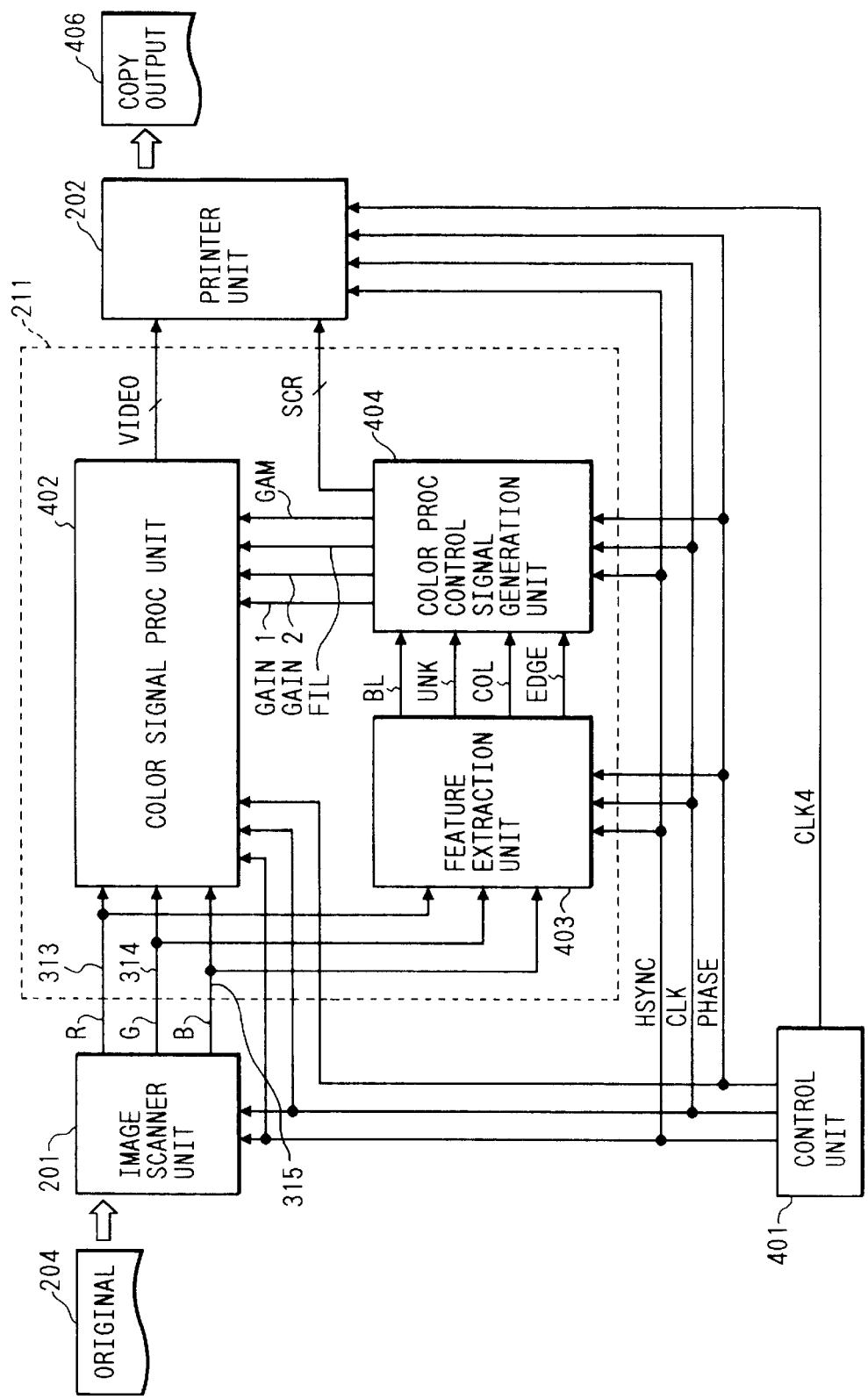
FIG. 5 is a block diagram for explaining an arrangement of a signal processing unit shown in FIG. 1.
Figure 6:
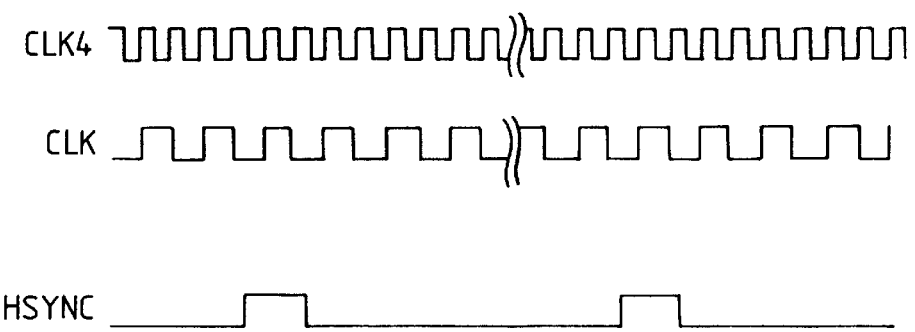
FIG. 6 is a timing chart showing an operation of FIG. 5.

FIG. 5 is a block diagram for explaining an arrangement of the signal processing unit (image processing unit) 211 shown in FIG. 1, and the same reference numerals in FIG. 5 denote the same parts as in FIG. 1.

In FIG. 5, a clock signal CLK defines a transfer timing of a pixel, and a horizontal sync signal HSYNC is a sync signal for starting a main scanning operation. A clock signal CLK4 is used to generate a 400-line screen (to be described later), and is output from a control unit 401 to the image scanner unit 201, the signal processing unit 211, and the printer unit 202 at a timing shown in FIG. 6.

The image scanner unit 201 reads the original 204, and sends image signals (digital image signals) 313 to 315 as electrical signals to a color signal processing unit 402 and a feature extraction unit 403. The feature extraction unit 403 outputs, to a color processing control signal generation unit 404, a black image analysis signal BL indicating that the presently processed pixel is a black image, a color analysis signal COL indicating that an image is a color image, a mixing analysis signal UNK indicating a possibility that the presently processed pixel may be either a black image or a color image, a cancel signal CAN for canceling the black image analysis signal BL, and an edge signal EDGE indicating a character edge.

Upon reception of these signals from the feature extraction unit 403, the color processing control signal generation unit 404 generates various color processing control signals (multiplication coefficient signals GAIN1 and GAIN2, a filter switching signal FIL, and a density characteristic switching signal GAM) for the color signal processing unit 402. Note that the multiplication coefficient signals GAIN1 and GAIN2 are used to weight the digital image signals 313 to 315 (to be described later).

The control unit 401 outputs a 2-bit phase signal PHASE to the respective processing blocks. The phase signal PHASE corresponds to a developing color of the printer unit 202, and corresponds to one of 00 (magenta), 01 (cyan), 10 (yellow), and 11 (black).

The color signal processing unit 402 generates a recording image signal VIDEO for the printer unit 202 on the basis of the phase signal PHASE and the color processing control signals.

The printer unit 202 PWM-modulates a laser emission time on the basis of the recording image signal VIDEO, and outputs a copy output 406 having good contrast.

The printer unit 202 receives a screen control signal SCR from the color processing control signal generation unit 404. The printer unit 202 switches a plurality of PWM fundamental blocks (screen clocks) according to the screen control signal SCR to attain a contrast best suitable for an original.

In this embodiment, when the screen control signal SCR is "0", PWM control in units of pixels is made; when the screen control signal SCR is "1", PWM control units of two pixels each is executed.

Figure 7:
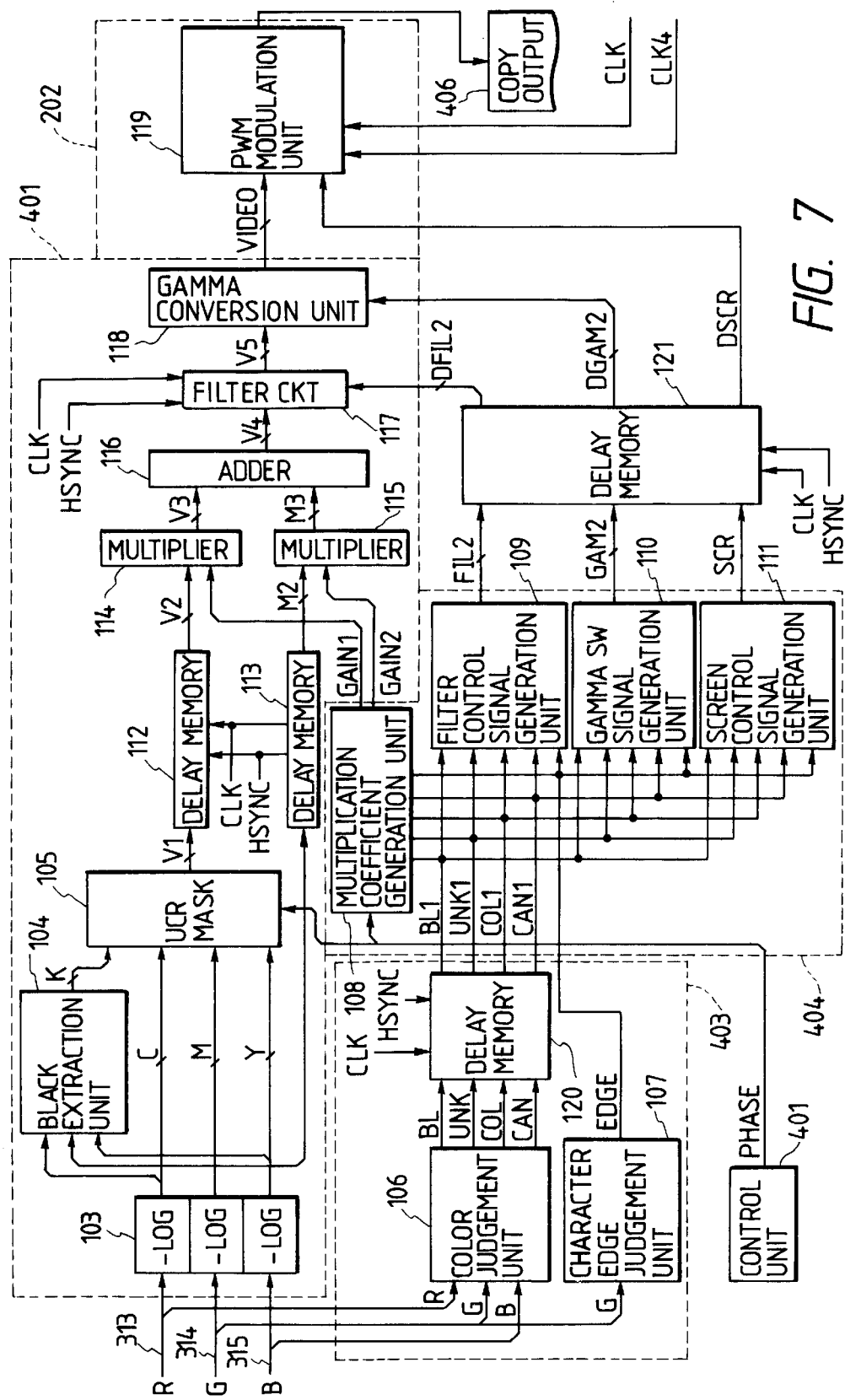
FIG. 7 is a detailed block diagram of a main portion of the signal processing unit shown in FIG. 5.

FIG. 7 is a detailed block diagram showing the principal portion of the signal processing unit (image processing unit) 211 shown in FIG. 5, and the same reference numerals in FIG. 7 denote the same parts as in FIGS. 1 and 5.

In FIG. 7, a light amount signal-density signal conversion unit 103 converts the image signals (digital image signals) 313 to 315 in a range of 0 to 255 to print signals C, M, and Y in a range of 0 to 255 by calculation processing based on a conversion formula (to be described later). A black extraction unit 104 determines a black signal BK on the basis of the minimum value of the C, M, and Y signals. The next masking processing unit (UCR/HASK) 105 executes calculation processing for removing color muddiness of developing agents. A developing color signal V1 selected by the input phase signal PHASE is then output to a line delay memory 112. The line delay memory 112 and a line delay memory 113 delay the print signals C, M, Y, and Bk by three lines and four clocks for character edge judgement processing. A multiplier 114 multiplies the multiplication coefficient signal GAIN1 with a color recording signal V2, as will be described in detail later, and outputs a multiplication output V3. A multiplier 115 multiplies the multiplication coefficient signal GAIN2 with a density signal M2, as will be described in detail later, and outputs a multiplication output M3 to an adder 116. The adder 116 adds the multiplication outputs M3 and V3 to generate an image signal V4. A filter circuit 117 comprises a 3×3 (pixel) Laplacian filter as an edge emphasis filter, and switches a Laplacian coefficient between ½ and 2 to execute smoothing processing, thereby outputting an 8-bit image signal V5. A gamma conversion unit 118 then converts the image signal V5 into an image signal VIDEO with reference to a density conversion table, and outputs the signal VIDEO to a PWM modulation unit 119 of the printer unit 202.

In the feature extraction unit 403, a color judgement unit 106 outputs, to a delay memory 120, a black image analysis signal BL, a color analysis signal COL indicating that an image is a color image, a mixing analysis signal UNK indicating a possibility that the presently processed pixel can be either a black image or a color image, and a cancel signal CAN for canceling the black image analysis signal BL on the basis of the color analog image signals.

A character edge judgement unit 107 detects by calculation processing (to be described later) based on a green component of the color analog image signals whether or not a steep change in density is present and whether or not steep density change points continuously appear in a specific direction, thereby extracting an edge area and judging a screen area.

More specifically, when an original read mode corresponding to a kind of original is set by the original kind mode selection key 4209 as the mode setting means, the image processing unit 211 starts processing of the analog image signal 314 output from the image sensor (3-line sensor 210). In this case, a CPU 1871 (to be described later) also serving as a condition setting means variably sets a first judgement condition for a first detection means and a second judgement condition for a second detection means on the basis of an original read mode (character, photograph, character/photograph, and map) input from a mode setting means. The first and second detection means are constituted by the character edge judgement unit 107. A first character area separation processing means (edge judgement unit to be described later) separates a character edge area from the image signal 314 under the variably set first and second judgement conditions, and outputs the edge signal EDGE.

The CPU 1871 also serving as a judgement level varying means outputs a setting switching signal MD for setting different judgement density levels in a conversion means (in this embodiment, a density conversion ROM to be described later). In this manner, an analog image signal, in this embodiment, the image signal 314 (G signal) is converted into a density level signal while different judgement density levels are set in the density conversion ROM (conversion means). At this time, the feature extraction unit 403 constituting a character area separation processing means can faithfully separate a character area from an evaluated output density level signal.

The CPU sets the judgement density level in the conversion means so that a ratio of high-density level pixel vs. low-density level pixel is set in a low-density level pixel priority mode. That is, the CPU sets the judgement density level for a high-density level so as not to easily detect a change in density as compared to that for a low-density level, thereby faithfully detecting a character area in a halftone image.

Furthermore, the density conversion ROM (conversion means) converts density levels of surrounding pixels including an objective pixel of an analog image signal into predetermined density level signals on the basis of a conversion look-up table. That is, the density conversion ROM converts density levels into predetermined density level signals at high speed using density levels of input image signals as addresses.

The density conversion ROM (conversion means) converts density levels of surrounding pixels including an objective pixel of an analog image signal into predetermined density level signals on the basis of a conversion look-up table, thereby faithfully judging and separating a character area from an intermediate saturation image area in a color original.

When the original read mode corresponding to a kind of original is set by the original kind mode selection key 4209, the image processing unit 202 starts processing of color analog signals (image signals 313 to 315) output from the 3-line sensor 210. In this case, the color judgement unit 106 constituting a third detection means detects an achromatic portion while analyzing signals on the basis of a third judgement condition. A second character area separation processing means (edge judgement unit to be described later) executes separation processing on the basis of detection results from the first to third detection means, thereby separating a character edge area from the color analog image signals. As a result, a character edge can be faithfully separated.

The color processing control signal generation unit 404 comprises a filter control signal generation unit 109, a gamma switching signal generation unit 110, and a screen switching signal generation unit 111. The filter control signal generation unit 109 generates a 2-bit filter switching signal FIL on the basis of the black image analysis signal BL, the color analysis signal COL indicating that an image is a color image, the mixing analysis signal (intermediate saturation signal) UNK indicating a possibility that the presently processed pixel can be either a black image or a color image, and the cancel signal CAN for canceling the black image analysis signal BL which are generated based on the color analog image signals. The filter control signal generation unit 109 outputs the filter switching signal FIL to a delay memory 121, and the delay memory 121 outputs a 2-bit delayed filter switching signal DFIL to a filter circuit (spatial filter unit) 117.

The gamma switching signal generation unit 110 generates a selection control signal GAM for selecting, e.g., four kinds of conversion tables on the basis of the black image analysis signal BL, the color analysis signal COL indicating that an image is a color image, the intermediate saturation signal UNK indicating a possibility that the presently processed pixel can be either a black image or a color image, the cancel signal CAN for canceling the black image analysis signal BL, and the edge signal EDGE which are generated based on the color analog image signals. The gamma switching signal generation unit 110 then supplies the selection control signal GAM to the delay memory 121, and the memory 121 outputs a delayed selection control signal DGAM to the gamma conversion unit 118.

The screen switching signal generation unit 111 generates a screen control signal SCR on the basis of the black image analysis signal BL, the color analysis signal COL indicating that an image is a color image, the intermediate saturation signal UNK indicating a possibility that the presently processed pixel can be either a black image or a color image, the cancel signal CAN for canceling the black image analysis signal BL, and the edge signal EDGE which are generated based on the color analog image signals. The screen switching signal generation unit 111 then supplies the screen control signal SCR to the delay memory 121, and the memory 121 then outputs a delayed screen control signal DSCR to the PWM modulation unit 119 of the printer unit 202, thereby causing the unit 119 to select a pulse-width modulation signal PW or PW4 (to be described later).

Figures 8, 12:
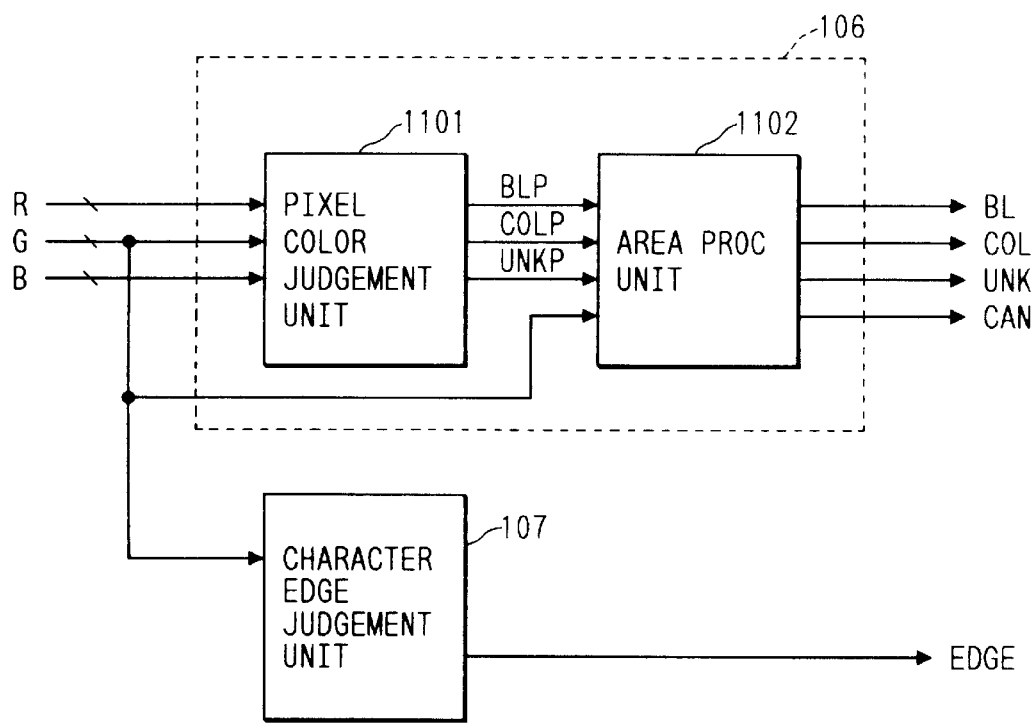
FIG. 8 is a block diagram for explaining an arrangement of a color judgement unit shown in FIG. 7.
FIG. 12 is a table for explaining output conditions of an input image signal and judgement signals.

FIG. 8 is a block diagram for explaining an arrangement of the color judgement unit 106 shown in FIG. 7, and the same reference numerals in FIG. 8 denote the same parts as in FIG. 7.

In FIG. 8, a pixel color judgement unit 1101 generates, in units of pixels, a black pixel signal BLP indicating black, a color pixel signal COLP, and an intermediate saturation signal UNKP indicating an unknown pixel, and sends these signals to an area processing unit 1102. The area processing unit 1102 area-judges the black pixel signal BLP, the color pixel signal COLP, and the intermediate saturation signal UNKP in, e.g., a 5×5 area to remove an error, thereby generating the true black image analysis signal BL, the color analysis signal COL indicating that an image is a color image, the intermediate saturation signal UNK indicating a possibility that the presently processed pixel may be either a black image or a color image, and the cancel signal CAN.

Figure 9:
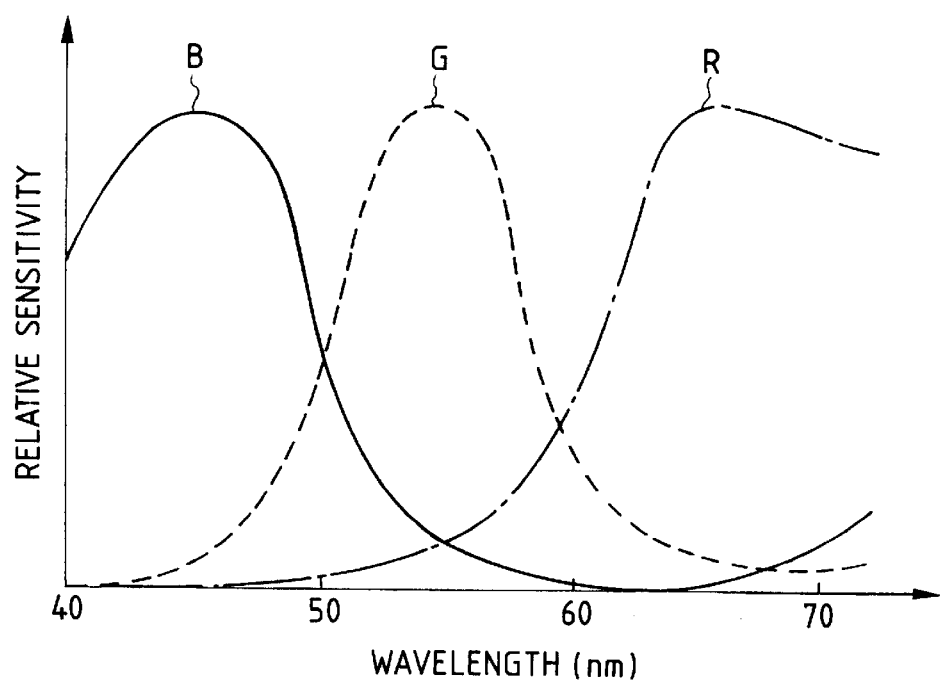
FIG. 9 is a graph for explaining a wavelength of received light and a spectral luminous efficiency in the image scanner unit.

As can be apparent from wavelength/relative sensitivity characteristics shown in FIG. 9, the character edge judgement unit 107 performs character edge detection of a black-and-white image using grain components approximate to spectral luminous efficiency characteristics, and outputs the edge signal EDGE as a character edge detection signal to the color processing control signal generation unit 404.

The color judgement unit 106 will be described in detail below with reference to FIG. 10.

Figure 10:
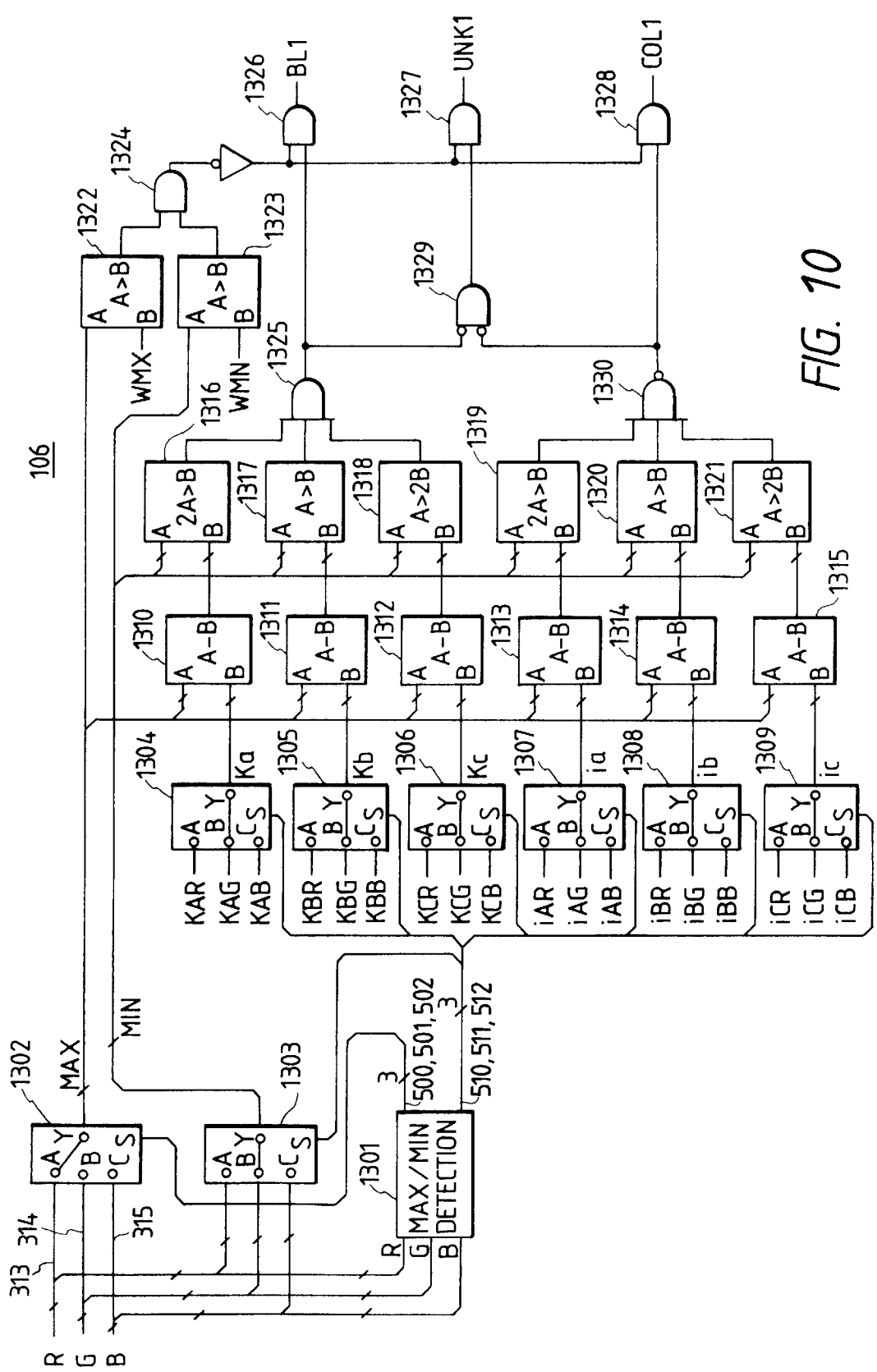
FIG. 10 is a block diagram for explaining a detailed arrangement of the color judgement unit shown in FIG. 7.

FIG. 10 is a circuit diagram for explaining a detailed arrangement of the color judgement unit 106 shown in FIG. 7.

In FIG. 10, a MAX/MIN detector 1301 executes maximum value/minimum value detection processing using the image signals 313 to 315, and outputs judgement signals S00, S01, S02, S10, S11, S12, and the like to selectors 1302 to 1309, as shown in FIG. 10. Each of subtracters 1310 to 1315 receives inputs A and B, and outputs A–B. Of comparators 1316 to 1323, the comparators 1316 and 1319 receive inputs A and B, and when 2A>B is established, they go to active level (H level), i.e., output "1"; otherwise, output "0".

The comparators 1317, 1320, 1322, and 1323 receive inputs A and B, and when A>B is established, they go to active level (H level), i.e., output "1"; otherwise, output "0".

Furthermore, the comparators 1318 and 1321 receive inputs A and B, and when A>2B is established, they go to active level (H level), i.e., output "1"; otherwise, output "0".

A NOR gate 1329 logically NORs AND products from AND gates 1325 and 1330, and outputs the NOR output to an AND gate 1327. The AND gate 1327 outputs the above-mentioned intermediate saturation signal UNK.

An AND gate 1326 generates the black image analysis signal BL, and an AND gate 1328 generates the color analysis signal COL.

Figure 11:
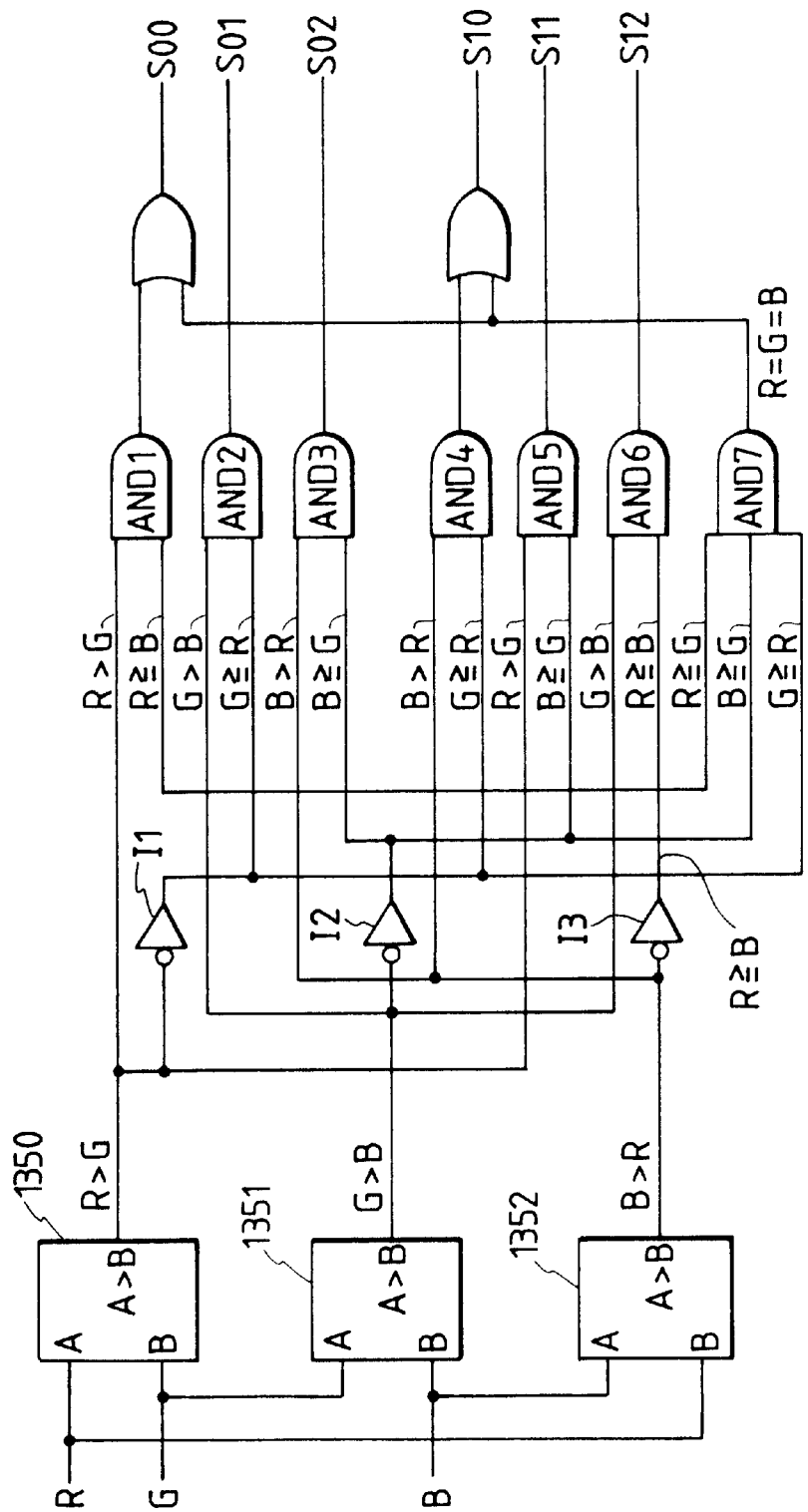
FIG. 11 is a block diagram showing a detailed arrangement of a MAX/MIN detector shown in FIG. 10.

FIG. 11 is a circuit diagram for explaining a detailed arrangement of the MAX/MIN detector 1301 shown in FIG. 10. Comparators 1350 to 1352 output "1" respectively when density levels of the R, G, and B image signals 313, 314, and 315 satisfy R>G, G>B, and B>R. Inverters I1 to I3, AND gates AND1 to AND7, and OR gates OR1 and OR2 output the judgement signals S00, S01, S02, S10, S11, S12, and the like, as shown in FIG. 11.

FIG. 12 is a view for explaining output conditions of the input image signals and the judgement signals shown in FIG. 11.

As can be seen from FIG. 12, when the density level of the R image signal 313 is MAX, or when the density levels of the R, G, and B image signals 313, 314, and 315 are equal to each other, the judgement signal S00 goes to "1" level, and the judgement signals S01 and S02 go to "0" level. When the density level of the B image signal 315 is MAX, the judgement signal S02 goes to "1" level, and the judgement signals S00 and S01 go to "0" level. When the density level of the R image signal 313 is MIN or the density levels of the R, G, and B image signals are equal to each other, the judgement signal S10 goes to "1" level, and the judgement signals S11 and S12 go to "0" level. When the density level of the G image signal 314 is MIN, the judgement signal S11 goes to "1" level, and the judgement signals S10 and S12 go to "0" level.

Furthermore, when the density level of the B image signal 315 is MIN, the judgement signal S12 goes to "1" level, and the judgement signals S10 and S11 go to "0" level.

Therefore, when the density level of the R image signal 313 is MAX, since the relations R>G and R≧B are established, the comparator 1350 outputs "1", and the comparator 1352 outputs "0". The AND gate AND1 outputs "1", and the OR gate OR1 outputs "1". At this time, the AND gates AND2 and AND3 output "0". That is, the judgement signal S00 goes to "1" level, and the judgement signals S01 and S02 go to "0" level (FIG. 12).

The judgement signals S00, S01, and S02 from the MAX/MIN detector 1301 are input to the selector 1302, and the judgement signals S10, S11, and S12 are input to the selectors 1303 to 1309.

As shown in FIG. 13, each of the selectors 1302 to 1309 is constituted by AND gates AND11 to AND13, an OR gate OR11, and the like, and selects one of inputs A to C according to states of input judgement signals S0 to S2, as shown in FIG. 14.

For this reason, when the judgement signal S0 is "1" and the judgement signals S1 and S2 are "0" for the inputs A to C, the input A is selected. When the judgement signals S0 and S1 are "0" and the judgement signal S2 is "1", the input C is selected. In this embodiment, the input A to C corresponds to the R, G, and B image signals 313, 314, and 315, respectively.

Pixel Color Judgement Processing

The pixel color judgement processing is executed such that the maximum density level of the R, G, and B image signals 313, 314, and 315 is represented by MAX, the minimum density level of these signals is represented by MIN, and areas are divided, as shown in FIG. 15.

FIG. 15 is a view for explaining pixel color judgement divisions of the image reading apparatus according to the present invention. The maximum density level is plotted along the abscissa, and the minimum density level is plotted along the ordinate.

More specifically, in an achromatic color area, a difference between MAX and MIN is small, and as a density level approaches a chromatic color, the difference between MAX and MIN is increased. By utilizing this fact, a MAX-MIN plane is divided by linear simultaneous inequalities using MAX and MIN as parameters. More specifically, constants ka, kb, kc, ia, ib, ic, WMX, and WMN are divided into predetermined areas A1 to D1.

In FIG. 15, an area (or division) A1 is a dark achromatic color (black) area, and (MAX, MIN) is included in this area when MIN≦WMN or MAX≦WMX and the following inequalities (1) are established:

$$\left[ \begin{array}{l} MAX - ka < 2MIN \\ MAX - kb < MIN \\ MAX - kc < MIN/2 \end{array} \right. \quad (1)$$

A division B1 is an intermediate area between a dark achromatic color and a chromatic color, and (MAX, MIN) is included in this area when MIN≦WMN or MAX≦WMX and any of the following inequalities (2) and all the inequalities (3) are established:

$$\left[ \begin{array}{l} MAX - ka \geq 2MIN \\ MAX - kb \geq MIN \\ MAX - kc \geq MIN/2 \end{array} \right. \quad (2)$$

$$\left[ \begin{array}{l} MAX - ia < 2MIN \\ MAX - ib < MIN \\ MAX - ic < MIN/2 \end{array} \right. \quad (3)$$

A division C1 is a chromatic color area, and (MAX, MIN) is included in this area when MIN≦W or MAX≦WMX and the following inequalities (4) are established:

$$\left[\begin{array}{l} \text{MAX} - ia \geq 2\text{MIN} \\ \text{MAX} - ib \geq \text{MIN} \\ \text{MAX} - ic \geq \text{MIN}/2 \end{array}\right. \quad (4)$$

A division D1 is a bright achromatic color (white) area, and (MAX, MIN) is included in this area when one of the following inequalities (5) is established:

$$\left[\begin{array}{l} \text{MIN} > WMN \\ \text{MAX} > WMX \end{array}\right. \quad (5)$$

FIG. 16 is a table for explaining the relationship between area divisions shown in FIG. 15 and output signals from the MAX/MIN detector 1301, and the same reference numerals in FIG. 16 denote the same parts as in FIG. 15.

As can be seen from FIG. 16, each pixel is included in the division A1 as a result of maximum/minimum processing of the image signals 313 to 315 when the black image analysis signal BL is "1" and both the color analysis signal COL and the intermediate saturation signal UNK are "0".

Each pixel is included in the division B1 as a result of maximum/minimum processing of the image signals 313 to 315 when the intermediate saturation signal is "1" and both the black image analysis signal BL and the color analysis signal COL are "0".

Furthermore, each pixel is included in the division C1 as a result of maximum/minimum processing of the image signals 313 to 315 when the color analysis signal COL is "1" and both the black image analysis signal BL and the intermediate saturation signal UNK are "0".

Each pixel is included in the division D1 as a result of maximum/minimum processing of the image signals 313 to 315 when the black image analysis signal BL is "1" and the intermediate saturation signal UNK and the color analysis signal COL are "0".

The above-mentioned area judgement is performed by the circuit shown in FIG. 10, which constitutes the color judgement unit 106. That is, the selectors 1302 and 1303 select the MAX and MIN signals from the image signals 313 to 315 according to the outputs from the MAX/MIN detector 1301. The selectors 1304 to 1309 also select values of the constants ka, kb, kc, ia, ib, and ic in cooperation with the selector 1303. For example, when the NAX signal is the R signal (image signal 313) and the MIN signal is the G signal (image signal 314), the selector 1304 selects KAG, the selector 1306 selects KCG, the selector 1307 selects iAG, the selector 1308 selects iBG, and the selector 1309 selects iCG to change values of the constants ka, kb, kc, ia, ib, and ic for the following reason.

In general, since a full-color sensor has a color balance unique to a sensor, a judgement error occurs when chromatic/achromatic color judgement is performed for all the colors with the same judgement reference. Thus, as shown in FIG. 17, an RGB three-dimensional space is divided into three areas in correspondence with color balance characteristics of sensors.

FIG. 17 is a spatial characteristic graph showing color balance characteristics of the three line sensors 301 to 303 shown in FIG. 4.

As can be seen from FIG. 17, the RGB three-dimensional space is divided into an area 5702 where MIN=R, an area 5703 where MIN=G, and an area 5704 where MIN=B, and values of the constants ka, kb, kc, ia, ib, and ic according to these areas are used.

For example, for a sensor which outputs a relatively low R component signal, the constants KAR, KBR, KCR, iAR, iBR, and iCR shown in FIG. 10 are set to be relatively larger. When MIN=R, in the areas shown in FIG. 15, the divisions A1 and C1 can be set to be small, thus finely coping with various sensors.

The subtracters 1310 to 1312 and the comparators 1316 to 1318 judge the relationships between:
MAX—ka and 2MIN
MAX—kb and MIN
MAX—kc and MIN/2

The subtracters 1313 to 1315 and the comparators 1319 to 1321 judge the relationships between
MAX—ia and 2MIN
MAX—ib and MIN
MAX—ic and MIN/2

The comparators 1322 and 1323 respectively judge the relationships between:
MAX and WMX
MIN and WMN The area judgement is performed as described above. The judgement results are output as the judgement signals of the intermediate saturation signal UNK, the color analysis signal COL, and the black image analysis signal BL.

Figure 18:
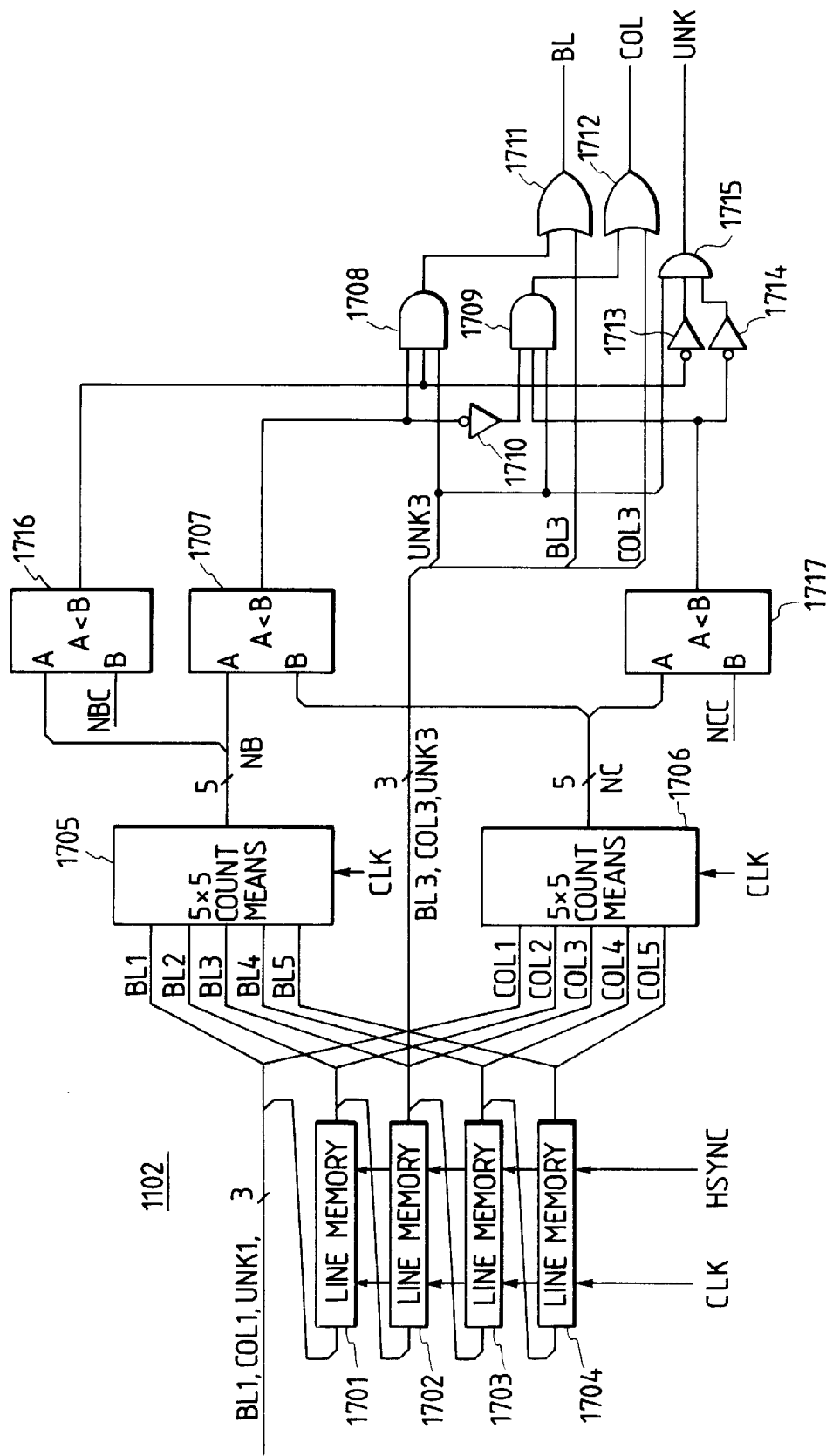
FIG. 18 is a block diagram for explaining an arrangement of an area processing unit shown in FIG. 8.

FIG. 18 is a circuit diagram for explaining an arrangement of the area processing unit 1102 shown in FIG. 8. The arrangement and operation of the area processing unit 1102 will be described below.

Figure 19:
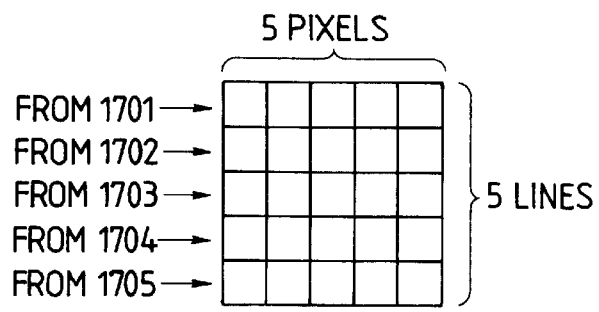
FIG. 19 is a view for explaining an operation of a count means shown in FIG. 18.

The black pixel signal BLP, the color pixel signal COLP, and the intermediate saturation signal UNKP indicating a pixel having an unknown density level, which are judged by the pixel color judgement unit 1101, are delayed by one line by line memories 1701 to 1704, and are synchronized by the horizontal sync signal HSYNC and the clock signal CLK, thus simultaneously outputting five line signals. Signals obtained by delaying the black pixel signal BLP, the color pixel signal COLP, and the intermediate saturation signal UNKP by one line are represented by BLP2, COLP2, and UNKP2, signals obtained by delaying these signals by one more line are represented by BLP3, COLP3, and UNKP3, signals obtained by delaying these signals by further one more line are represented by BLP4, COLP4, and UNKP4, and signals obtained by delaying these signals by still one more line are represented by BLP5, COLP5, and UNKP5. In this case, a count means 1705 delays these signals by five pixels, and counts the number of BL black pixels in a 5×5 area (FIG. 19) to obtain a count value NB. A count means 1706 counts the number of COL chromatic pixels to obtain a count value NL. Furthermore, a comparator 7007 compares the numbers of black pixels (count value NB) and chromatic pixels (count value NL) in a 5×5 block.

Furthermore, gate circuits 1708 to 1715 calculate the output from the comparator 7007 together with the results of BLP3, COLP3, and UNKP3 as outputs from the pixel color judgement unit 1101 with respect to the central pixel in the 5×5 area. As a result, gate circuits 1711, 1712, and 1715 output a black pixel signal BL indicating that the central pixel is a black pixel, a color pixel signal COL indicating that the central pixel is a chromatic pixel, and an intermediate saturation signal UNK indicating that the central pixel has an intermediate saturation, respectively.

At this time, judgement stands for the judgement result of the first judgement reference, which indicates that the central pixel is a black pixel and a chromatic pixel. More specifically, when BLP3 and COLP3 are "1", the pixel signal BL is "1" or the color pixel signal COL is "1". When the judgement result of the first judgement reference indicates that the central pixel is an intermediate pixel between chromatic and achromatic color pixels, a comparator 1716 checks if the number of black pixels is equal to or larger than a predetermined value (NBC), and a comparator 1717 checks if the number of chromatic color pixels is equal to or larger than the predetermined value. Furthermore, a comparator 1707 compares the numbers of the black pixels and chromatic color pixels. When the number of black pixels is equal to or larger than the predetermined value and NB>NC is established, the gate circuit 1708 outputs the UNKP3 as the black pixel signal BL.

When the number of chromatic pixels is equal to or larger than the predetermined value and NB≦NC is established, the gate circuit 1709 outputs the UNK3 as the color pixel signal COL.

This processing is executed to remove color bleeding at color change points of an original caused by scanning speed nonuniformity of the scanning mirrors 206 to 208 and a magnification error of the focusing lens 209, which constitute the scanning optical system shown in FIG. 1.

When the gate circuits 1713 to 1715 detect that the numbers of the black and chromatic color pixels do not exceed the predetermined value around a pixel represented by the UNK3, the intermediate saturation signal UNK as an intermediate chromatic signal is output.

Output processing of the cancel signal CAN output from the color judgement unit 106 shown in FIG. 7 will be described below with reference to FIG. 20.

Figure 20:
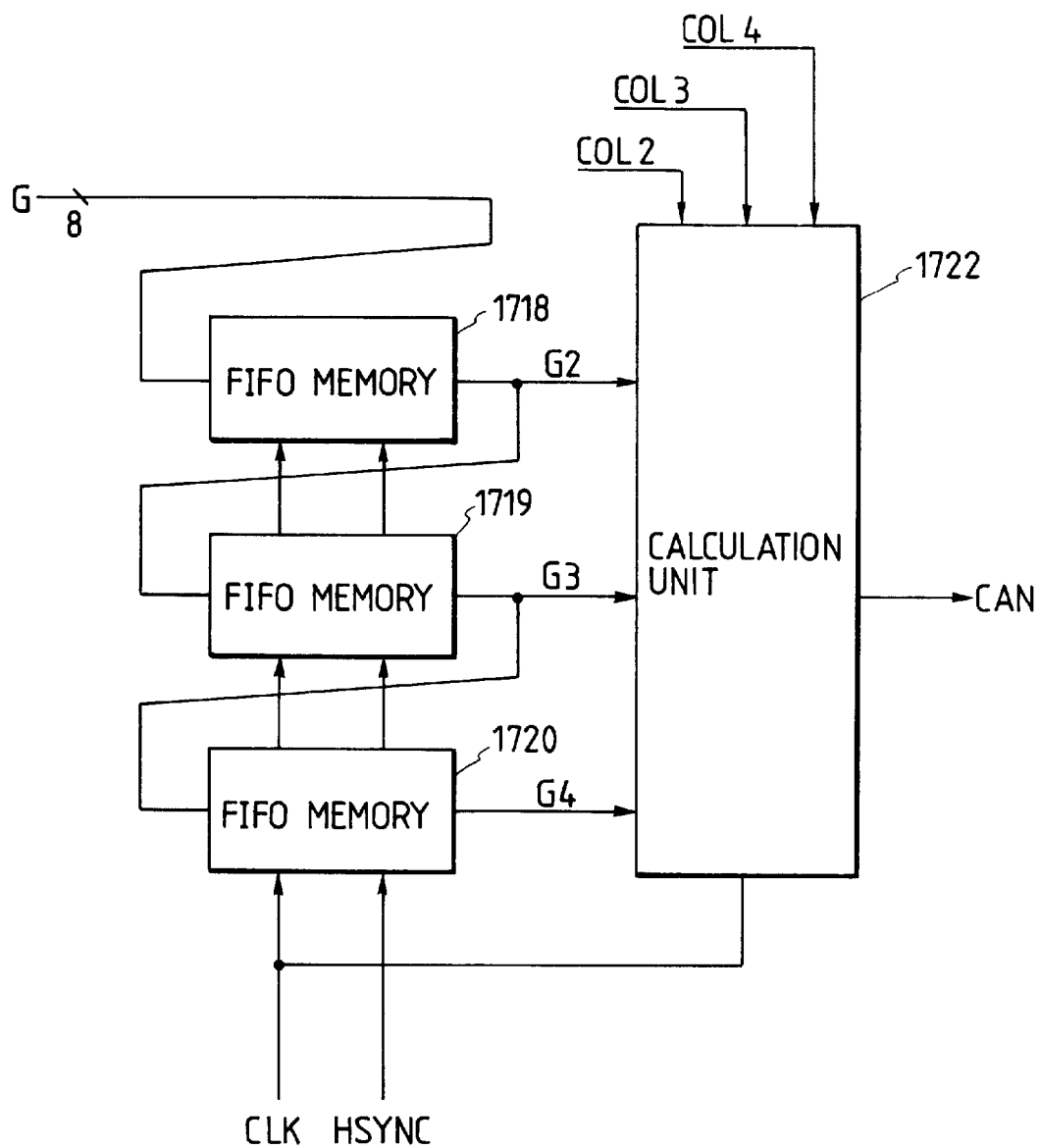
FIG. 20 is a circuit diagram of a cancel signal generating circuit in the color judgement unit shown in FIG. 7.

FIG. 20 is a circuit diagram of a cancel signal generation circuit of the color judgement signal 106 shown in FIG. 7. The arrangement and operation of the cancel signal generation circuit will be described below.

Figure 21:
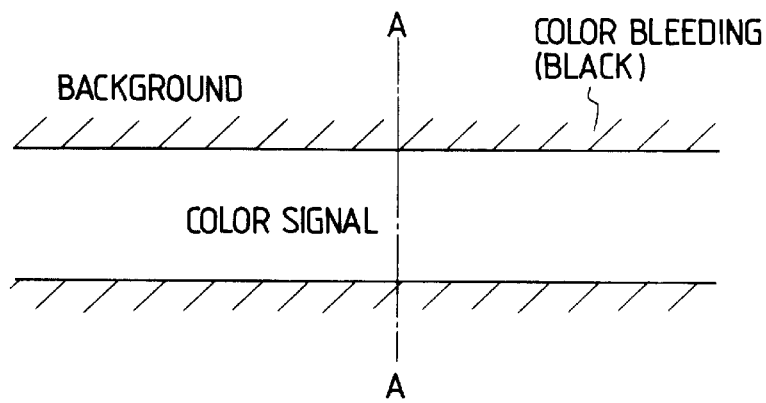
FIG. 21 is a view for explaining a color bleeding state.

In the circuit shown in FIG. 18, when an objective pixel is a black pixel, the black image analysis signal BL is output regardless of surrounding pixels. However, when the above-mentioned scanning speed nonuniformity or a focusing magnification error occurs, a black signal due to color bleeding may often be generated around a color signal, as shown in FIG. 21. Since the black signal due to color bleeding is generated around the color signal, its light amount value is larger than that of the color signal, as shown in FIG. 22.

Figure 22:
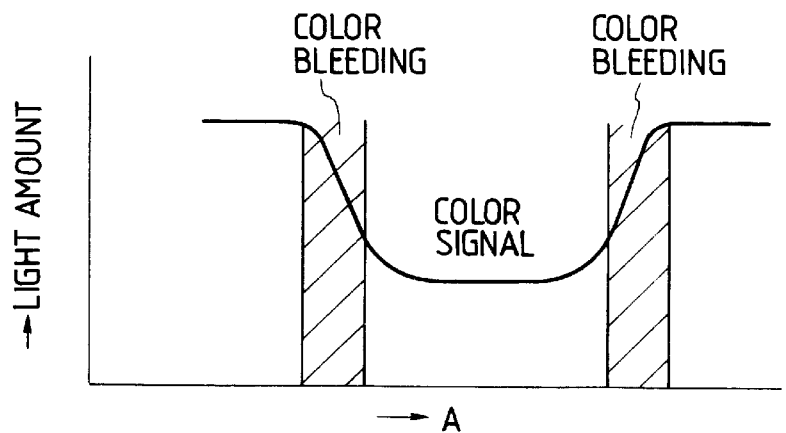
FIG. 22 is a graph for explaining light amount characteristics at a specific position shown in FIG. 21.

FIG. 21 is a view for explaining a color bleeding state, and FIG. 22 is a graph for explaining light amount characteristics at a specific position in FIG. 21. In FIG. 22, a light amount is plotted along the ordinate, and a specific position is plotted along the abscissa.

As described above, when the black signal due to color bleeding is generated around a color signal, its light amount value is larger than that of the color signal, as shown in FIG. 22. Therefore, whether or not a color pixel signal COL having a smaller light amount value than that of an objective pixel is present around the objective pixel is detected to generate the cancel signal CAN.

As a light amount signal, the image signal 314 closest to spectral luminous efficiency characteristics shown in FIG. 12 is used, and is delayed by 1-line FIFO memories 1718 to 1720, so that an objective line signal G3 and line signals G2 and G4 separated by one line each before and after the line signal G3 are input to a calculation unit 1722. At the same time, the calculation unit 1722 receives color pixel signals COLP2 to COLP4 output from the circuit shown in FIG. 18, and calculation processing is then executed by a circuit shown in FIG. 23.

Figure 23:
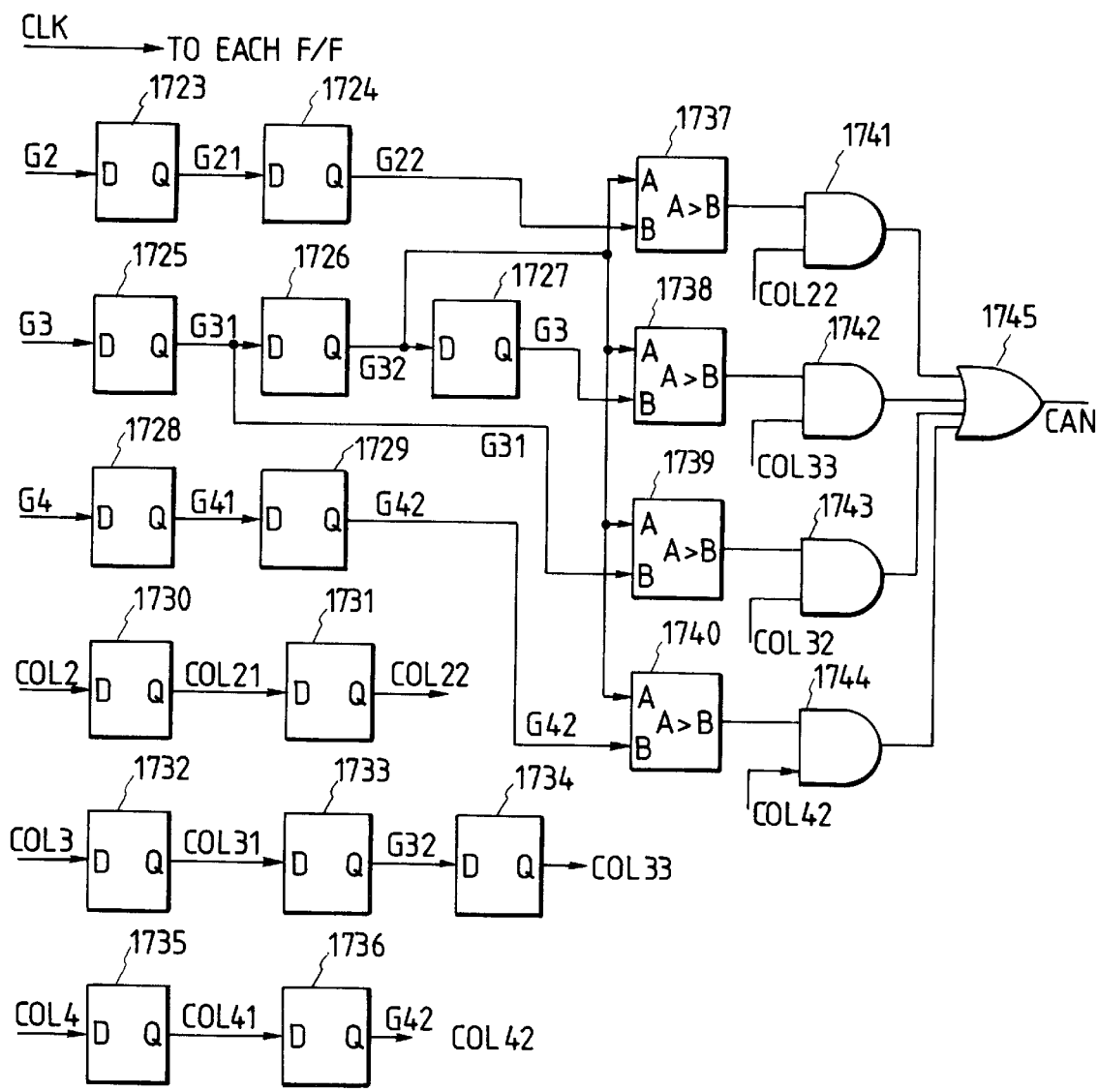
FIG. 23 is a block diagram for explaining an arrangement of a calculation unit shown in FIG. 20.

FIG. 23 is a block diagram for explaining an arrangement of the calculation unit 1722 shown in FIG. 22. Flip-flops 1723 to 1736 delay the line signals G2 to G4 and the color pixel signals COLP2 to COLP4 by two or three pixels. Note that a pixel signal G32 and a pixel signal COL32 represent an objective pixel. The pixel signal G32 is compared with surrounding pixel signals G22, G31, G33, G42, and the like by comparators 1737 to 1740, and comparator outputs go to H level when the light amount values of the surrounding pixels are lower than that of the objective pixel. AND gates 1741 to 1744 logically AND the comparator outputs and the color judgement signals of the surrounding pixels, and an OR gate 1745 outputs the cancel signal CAN.

Character Edge Judgement Processing

The arrangement and operation of the character edge judgement unit 107 shown in FIG. 7 will be described below with reference to FIG. 24.

Figure 24:
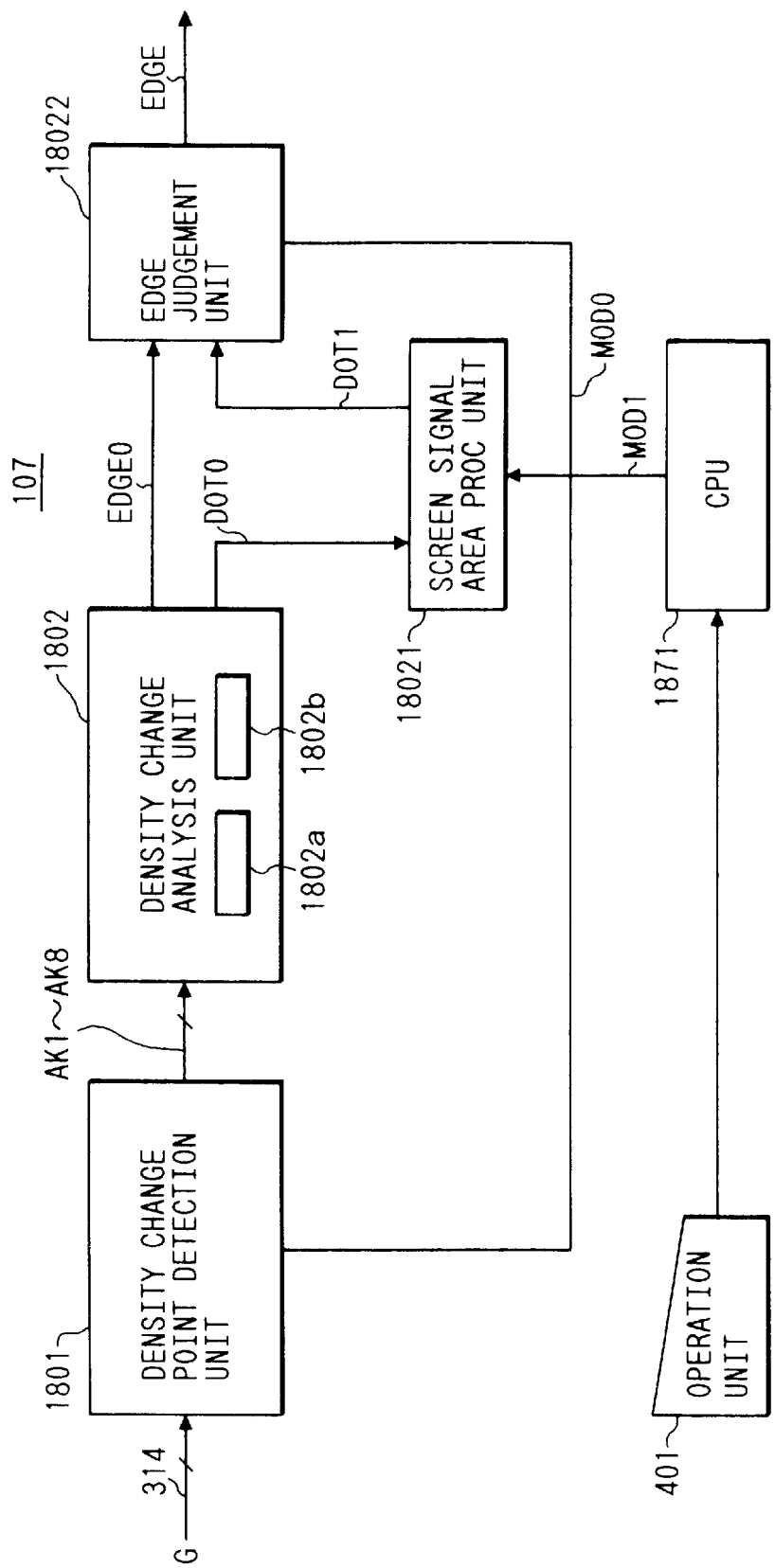
FIG. 24 is a block diagram for explaining an arrangement of a character edge judgement unit shown in FIG. 7.

FIG. 24 is a block diagram for explaining an arrangement of the character edge judgement unit 107 shown in FIG. 7. A density change point detection unit 1801 catches a density change from the input image signal 314, and outputs density judgement data AK1 to AK8 to a density change analysis unit 1802. The density change analysis unit 1802 comprises a density change processing unit 1802a, a screen processing unit 1802b, and the like. The density change processing unit 1802a analyzes the density change data AK1 to AK8 to obtain continuity of a density change and a density change in a specific direction, and outputs an edge signal EDGE0 to the edge judgement unit 18022.

The screen processing unit 1802b of the density change analysis unit 1802 judges the presence/absence of screen pixels on the basis of the density change data AK1 to AK8, and outputs a screen pixel detection signal DOT0 to a screen signal area processing unit 18021. The screen signal area processing unit 18021 outputs a screen area signal DOT1 to the edge judgement unit 18022 on the basis of the mode signals MOD0 and MOD1 output from a CPU 1871.

FIG. 25 is a table for explaining kinds of mode corresponding to the mode signals MOD0 and MOD1 output from the CPU 1871 shown in FIG. 24. When the mode signals MOD0 and MOD1 are set to be "01", "10", "11", and "00", the "character mode", the "photograph mode", the "character/photograph mode", and the "map mode" are respectively set.

The principle of the character edge judgement processing will be described below with reference to FIGS. 26 and 27.

Figure 26:
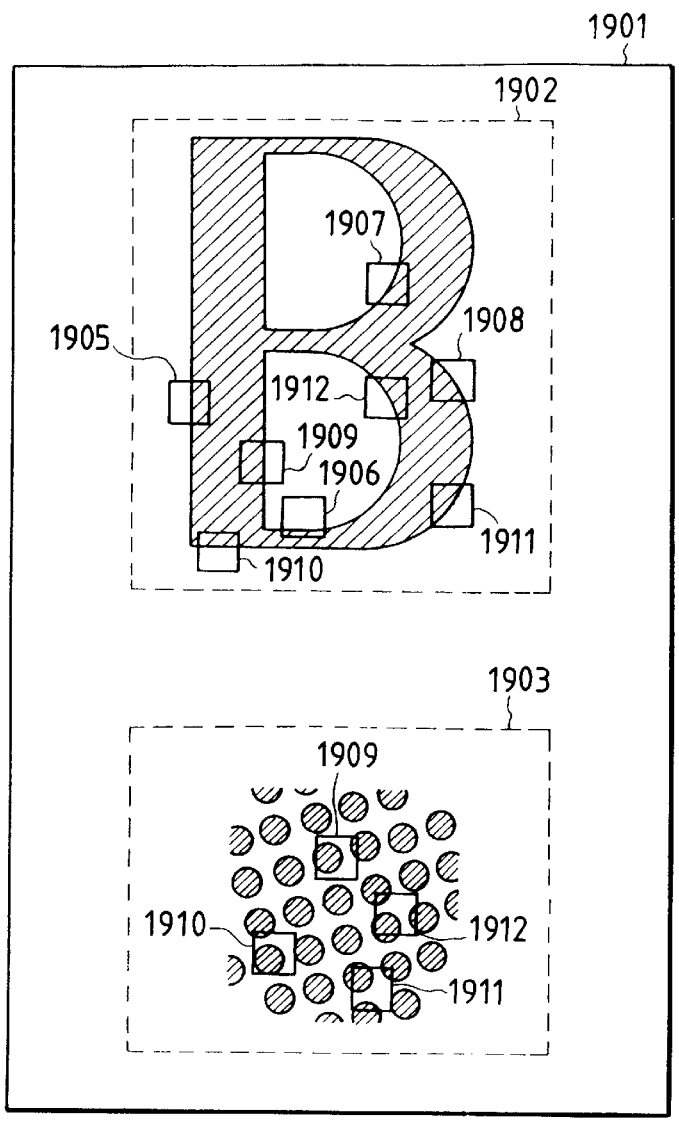
FIG. 26 is a view for explaining the principle of character edge judgement processing according to the present invention.

FIG. 26 is a view for explaining the principle of the character edge judgement processing according to the present invention.

An original 1901 exemplifies a case of an image having gray scale levels, and includes a character edge area 1902 and an halftone area 1903 expressed by dots. Each of pixel blocks 1905 to 1912 consists of 10 pixels including an objective pixel $x_{ij}$ and its nine adjacent pixels, as shown in FIG. 27.

Figure 27:
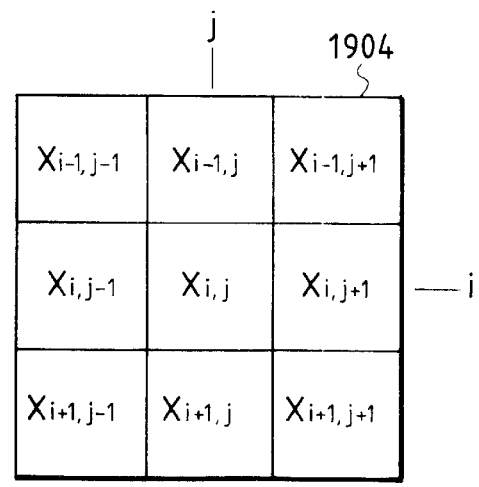
FIG. 27 is a view for explaining an arrangement of a pixel block according to the present invention.

The density change processing unit 1802a checks based on the pixel block 1904 including the objective pixel $x_{ij}$ and its nine adjacent pixels shown in FIG. 27 as one unit if a steep density change is present, and also checks if steep density change points continuously appear in a specific direction.

More specifically, as shown in the following equations (6), differences $J_1$ to $J_8$ of adjacent pixels $x_{i-1,j-1}$, $x_{i-1,j}$, $x_{i-1,j+1}$, $x_{i,j-1}$, $x_{i,j+1}$, $x_{i+1,j-1}$, $x_{i+1,j}$, and $x_{i+1,j+1}$ with respect to the objective pixel $x_{ij}$ are calculated and whether or not a steep density change is present is checked based on the relationship of these pixels.

$$\left.\begin{aligned}
J_1 &= x_{i,j+1} - x_{i,j-1} \\
J_2 &= x_{i+1,j} - x_{i-1,j} \\
J_3 &= x_{i+1,j+1} - x_{i-1,j-1} \\
J_4 &= x_{i+1,j-1} - x_{i-1,j+1} \\
J_5 &= x_{i,j-1} - x_{i,j+1} \\
J_6 &= x_{i-1,j} - x_{i+1,j} \\
J_7 &= x_{i-1,j-1} - x_{i+1,j+1} \\
J_8 &= x_{i-1,j+1} - x_{i+1,j-1}
\end{aligned}\right\} \qquad (6)$$

Figure 28:
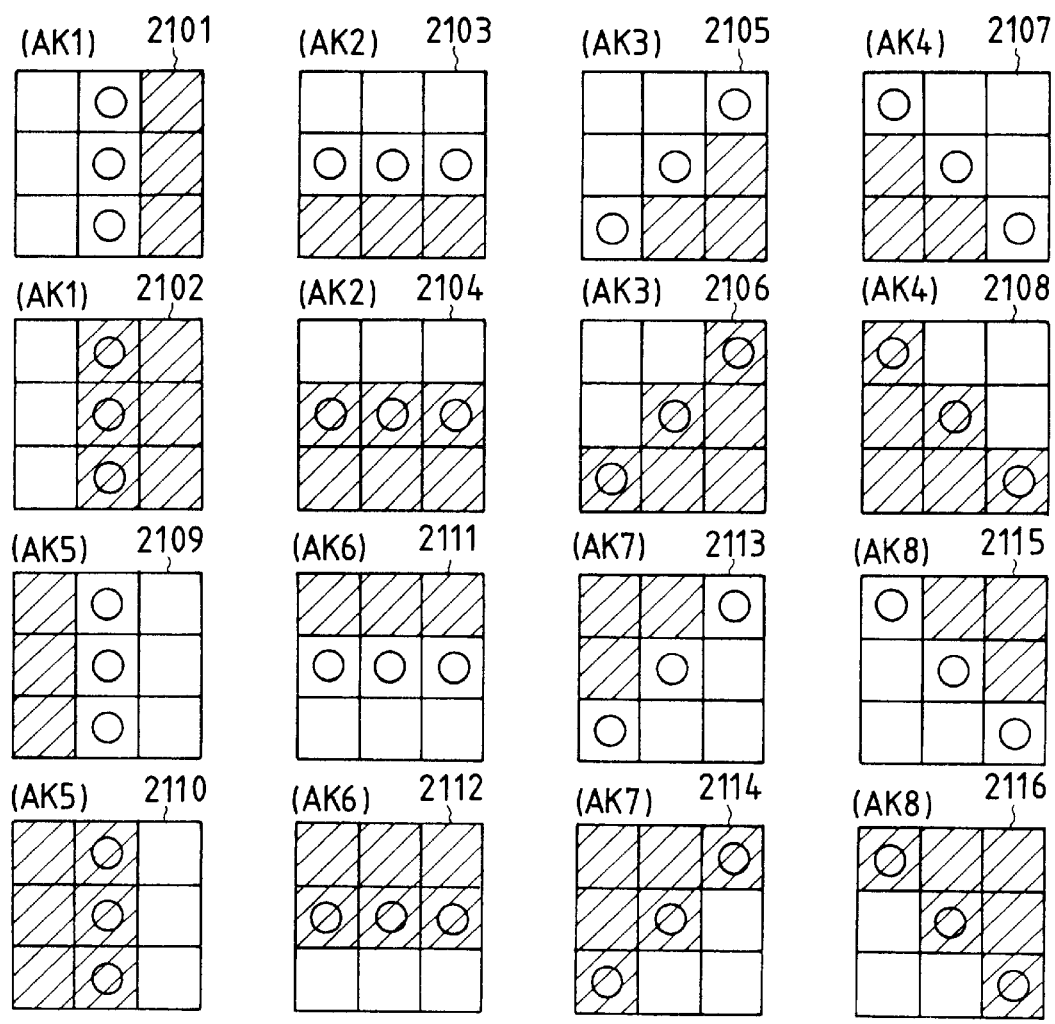
FIG. 28 is a view for explaining density change characteristic judgement patterns according to the present invention.

More specifically, in processing for detecting a vertical edge on the right side of which a high density area is present like in the pixel block 1905 in FIG. 26, density change data AK1 in which points having large differences $J_1$ in equations (6) continue in the vertical direction (hatched pixels in pixel blocks 2101 and 2102 in FIG. 28) is output.

In processing for detecting a horizontal edge under which a high density area is present like in the pixel block 1906 in FIG. 26, density change data AK2 in which points having large differences $J_2$ in equations (6) continue in the horizontal direction (hatched pixels in pixel blocks 2103 and 2104 in FIG. 28) is output.

In processing for detecting an obliquely right edge on the lower right side having a high density area like in the pixel block 1907 in FIG. 26, density change data AK3 in which points having large differences $J_3$ in equations (6) continue in the horizontal direction (hatched pixels in pixel blocks 2105 and 2106 in FIG. 28) is output. In processing for detecting an obliquely left edge on the lower left side having a high density area like in the pixel block 1908 in FIG. 26, density change data AK4 in which points having large differences $J_4$ in equations (6) continue in the obliquely left direction (hatched pixels in pixel blocks 2107 and 2108 in FIG. 28) is output.

Furthermore, in processing for detecting a vertical edge on the left side having a high density area like in the pixel block 1909 in FIG. 26, density change data AK5 in which points having large differences $J_5$ in equations (6) continue in the vertical direction (hatched pixels in pixel blocks 2109 and 2110 in FIG. 28) is output.

In processing for detecting a horizontal edge above which a high density area is present like in the pixel block 1910 in FIG. 26, density change data AK6 in which points having large differences $J_6$ in equations (6) continue in the horizontal direction (hatched pixels in pixel blocks 2111 and 2112 in FIG. 28) is output.

In processing for detecting an obliquely right edge on the upper left side having a high density area like in the pixel block 1911 in FIG. 26, density change data AK7 in which points having large differences $J_7$ in equations (6) continue in the vertical direction (hatched pixels in pixel blocks 2113 and 2114 in FIG. 28) is output.

In processing for detecting an oblique left edge on the upper right side having a high density area like in the pixel block 1912 in FIG. 26, density change data AK8 in which points having large differences $J_8$ in equations (6) continue in the obliquely left direction (hatched pixels in pixel blocks 2115 and 2116 in FIG. 28) is output.

Pixel blocks 1909 to 1912 in the halftone area 1903 have the large differences $J_1$ to $J_8$, but have less continuity in a specific direction. The halftone area (screen area) shows a feature pattern depending on a specific combination of density changes in specific directions, and is detected independently of an edge.

Figure 29B:
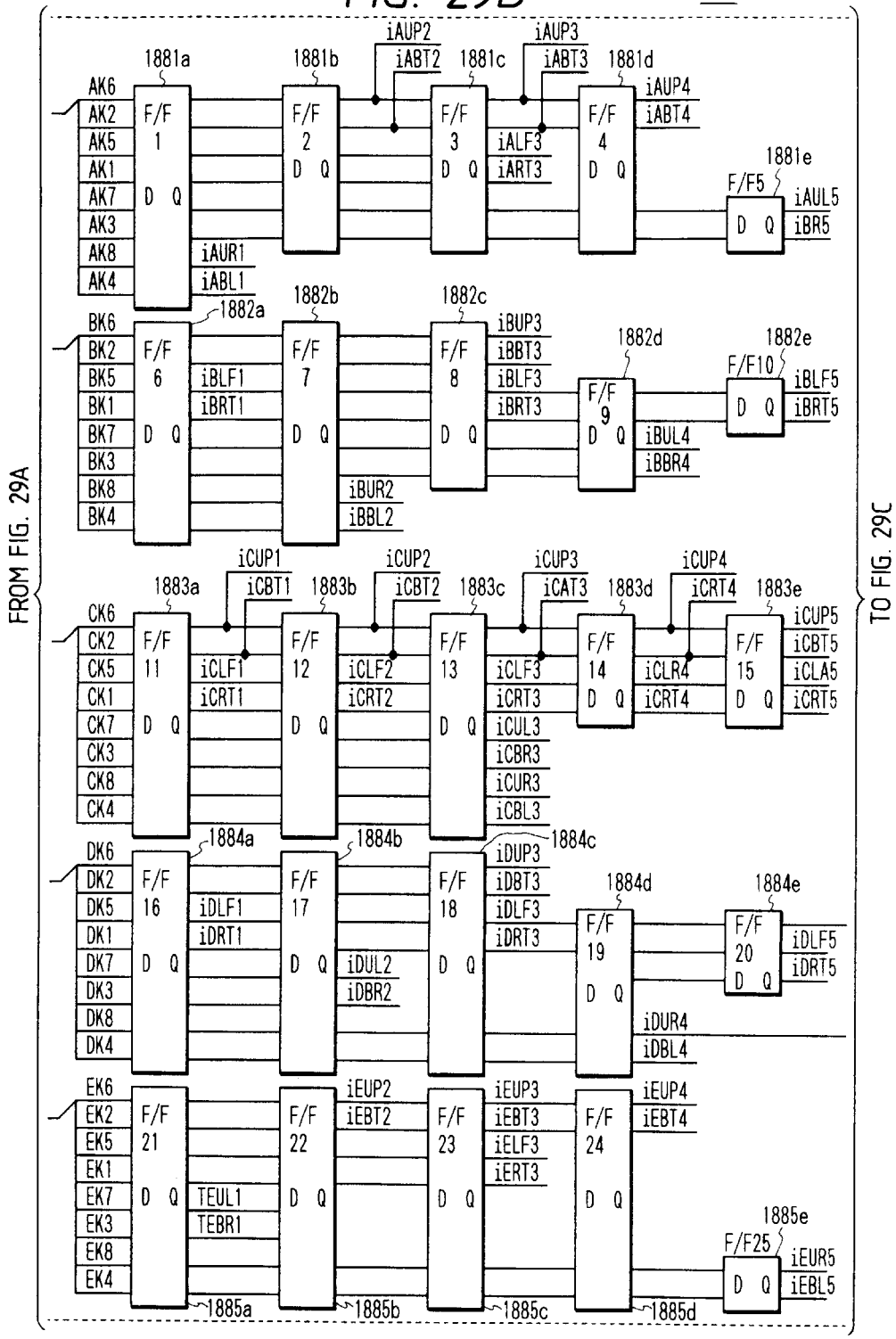
FIG. 29 is a block diagram for explaining a detailed arrangement of a character edge judgement unit shown in FIG. 7.

FIG. 29 is a block diagram for explaining a detailed arrangement of the character edge judgement unit 107 shown in FIG. 7, and the same reference numerals in FIG. 29 denote the same parts as in FIG. 24.

Figure 30A:
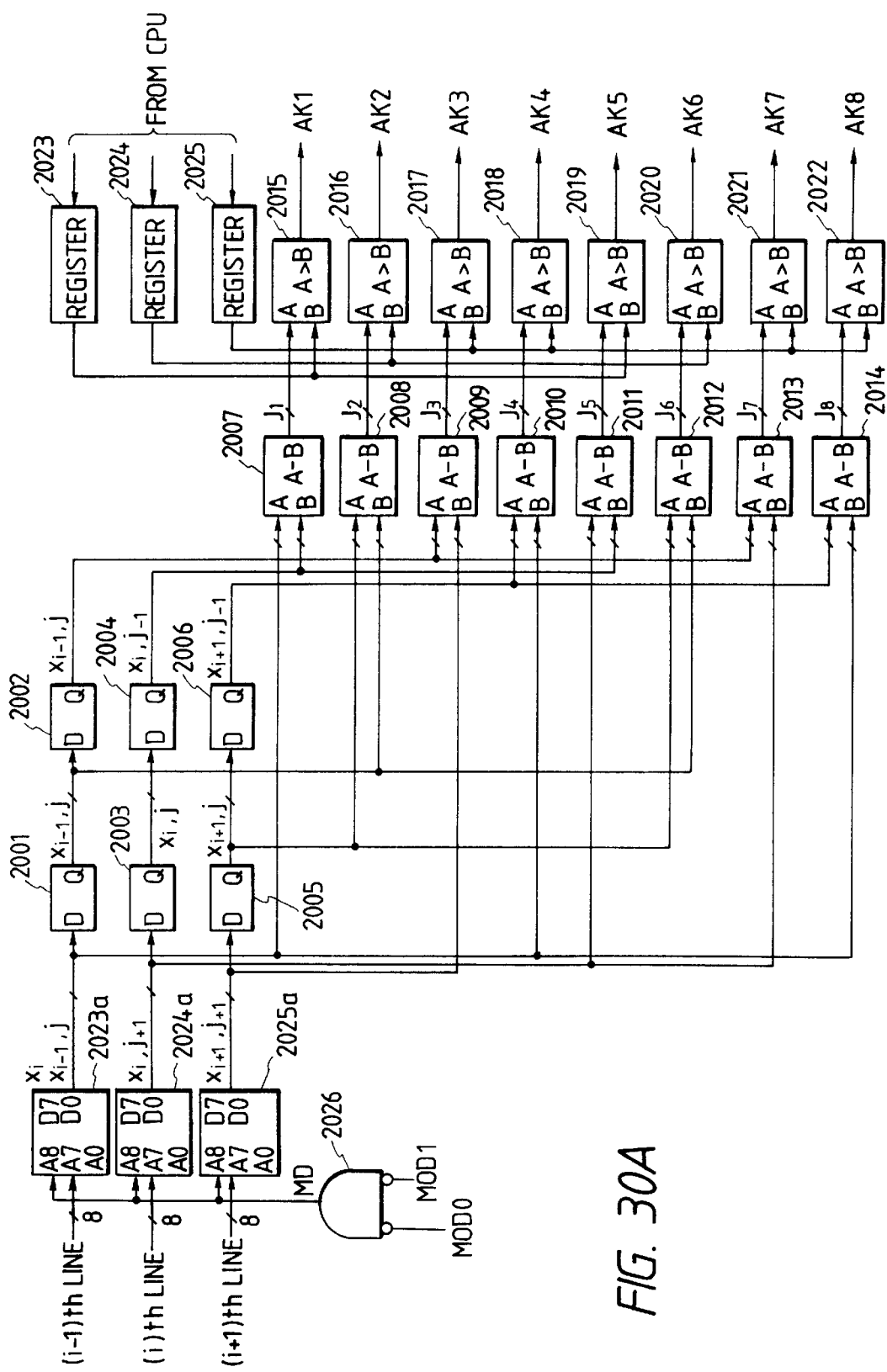
FIGS. 30A to 30F are circuit diagrams for explaining a detailed arrangement of a detector shown in FIG. 29.

In FIG. 29, line memories 1803 and 1804 sequentially delay the image signal 314 (G signal) in synchronism with the horizontal sync signal HSYNC. A delay circuit 1805 comprises flip-flops, comparators, registers, and the like, as shown in FIG. 30A, and outputs the density change data AK1 to AK8 defined by condition (7-1)≦(7-8) by the above-mentioned difference processing.

Line memories 1806 to 1809 delay the density change data AK1 to AK8 output from the delay circuit 1805 in synchronism with the horizontal sync signal HSYNC. The density change data AK1 to AK8, BK1 to BK8, CK1 to CK8, DK1 to DK8, and EK1 to EK8 for five lines are input to flip-flops 1881a to 1881e, 1882a to 1882e, 1883a to 1883e, 1884a to 1884e, and 1885a to 1885e in correspondence with the lines to check pixel distribution direction characteristics in respective directions. The flip-flops 1881a to 1881e output direction characteristic factor data iAUR1, iABL1, iAUP2, iABT2, iAUP3, iABT3, iALF3, iART3, iAUP4, iABT4, iAUL5, and iBR5 to NAND gates 1809a to 1824a or the screen processing unit 1802b shown in FIG. 33, as shown in FIG. 29. The flip-flops 1882a to 1882e output pixels iBLF1, iBRT1, iBUR2, iBBL2, iBUP3, iBBT3, IBLF3, iBRT3, iBUL4, iCBT4, iBLF5, and iBRT5 serving as direction characteristic factor data to the next NAND gates 1809 to 1824 on the screen processing unit 1802b (FIG. 33), as shown in FIG. 29.

Furthermore, the flip-flops 1883a to 1883e output pixels iCUP1, iCBT1, iCLF1, iCRT1, iCUP2, iCBT2, iCLF2, iCRT2, iCUP3, iCBT3, iCLF3, iCRT3, iCUL3, iCBR3, iCUR3, iCBL3, iCUP4, iCBT4, iCLF4, iCRT4, iCUP5, iCBT5, iCLF5, and iCRT5 serving as direction characteristic factor data to the next NAND gates 1809a to 1824a or the screen processing unit 1802b (FIG. 33), as shown in FIG. 29.

The flip-flops 1884a to 1884e output pixels iDLF1, iDRT1, iDUL2, iDBR2, iDUP3, iDBT3, iDFL3, iDRT3, iDUR4, iDBL4, iDLF5, and iDRT5 serving as direction characteristic factor data to the next NAND gates 1809a to 1824a or the screen processing unit 1802b (FIG. 33), as shown in FIG. 29.

The flip-flops 1885a to 1885e output pixels iEUL1, iEBR1, iEUP2, iEBT2, iEUP3, iEBT3, iELF3, iERT3, iEUP4, iEBT4, iEUR5, and iEBL5 serving as direction characteristic factor data to the next NAND gates 1809a to 1824a or the screen processing unit 1802b (FIG. 33), as shown in FIG. 29.

A NOR gate 1825 logically NORs the outputs from the NAND gates 1809a to 1824a. When the central pixel constitutes a continuous edge, the NOR gate 1825 outputs the edge detection signal EDGE0 to the edge judgement unit 18022.

$$AK1 = \begin{cases} 1 & \text{if } J_1 > T_1 \\ 0 & \text{if } J_1 \le T_1 \end{cases} \qquad (7\text{-}1)$$
(right)

$$AK2 = \begin{cases} 1 & \text{if } J_2 > T_2 \\ 0 & \text{if } J_2 \le T_2 \end{cases} \qquad (7\text{-}2)$$
(below)

-continued $$AK3 = \begin{cases} 1 & \text{if } J_3 > T_3 \\ 0 & \text{if } J_3 \leq T_3 \end{cases} \quad (7\text{-}3)$$
(lower right)

$$AK4 = \begin{cases} 1 & \text{if } J_4 > T_4 \\ 0 & \text{if } J_4 \leq T_4 \end{cases} \quad (7\text{-}4)$$
(lower left)

$$AK5 = \begin{cases} 1 & \text{if } J_5 > T_5 \\ 0 & \text{if } J_5 \leq T_5 \end{cases} \quad (7\text{-}5)$$
(left)

$$AK6 = \begin{cases} 1 & \text{if } J_6 > T_6 \\ 0 & \text{if } J_6 \leq T_6 \end{cases} \quad (7\text{-}6)$$
(lower left)

$$AK7 = \begin{cases} 1 & \text{if } J_7 > T_7 \\ 0 & \text{if } J_7 \leq T_7 \end{cases} \quad (7\text{-}7)$$
(upper left)

$$AK8 = \begin{cases} 1 & \text{if } J_8 > T_8 \\ 0 & \text{if } J_8 \leq T_8 \end{cases} \quad (7\text{-}8)$$
(upper right)

$T_1$ to $T_8$ in the above relations represent predetermined slice levels. When the density change data AK1 to AK8 are "1", this corresponds to the presence of a steep density change, and when the density change data AK1 to AK8 are "0", this corresponds to the absence of a steep density change. Note that $T_1$ to $T_3$ are values for defining the first to third judgement conditions, and can be varied in correspondence with the original mode set at the operation unit.

More specifically, the density change point detection unit 1801 is arranged as shown in FIGS. 30A to 30F.

FIG. 30A is a block diagram for explaining a detailed arrangement of the delay circuit 1805 shown in FIG. 29, and the same reference numerals in FIG. 30A denote the same parts as in FIG. 29.

The image signal 314 is delayed by the line memories 1803 and 1804, and delayed signals are output to density conversion ROMs 2023a to 2025a. The density conversion ROMs 2023a to 2025a store judgement density level data (look-up tables) selected by a switching control signal MD output from a NOR gate 2026 according to the mode signals MOD0 and MOD1 output from the CPU 1871, and are addressed by the 8-bit image signal 314, thereby outputting any judgement density level data to flip-flops 2001 to 2006.

The flip-flops 2001 to 2006 output pixel signals (density level signals) corresponding to pixels $x_{i-1,j-1}$, $x_{i-1,j}$, $x_{i-1,j+1}$, $x_{i,j-1}$, $x_{i,j+1}$, $x_{i+1,j-1}$, $x_{i+1,j}$, and $x_{i+1,j+1}$ around a density converted objective pixel $x_{ij}$ to subtracters 2007 to 2014. The differences $J_1$ to $J_8$ output from these subtracters 2007 to 2014 are supplied to comparators 2015 to 2022, thus outputting the density change data AK1 to AK8. Registers 2023 to 2025 hold the slice levels $T_1$ to $T_3$ output from, e.g., the CPU 1871. When the slice levels $T_1$ to $T_3$ are varied, the judgement conditions can also be varied, thus setting various degrees of catching a character edge.

Figure 31:
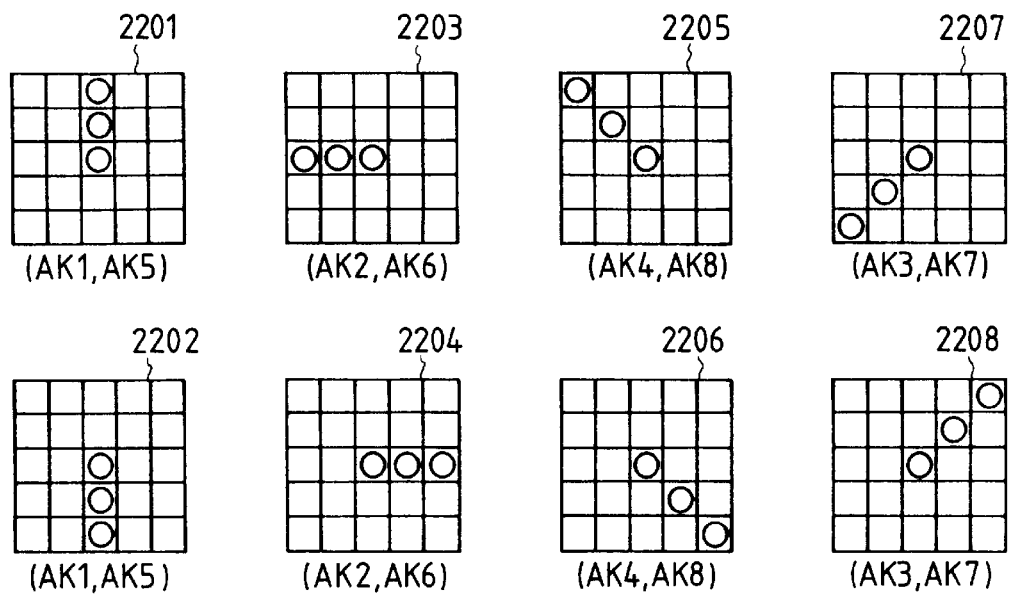
FIG. 31 is a view for explaining specific pixel patterns detected by a density change processing unit shown in FIG. 29.

Whether or not a steep density change continues in a direction defining an angle of, e.g., 90° with a direction of the density change is determined by executing continuity judgement processing in a specific direction of the density change data AK1 to AK8 in the density change point detection unit 1802 while assuming, e.g., a 5×5 pixel block shown in FIG. 31.

Figure 30B:
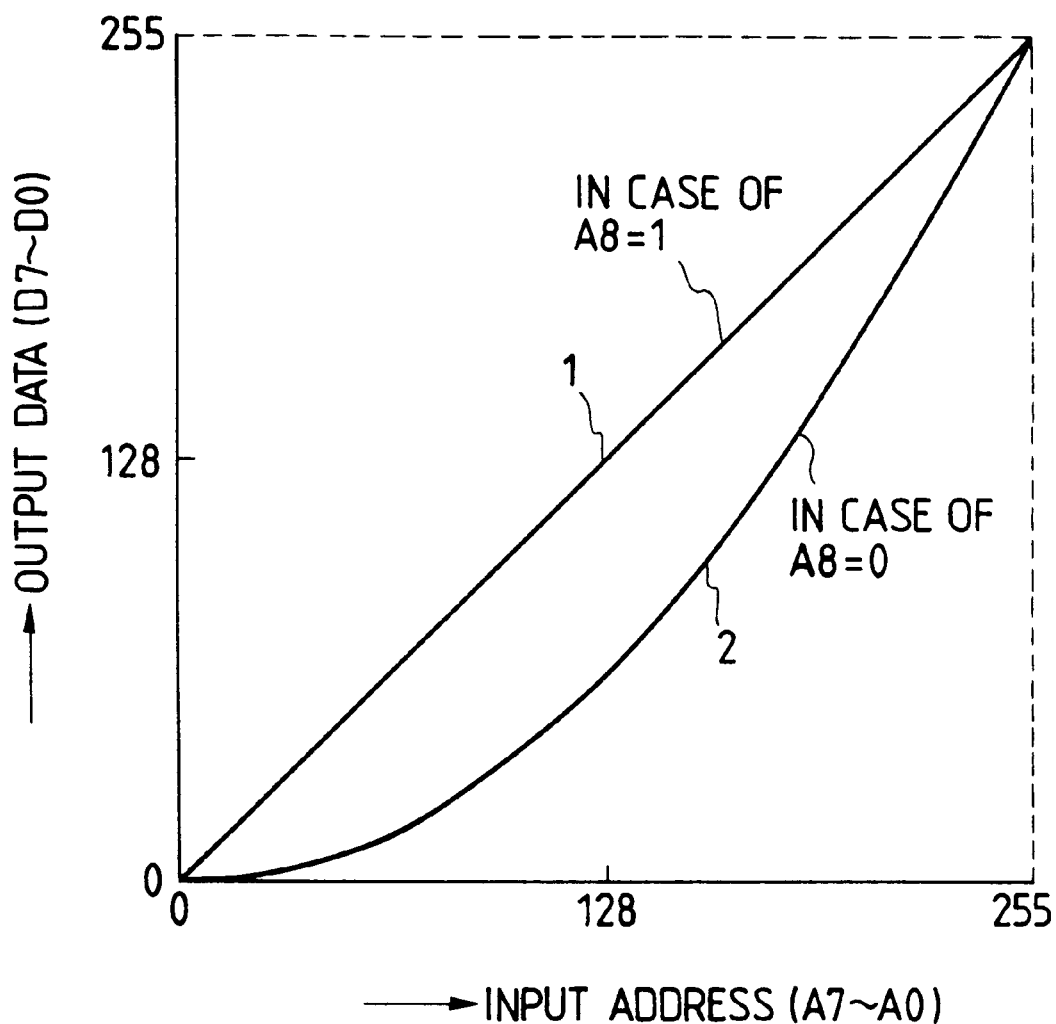

FIG. 30B is a view for explaining conversion table data in the density conversion ROMs 2023a to 2025a shown in FIG. 30A. In FIG. 30B, an input address is plotted along the abscissa, and output data is plotted along the ordinate.

As can be seen from FIG. 30B, when the switching control signal MD is "1" (input A8="1"), conversion characteristics ① (through mode) which yield y=x where y is the output and x is the input are selected, and the input density level is set to be equal to the output density level.

When the switching control signal MD is "0" (input A8="0"), conversion characteristics ② which yield $y=(x/255)^2 \times 255$ where x is the input are selected.

In this case, a characteristic relation given by a quadratic curve is established, and the total derivative of y is given by $\Delta y = 2 \times (X/255) \cdot \Delta x$. Therefore, the selected characteristics eliminate an amplitude in a dark (high density) portion, and amplify the amplitude in a bright (low density) portion.

More specifically, the judgement density level is varied so that a detection ratio of high density level pixel vs. low density pixel is set to preferentially process a low density pixel.

Furthermore, the switching control signal MD goes to "1" only when both the mode signals MOD0 and MOD1 are "0". Therefore, only when the map mode is set, the through mode is set, and when other original modes are set, a density level is converted based on characteristics corresponding to the quadratic curve, and density pixel signals are output to the flip-flops 2001 to 2006. Thus, in an original mode other than the map mode, a density change of a character in a bright background can be easily detected, and a density change in a screen portion is not easily detected.

When the map mode is set, a character in a screen portion can be faithfully detected.

Figure 30C:
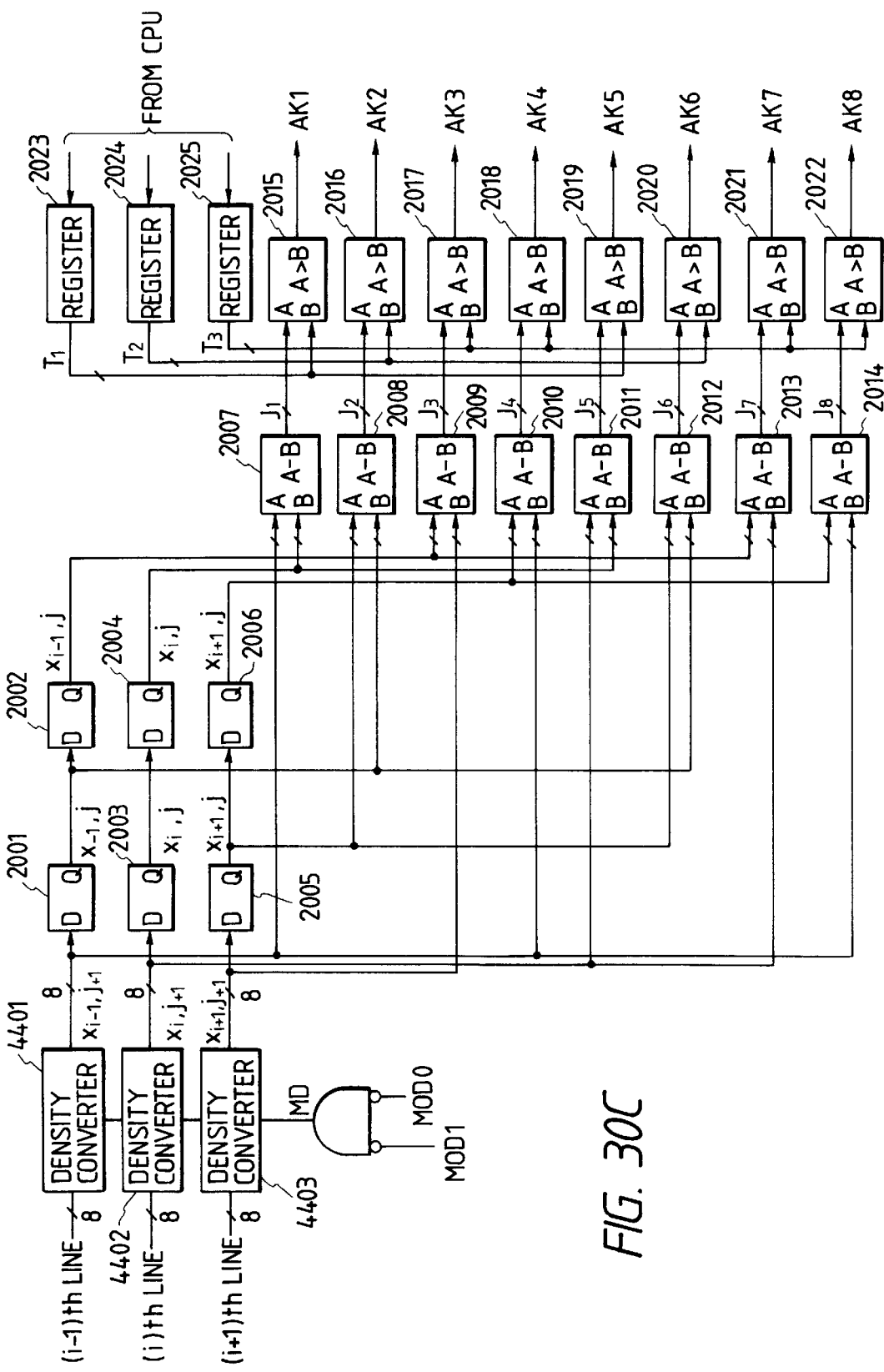
Figure 30D:
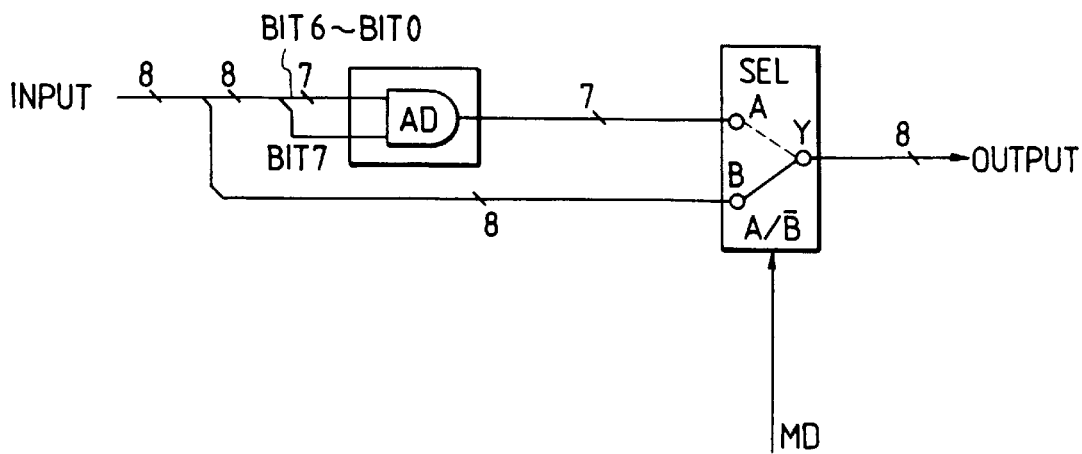

FIGS. 30C and 30D are respectively a circuit diagram and a principal part circuit diagram for explaining another detailed arrangement of the delay circuit 1805 shown in FIG. 29, and the same reference numerals in FIGS. 30C and 30D denote the same parts as in FIG. 29.

In FIGS. 30C and 30D, each of density converters 4401 to 4403 comprises an AND gate AD and a selector SEL. The seletor SEL selects an input A or B according to the switching control signal MD.

Figure 30E:
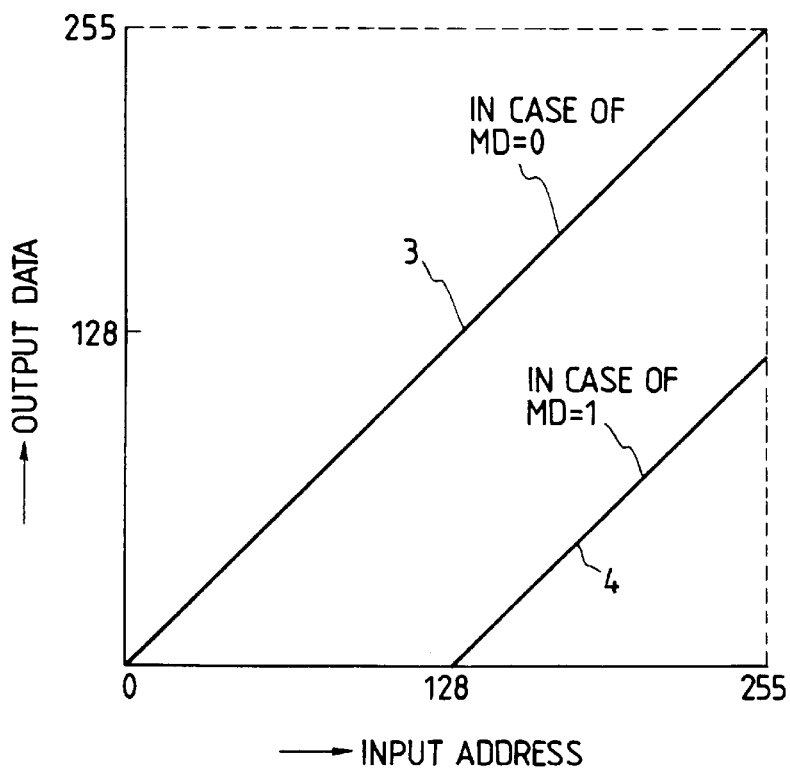

More specifically, when the switching control signal MD is "0", the input image signal 314 is converted based on conversion characteristics ③ shown in FIG. 30E (through mode). When the switching control signal MD is "1", an AND product (7 bits) of 7 bits and one bit serves as a conversion signal, and outputs a density pixel signal to the corresponding one of the flip-flops 2001 to 2006. More specifically, ranges below a range 128 become nonsensitive to a density. Thus, like in the above embodiment, the amplitude of a high density portion is reduced, and as a result, a character detection error in a screen portion can be prevented in a mode other than the map mode.

Figure 30F:
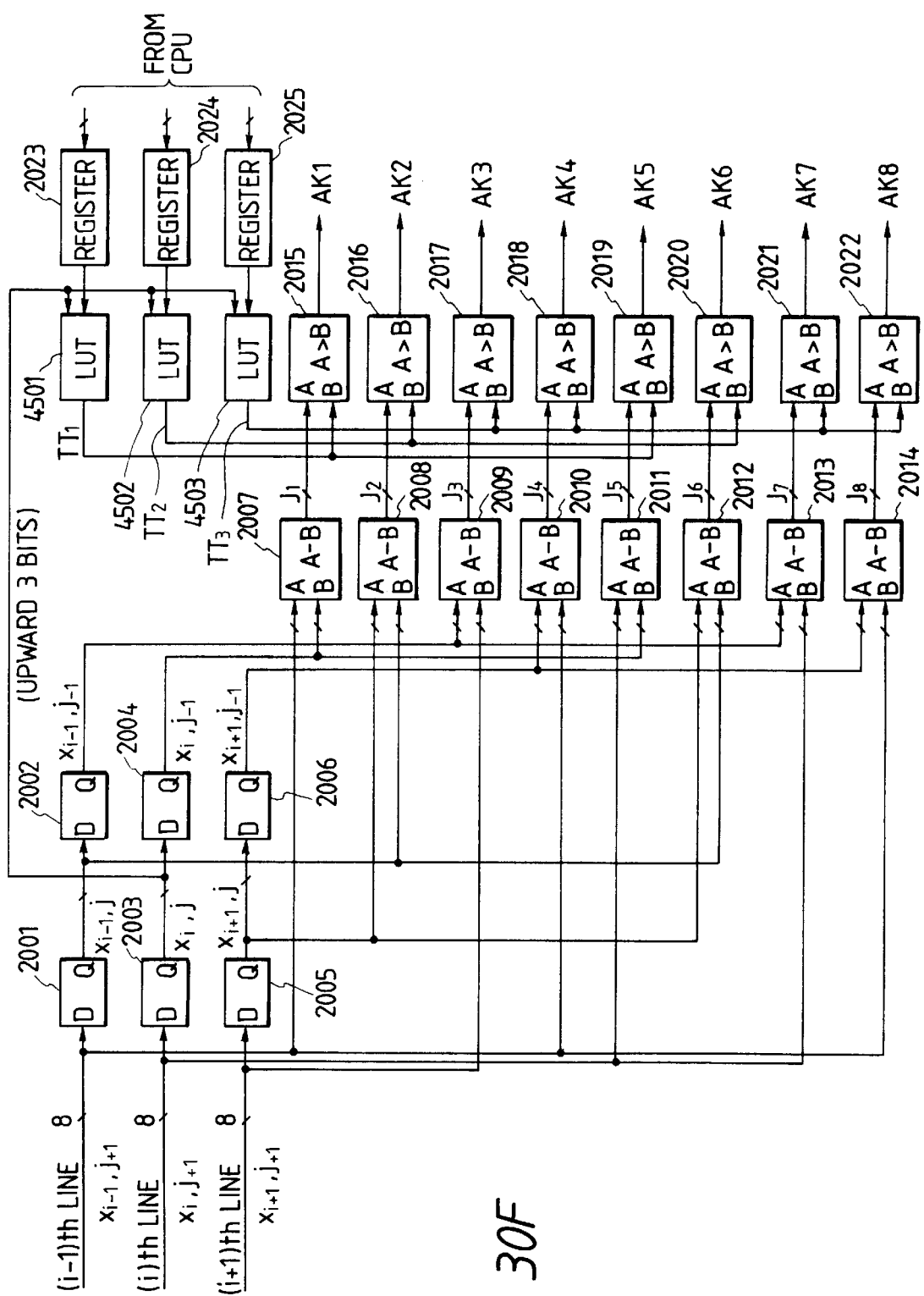

FIG. 30F is a circuit diagram showing still another detailed arrangement of the delay circuit 1805 shown in FIG. 29, and the same reference numerals in FIG. 30F denote the same parts as in FIG. 29.

The circuit shown in FIG. 30F includes look-up tables 4501 to 4503. In this circuit, upward three bits of the central pixel signal $x_{ij}$ latched by the flip-flops 2001 to 2006, and comparison values $TT_1$ to $TT_3$ set in comparators 2015 to 2022 based on the slice levels $T_1$ to $T_3$ output from the CPU 1871 can be varied, so that the density level can be evaluated with different judgement references.

For example, the relationships between the comparison values are:

$$\begin{cases} TT_1 = \{(7-\alpha)/4\} \times T_1 \\ TT_2 = \{(7-\alpha)/4\} \times T_2 \\ TT_3 = \{(7-\alpha)/4\} \times T_3 \end{cases}$$

where α corresponds to upward three bits of the pixel signal $x_{ij}$, and α takes a value between 0 to 7.

FIG. 31 is a view for explaining specific pixel patterns detected by the density change processing unit 1802a shown in FIG. 24. Pixel blocks 2201 to 2208 are 5×5 pixel blocks each having an objective pixel as a central pixel.

In FIG. 31, the pixel blocks 2201 and 2202 represent reference pixels for detecting continuity of a vertical edge, and correspond to a case wherein it is detected that three pixels whose feature of a change in density of surrounding pixels is represented by the density change data AK1 or AK5 appear continuously.

The pixel blocks 2203 and 2204 similarly correspond to a case wherein it is detected that three pixels whose feature of a change in density of surrounding pixels is represented by the density change data AK2 or AK6 appear continuously.

The pixel blocks 2205 and 2206 similarly correspond to a case wherein it is detected that three pixels whose feature of a change in density of surrounding pixels is represented by the density change data AK4 or AK8 appear continuously.

The pixel blocks 2207 and 2208 similarly correspond to a case wherein it is detected that three pixels whose feature of a change in density of surrounding pixels is represented by the density change data AK3 or AK7 appear continuously.

Figure 32:
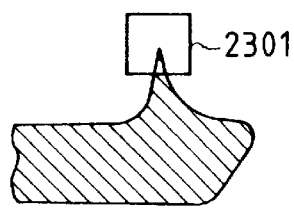
FIG. 32 is a view for explaining character edge judgement processing in the density change processing unit shown in FIG. 29.

In this embodiment, when continuity of a change in density is detected, the objective pixel is not used as the center of continuity judgement since pixels constituting an edge portion 2301 of a character shown in FIG. 32 is judged as a pixel included in a continuous edge.

The NAND gate 1809a detects that the feature of the density change data AK6 continuously appears in the form of the pixel block 2203.

The NAND gate 1810a detects that the feature of the density change data AK6 continuously appears in the form of the pixel block 2204.

The NAND gate 1811a detects that the feature of the density change data AK2 continuously appears in the form of the pixel block 2203.

The NAND gate 1812a detects that the feature of the density change data AK6 continuously appears in the form of the pixel block 2204.

The NAND gate 1813a detects that the feature of the density change data AK5 continuously appears in the form of the pixel block 2201.

The NAND gate 1814a detects that the feature of the density change data AK5 continuously appears in the form of the pixel block 2202.

The NAND gate 1815a detects that the feature of the density change data AK1 continuously appears in the form of the pixel block 2201.

The NAND gate 1816a detects that the feature of the density change data AK1 continuously appears in the form of the pixel block 2202.

The NAND gate 1817a detects that the feature of the density change data AK7 continuously appears in the form of the pixel block 2208.

The NAND gate 1818a detects that the feature of the density change data AK7 continuously appears in the form of the pixel block 2207.

The NAND gate 1819a detects that the feature of the density change data AK3 continuously appears in the form of the pixel block 2208.

The NAND gate 1820a detects that the feature of the density change data AK3 continuously appears in the form of the pixel block 2207.

The NAND gate 1821a detects that the feature of the density change data AK8 continuously appears in the form of the pixel block 2205.

The NAND gate 1822a detects that the feature of the density change data AK8 continuously appears in the form of the pixel block 2206.

The NAND gate 1823a detects that the feature of the density change data AK4 continuously appears in the form of the pixel block 2205.

The NAND gate 1824a detects that the feature of the density change data AK4 continuously appears in the form of the pixel block 2206.

In this manner, the NAND gates 1809a to 1824a detect continuity of sets of three pixels respectively including central pixels CUP3, CBT3, CLF3, CRT3, CUL3, CBR3, CUR3, and CBL3 as edge portions, and the edge detection signal EDGE0 indicating that the central pixel constitutes a continuous edge to the edge judgement unit 18022.

Figure 33:
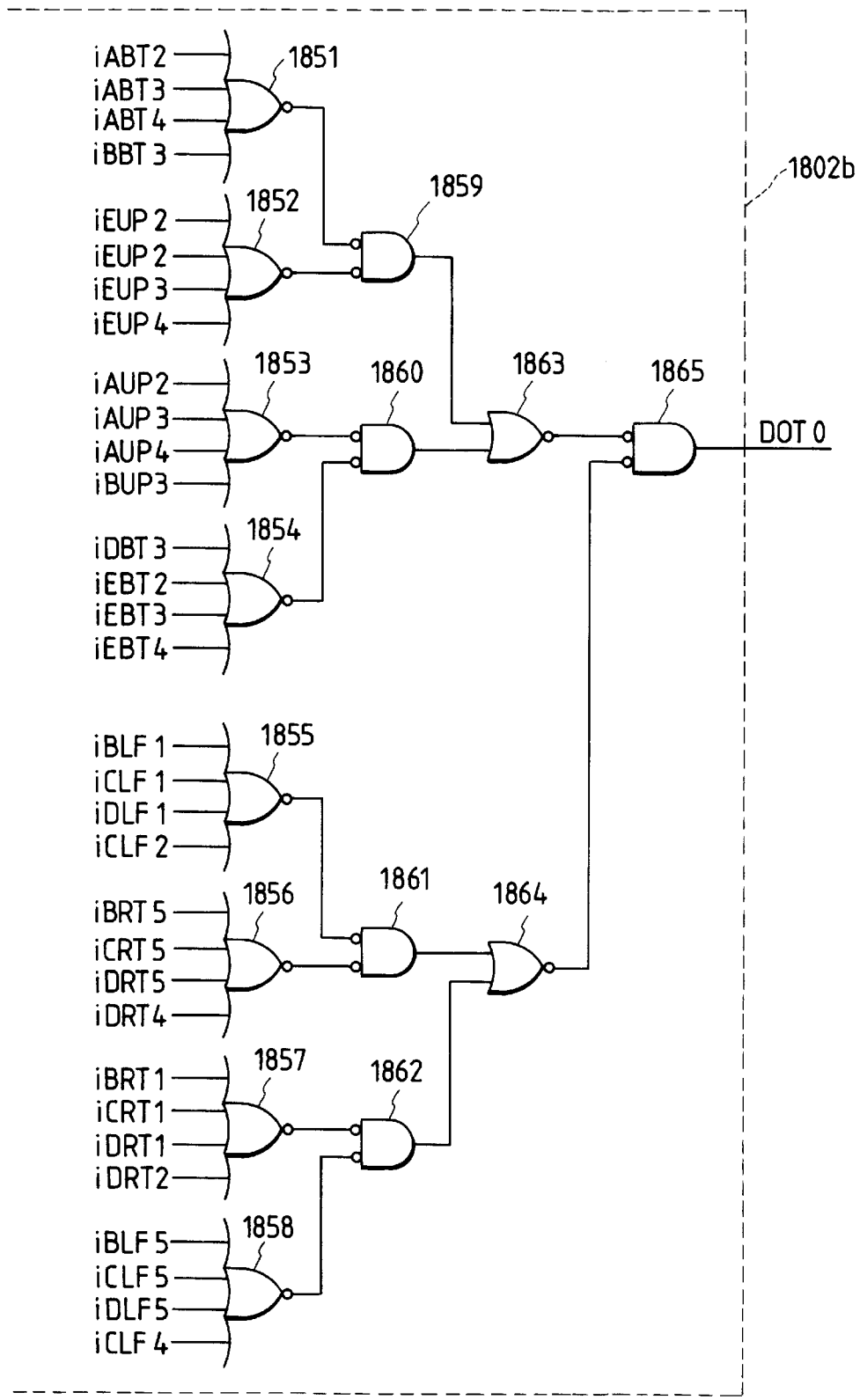
FIG. 33 is a block diagram for explaining a detailed arrangement of a screen processing unit shown in FIG. 24.

FIG. 33 is a block diagram for explaining an arrangement of the screen processing unit 1802b shown in FIG. 24. The circuit shown in FIG. 33 includes NOR gates 1851 to 1858, 1863, and 1864. The NOR gates 1851 to 1858 receive pixel signals processed by the density change point processing unit 1802a, and extract specific combinations of changes in density in specific directions of the input image signal 314 as a screen image.

The circuit shown in FIG. 33 also includes gate circuits 1859 to 1862 and 1865.

In the circuit with the above arrangement, the NOR gates 1851 to 1858 and the like detect whether or not there are changes in density of pixels corresponding to pixel groups 2251 to 2254 each consisting of four pixels, so that the screen detection signal DOT0 indicating that an objective pixel 2250 is a pixel in a screen image to the screen signal area processing unit 18021.

More specifically, the output from the NOR gate 1851 indicates that there is a downward change in density of at least one pixel in the pixel group 2254. The output from the NOR gate 1852 indicates that there is an upward change in density of at least one pixel in the pixel group 2253. The output from the NOR gate 1853 indicates that there is an upward change in density of at least one pixel in the pixel group 2254. The output from the NOR gate 1854 indicates that there is a downward change in density of at least one pixel in the pixel group 2254. The output from the NOR gate 1855 indicates that there is a left change in density of at least one pixel in the pixel group 2251. The output from the NOR gate 1857 indicates that there is a left change in density of at least one pixel in the pixel group 2252. The output from the NOR gate 1858 indicates that there is a left density change of at least one pixel in the pixel group 2251.

These outputs are locally calculated by the gate circuits 1859 to 1862 and 1865, and the NOR gates 1863 and 1864, thus finally allowing screen judgement shown in FIGS. 35A to 35D.

Figure 34:
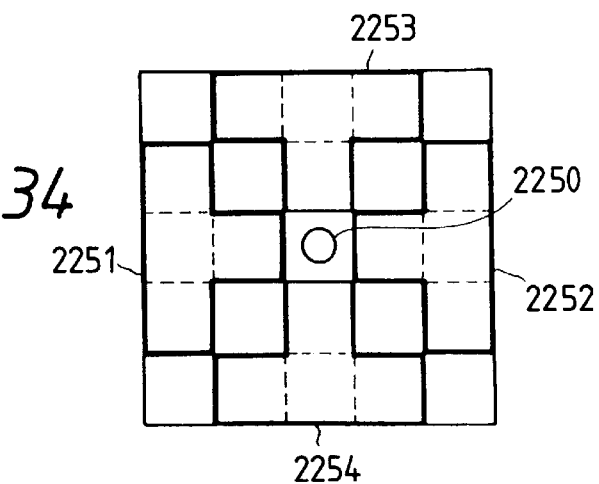
FIG. 34 is a view for explaining a screen detection pattern according to the present invention.

FIGS. 35A to 35D are views for explaining screen judgement patterns of the objective pixel 2250 shown in FIG. 34.

In FIGS. 35A to 35D, each of ⇒, ⇐, ⇑, and ⇓ represents that a density change of at least one pixel is present in a direction indicated by a corresponding arrow in the pixel groups 2251 to 2254.

Figure 35A:
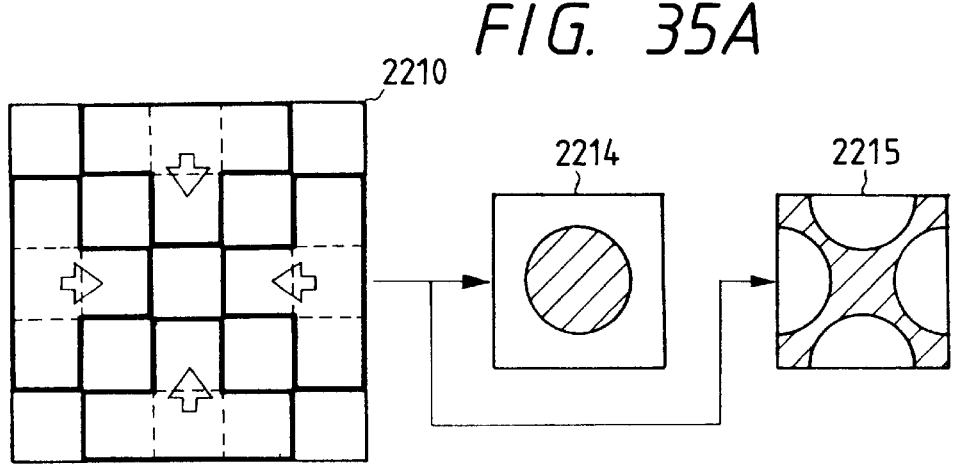
FIGS. 35A to 35D are views for explaining screen judgement patterns of an objective pixel shown in FIG. 34.
Figure 35B:
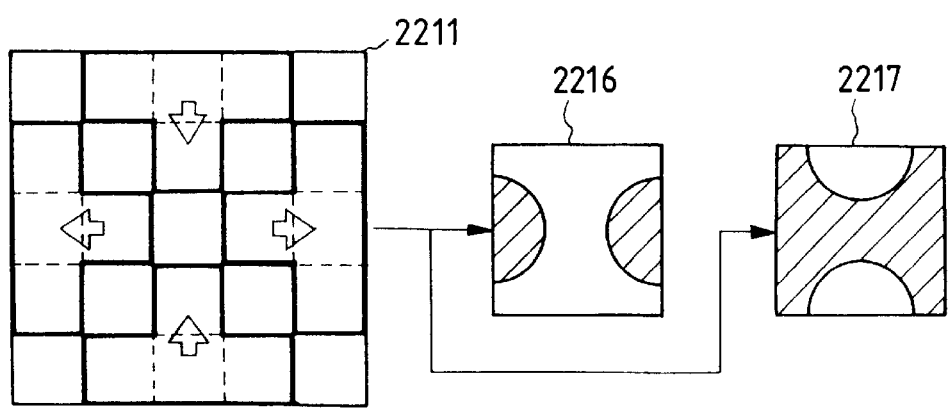
Figure 35C:
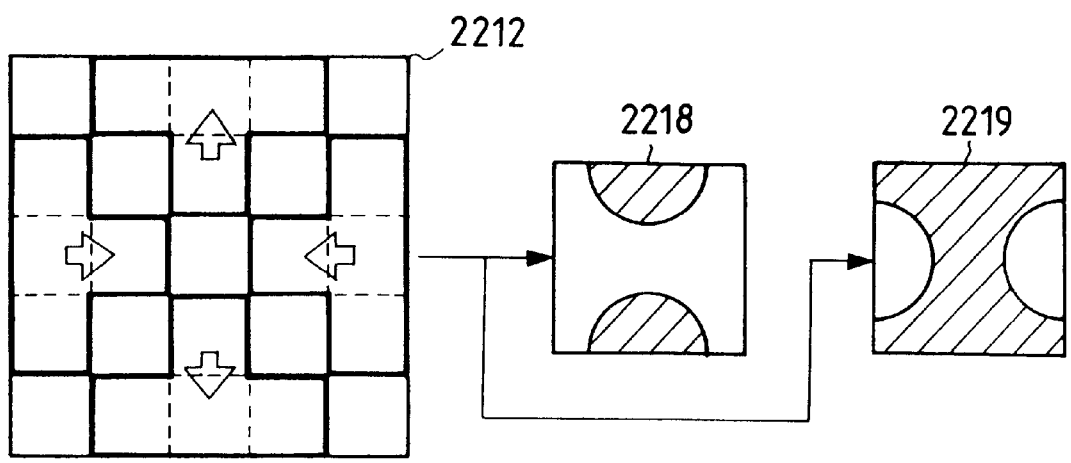
Figure 35D:
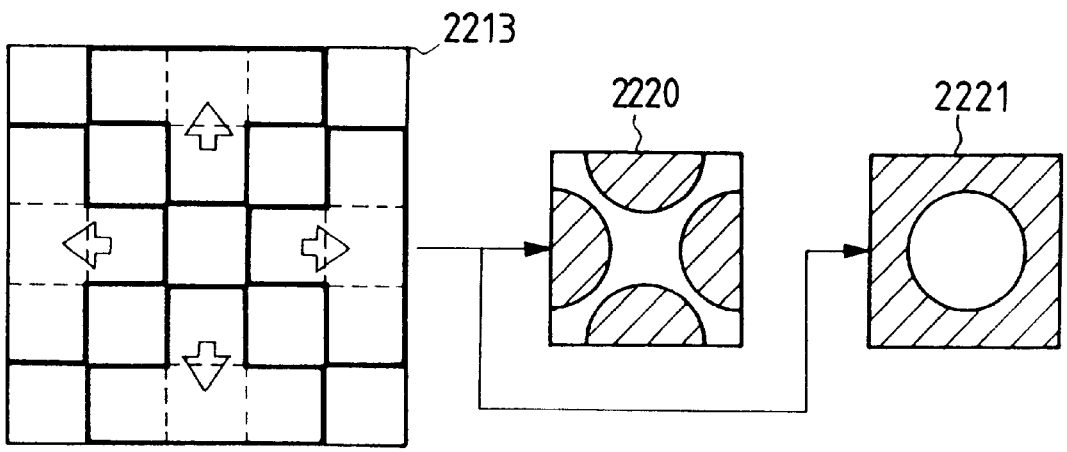

As a result, when a direction shown in FIG. 35A is detected, it is detected that a screen pattern 2214 or 2215 is present with respect to the objective pixel 2250, and the screen detection signal DOT0 is set to be "1".

The arrangement and operation of the screen signal area processing unit 18021 for processing the screen detection signal DOT0 will be described below.

Figure 36:
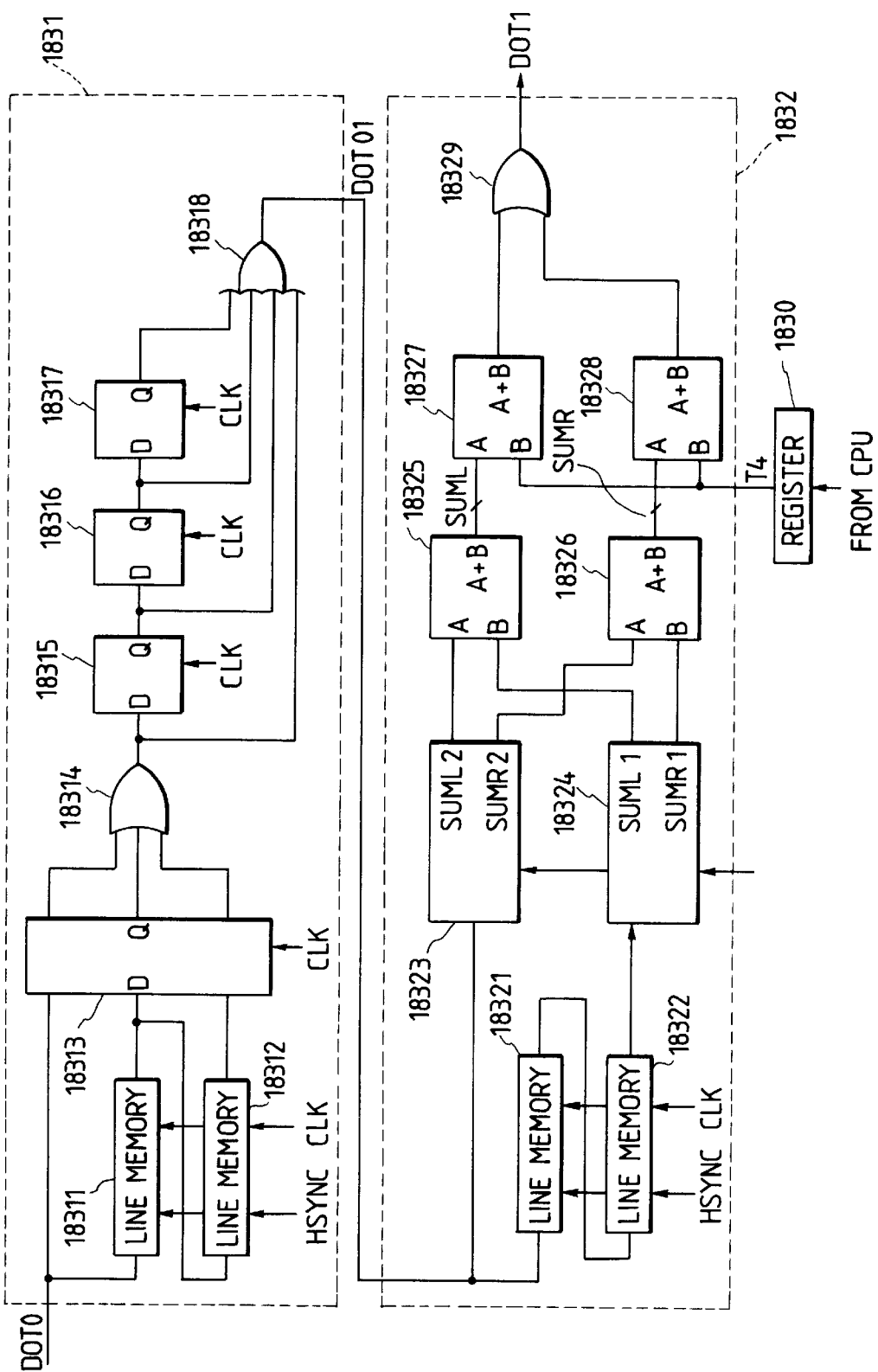
FIG. 36 is a circuit diagram for explaining an arrangement of a screen signal area processing unit shown in FIG. 24.

FIG. 36 is a circuit diagram for explaining the arrangement of the screen signal area processing unit 18021 shown in FIG. 24. A judgement unit 1831 judges if at least one pixel which sets the screen detection signal DOT0 to be "1" is present in a 4×3 window including the objective pixel. If such a pixel is present, a screen detection internal signal DOT01 is set to be "1"; otherwise, the screen detection internal signal DOT01 is set to be "0".

Line memories 18311 and 18312 delay input signals by one line each. A flip-flop 18313 simultaneously receive dot detection signals DOT0 of three lines. An OR gate 18314, flip-flops 18315, 18316, and 18317 delay input signals by one clock each, and their outputs are input to an OR gate 18318, thereby outputting the screen detection internal signal DOT01 to an area processing unit 1832.

In the area processing unit 1832, line memories 18321 and 18322 delay input signals by one line each. Calculators 18323 and 18324, and adders 18325 and 18326 output sampling sums SUML and SUMR. Comparators 18327 and 18328 compare input signals with a slice level set in a register 1830. When inputs A and B satisfy relation A>B, the output from each comparator goes to H level. The outputs from the comparators are logically ORed by a gate circuit 18329, thereby outputting the screen area signal DOT1.

The operation of the circuit with the above arrangement will be described below with reference to FIG. 37.

Figure 37:
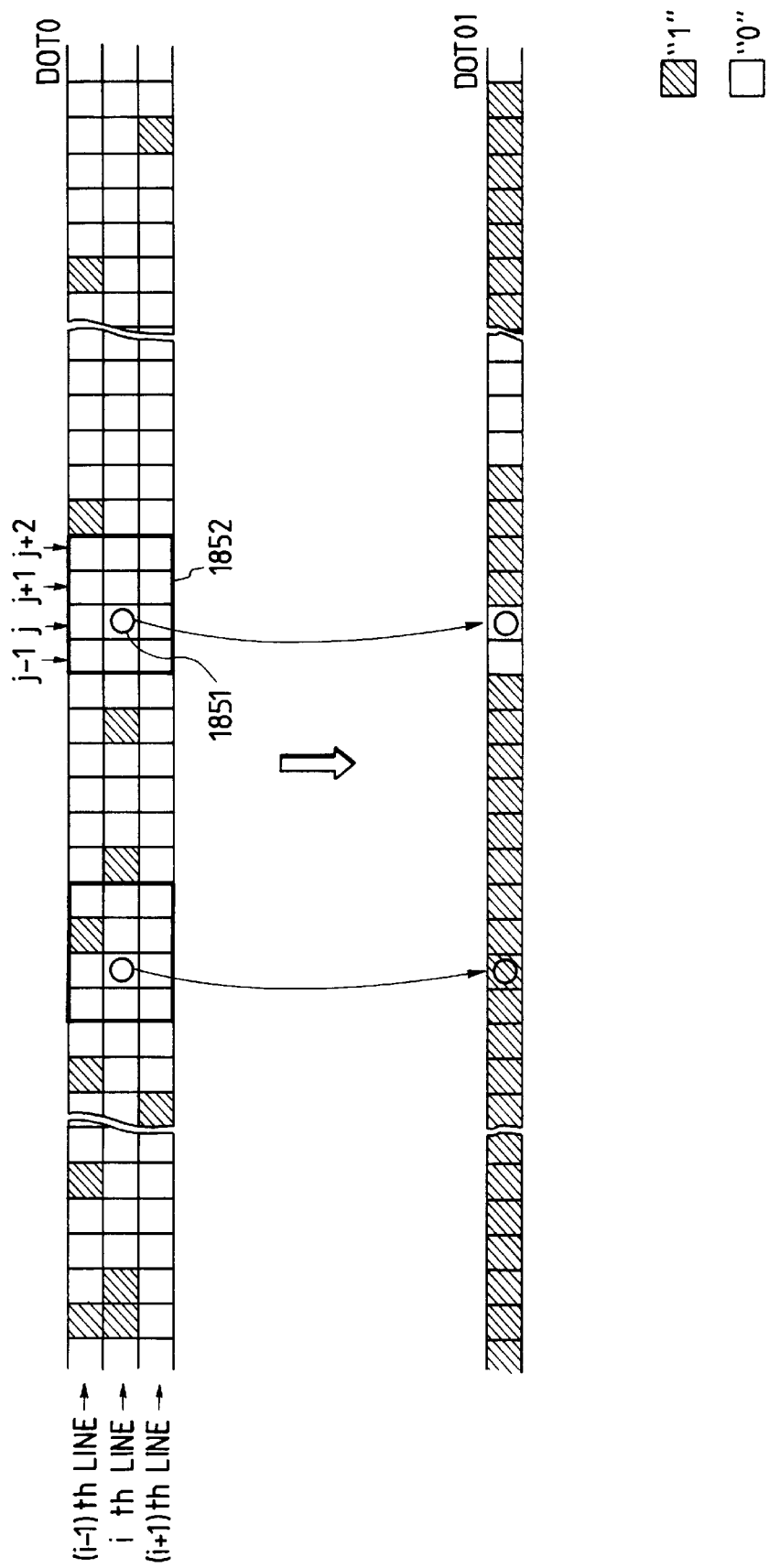
FIGS. 37 and 38 are views for explaining an operation of FIG. 36.
Figure 38:
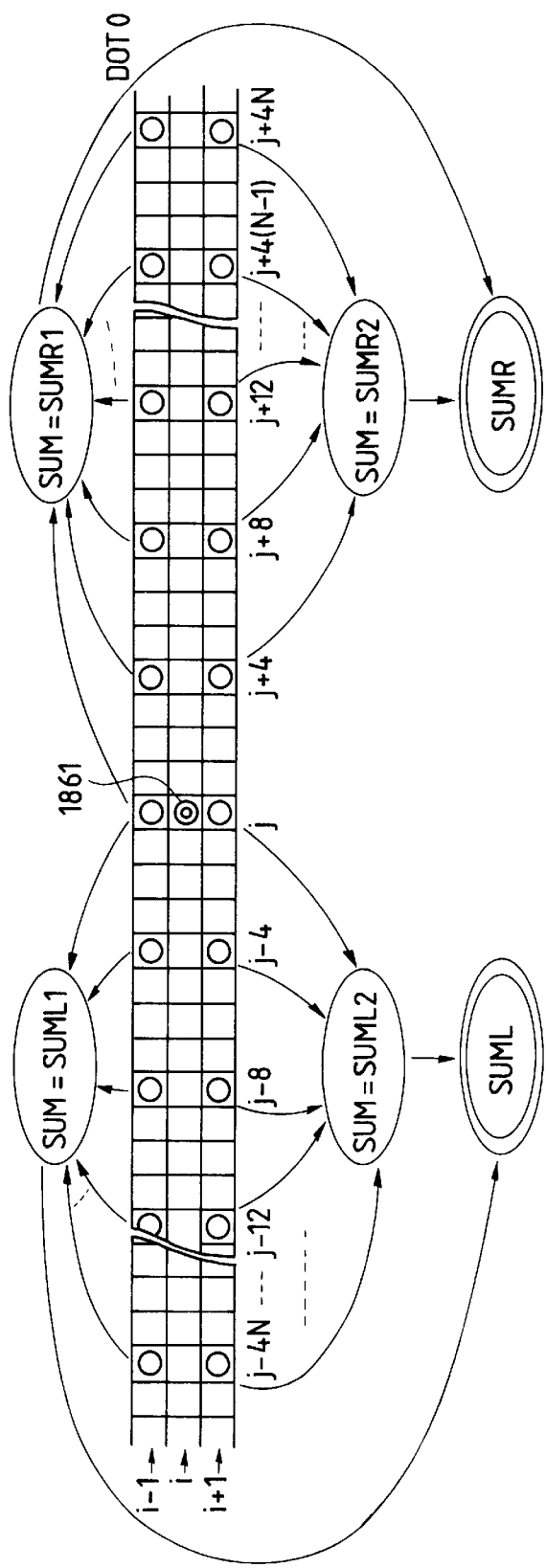

FIGS. 37 and 38 are views for explaining the operation of FIG. 36, and the same reference numerals in FIGS. 37 and 38 denote the same parts as in FIG. 36.

In FIG. 37, a hatched area indicates that a corresponding pixel is "1".

When the screen detection signals DOT0 of continuous three lines are output, they are logically ORed in a 3×4 window with respect to an objective pixel 1851, and the screen detection internal signals DOT01 are calculated by the judgement unit 1831.

With this processing, the screen detection signals DOT0 which are dispersely present in a screen image are converted to relatively continuous screen detection internal signals DOT01.

The line memories 18321 and 18322 shown in FIG. 36 fetch the screen detection internal signals DOT01 obtained in this manner. Thus, the screen detection internal signals DOT01 are sampled every fifth pixel in the main scanning direction and every other line in the sub-scanning direction with respect to an objective pixel 1861 (a j-th pixel in the main scanning direction in an i-th line in the sub-scanning direction). In an immediately preceding line ((i−1)th line), a sum SUML1 of pixels, for which screen detection internal signals DOT01 are "1", of jth, (j−4)th, (j−8)th, . . . , (j−4N)th pixels in the main scanning direction (where N is a proper integer), and a sum SUMR1 of pixels, for which screen detection internal signals DOT01 are "1", of jth, (j+4)th, (j+8)th, . . . , (j+4N)th pixels in the main scanning direction (where N is a proper integer), are output from the calculator 18323.

The screen detection internal signals DOT01 are sampled every fifth pixel in the main scanning direction and every other line in the sub-scanning direction with respect to the objective pixel 1861 (the jth pixel in the main scanning direction in the ith line in the sub-scanning direction). In the next line ((i+1)th line), a sum SUML2 of pixels, for which screen detection internal signals DOT01 are "1", of jth, (j−4)th, (j−8)th, . . . , (j−4N)th pixels in the main scanning direction (where N is a proper integer), and a sum SUMR2 of pixels, for which screen detection internal signals DOT01 are "1", of jth, (j+4)th, (j+8)th, . . . , (j+4N)th pixels in the main scanning direction (where N is a proper integer), are output from the calculator 18324.

Upon reception of these sums, the adder 18325 adds the sums SUML1 and SUML2, and outputs a sampling sum SUML of the screen detection internal signals DOT01 on the left side of the objective pixel 1861 to the comparator 18327.

On the other hand, the adder 18326 adds the sums SUMR1 and SUMR2, and outputs a sampling sum SUMR of the screen detection internal signals DOT01 on the right side of the objective pixel 1861 to the comparator 18328.

When the sampling sums SUMR and SUML are obtained in this manner, the comparators 18327 and 18328 compare the sums with the slice level $T_4$ set in the register 1830. When at least one of SUML>$T_4$ and SUMR>$T_4$ is established, i.e., in a screen area, the screen detection signal DOT1 goes to "1".

The operation of FIG. 24 will be described below with reference to FIG. 39.

Figure 39:
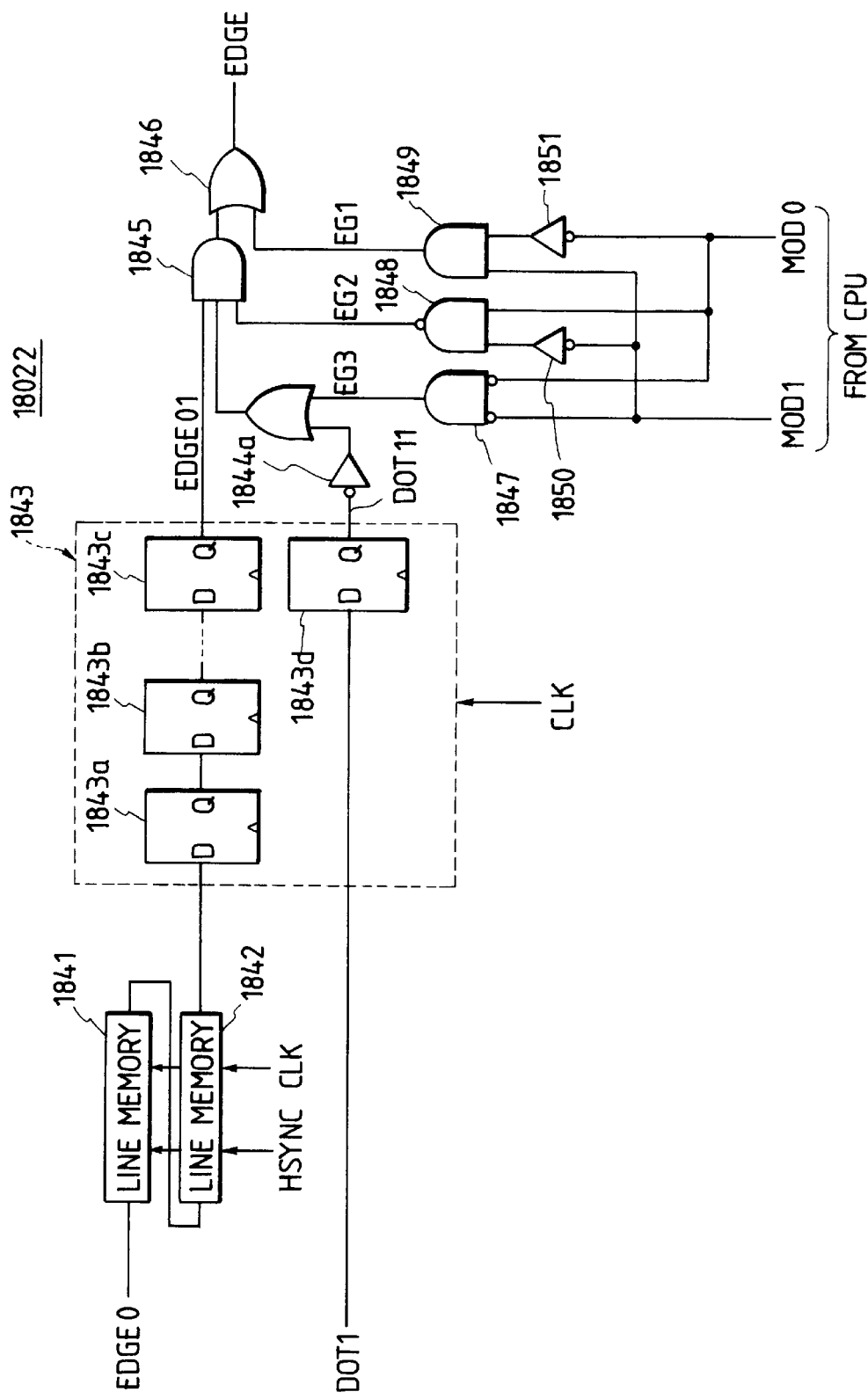
FIG. 39 is a circuit diagram for explaining an arrangement of the edge judgement unit shown in FIG. 24.

FIG. 39 is a circuit diagram for explaining the arrangement of the edge judgement unit 18022 shown in FIG. 24. Line memories 1841 and 1842 delay the edge detection signal EDGE0 in synchronism with the horizontal sync signal HSYNC to be synchronized with the screen detection signal DOT1 in the sub-scanning direction. Flip-flops 1843a to 1843d in a synchronization circuit 1843 synchronize the edge detection signal EDGE0 and the screen detection signal DOT1 in the main scanning direction. The circuit shown in FIG. 39 also includes inverters 1844, 1850, and 1851, a NAND gate 1848, AND gates 1845 and 1849, and OR gates 1846 and 1847. This circuit also receives the mode signals MOD0 and MOD1 output from the CPU 1871.

The edge judgement unit 18022 shown in FIG. 24 is arranged as described above. Edge control signals EG1 to EG3 for defining the relationship between the detected edge detection signal EDGE0 and screen detection signal DOT1 are determined according to the setup states of the mode signals MOD0 and MOD1, as will be described later, thus outputting a final area signal (edge signal) EDGE.

More specifically, in the character mode, since the mode signals MOD0 and MOD1 are controlled to set to "0" and "1", the edge control signal EG1 is always set to be "1", and the output from the OR gate 1846 always becomes "1". As a result, the area signal (edge signal) EDGE becomes "1".

In the photograph mode, since the mode signals MOD0 and MOD1 are controlled to be set to "1" and "0", both the edge control signals EG1 and EG2 become "0", and the area signal (edge signal) always becomes "0".

In the map mode, since the mode signals MOD0 and MOD1 are controlled to be set to "0" and "0", the edge control signals EG3 and EG2 are set to be "1" and the edge control signal EG1 is set to be "0". Therefore, the edge detection signal EDGE01 itself is output as the edge signal EDGE. For this reason, since the edge detection signal EDGE01 is output at every density change point regardless of the presence/absence of a screen area, a blank portion in dots such as a map can be clearly copied.

In the character/photograph mode, since the mode signals MOD0 and MOD1 are controlled to be set to "1" and "1", respectively, the edge control signals EG1 and EG3 are set to be "0", and the edge control signal EG2 is set to be "1". Therefore, the edge signal EDGE is obtained by logically ANDing the edge detection signal EDGE0 and an inverted signal of the screen detection signal DOT0.

Therefore, only when the edge detection signal EDGE01 is "1" and the screen detection internal signal DOT01 not for a screen area is "0" at each density change point, the edge signal EDGE goes to "1", thus separating a character edge area other than a screen area. In other words, when the edge signal EDGE is "1", i.e., when continuous changes in density are present and the screen detection internal signal DOT01 does not represent a screen area, a character edge is determined. Thus, the edge signal EDGE goes to "1" level according to an original.

Signal processing of the color signal processing unit 402 shown in FIG. 7 will be described below.

In the light amount signal-density signal conversion unit 103, the image signals 313 to 315 in a range of 0 to 255 are converted into density signals C, M, and Y in a range of 0 to 255 by the following equations (8):

$$C = -255 \cdot \log_{10}\left(\frac{R}{255}\right) / D_{max}$$
$$M = -255 \cdot \log_{10}\left(\frac{R}{255}\right) / D_{max}$$
$$Y = -255 \cdot \log_{10}\left(\frac{R}{255}\right) / D_{max}$$

(8)

Note that a density signal K serving as a black component included in the density signals C, M, and Y is determined by the black extraction unit 104 by the following equation (9):

$$K = \min(C, M, Y) \qquad (9)$$

The four color density signals C, M, Y, and K are subjected to undercolor removal processing in the masking processing unit 105, and are then subjected to calculations of equation (10) to remove color muddiness of the developing agents of the printer unit 202:

$$\begin{bmatrix} M1 \\ C1 \\ Y1 \\ K1 \end{bmatrix} = \begin{bmatrix} a_{11}, & a_{12}, & a_{13}, & a_{14}(1-U1) \\ a_{21}, & a_{22}, & a_{23}, & a_{24}(1-U2) \\ a_{31}, & a_{32}, & a_{33}, & a_{34}(1-U3) \\ a_{41}, & a_{42}, & a_{43}, & a_{44} \end{bmatrix} \begin{bmatrix} M \\ C \\ Y \\ K \end{bmatrix} \qquad (10)$$

Note that $a_{11}$ to $a_{14}$, $a_{21}$ to $a_{24}$, $a_{31}$ to $a_{34}$, and $a_{41}$ to $a_{44}$ are predetermined masking coefficients for removing color muddiness, and U1 to U3 are UCR coefficients for removing the K component from the M, C, and Y color components. One of the signals M1, C1, Y1, and K1 is selected by the phase signal PHASE (2-bit signal) output from the control unit 401, and the selected signal is output as a developing color signal V1.

The line delay memories 112 and 113 also delay the developing color signal V1 and the density signal M by three lines and four clocks as well as the character edge judgement signals from the feature extraction unit 403.

On the other hand, the color judgement unit 106 causes the line delay memory 120 to delay input signals by two clocks to generate a delayed black image analysis signal BL1, a delayed mixing analysis signal UNK1, a delayed color analysis signal COL1, and a delayed cancel signal CAN1 until judgement outputs such as the black image analysis signal BL, the mixing analysis signal UNK, and the like are generated.

Color judgement processing and character edge judgement processing for a letter "A" included in many originals will be described below with reference to FIGS. 40A to 40G.

FIGS. 40A to 40G are charts for explaining characteristics of the character judgement signals output from the feature extraction unit 403. FIGS. 40A to 40F show various judgement signal output states corresponding to a section a of a letter shown in FIG. 40G.

In particular, FIG. 40A shows a case wherein a black letter "A" is read as black. An achromatic density signal (density signal M2) is read not to be sharp as compared to FIG. 40G due to blurring of a read optical system. The edge signal EDGE is formed to be bulged from a character edge portion since it is expressed by continuous changes in density of the density change data AK3 and AK7. As a color judgement signal, only the delayed black image analysis signal BL1 is generated.

Since the density signal M2 and the edge signal EDGE are generated by employing a green color-separation signal, the same signals as the density signal M2 shown in FIG. 40A are output for letters shown in FIGS. 40B to 40F excluding a letter in green. For a letter in green, no density signal M2 is output.

FIG. 40B corresponds to judgement outputs when a letter "A" consisting of a color character is read. In this state, the delayed color analysis signal COL1 indicating that a color is present, and the delayed cancel signal CAN1 indicating that a color pixel having a density exceeding that of an objective pixel is present around the objective pixel are generated.

Furthermore, FIG. 40C corresponds to judgement outputs when a letter "A" consisting of a black character is read with color misregistration. In this state, the width of the delayed black image analysis signal BL1 becomes smaller than that in FIG. 40A, and the delayed intermediate saturation signal UNK1 due to color misregistration around the objective pixel is judged and output.

FIG. 40E shows a case wherein a color letter "A" is read with color misregistration. In this state, the width of the delayed color analysis signal COL1 becomes smaller than that in FIG. 40B, and the delayed intermediate saturation signal UNK1 is output for a character edge portion. The delayed cancel signal CAN1 is generated while the width a portion corresponding to the outer character edge portion is decreased since a portion judged as a color portion is decreased.

FIG. 40F corresponds to a case wherein a color letter approximate to an intermediate saturation is read with color misregistration, and a black judged pixel is generated at the edge portion.

In this case, substantially the same judgement signals as those in FIG. 40E are output except that the delayed black image analysis signal BL1 is generated in place of the delayed intermediate saturation signal UNK1.

FIGS. 41A to 41C are charts showing signal output characteristics of the respective units of the color signal processing unit 402 shown in FIG. 7, and correspond to judgement outputs of the section a of the letter "A" shown in FIGS. 40A to 40G.

FIG. 41A shows a case wherein a black character is read. The UCR (undercolor removal) processing is executed in the masking processing unit 105 shown in FIG. 7, and color components of the density signals Y, M, and C are decreased to 20%. However, FIG. 41A shows that this character is preferably recorded using a black toner since it is a black character.

FIG. 41B shows that color components of the density signals Y, M, and C are preferably decreased as much as possible for an intermediate saturation pixel generated at a black character edge portion shown in FIG. 40D.

FIG. 41C shows that the K component is preferably decreased for an intermediate saturation generated at a color character edge portion shown in FIG. 40E.

With these characteristics, a black component generated at a color character edge shown in FIG. 40F must be distinguished from a black character shown in FIG. 40A.

Thus, as shown in FIG. 42, predetermined calculations (to be described in detail later) of a color recording signal V2 with the density signal M2 are executed on the basis of the edge signal EDGE, the delayed black image analysis signal BL1, the delayed mixing analysis signal UNK1, the delayed color analysis signal COL1, the delayed cancel signal CAN1, the phase signal PHASE, and the like, thus obtaining an image signal V4.

FIG. 42 is a view for explaining calculation processing examples of the adder 116 in the color signal processing unit 402 shown in FIG. 7, and (a) to (h) in FIG. 42 show calculation examples.

When the edge signal EDGE, the delayed black image signal BL1, the delayed mixing analysis signal UNK1, the delayed color analysis signal COL1, and the delayed color cancel signal CAN1 output the illustrated values iike in the calculation example (a) and developing colors are magenta, cyan, and yellow, the image signal V4 goes to "0" level; when the developing color is black (Bk), the color recording signal V2 itself is output as the image signal V4.

When the delayed cancel signal CAN1 is "1" like in the calculation examples (b), (d), and (g) and the developing colors are magenta, cyan, and yellow, the image signal V4 becomes the "color recording signal V2"; when the developing color is black (Bk), the color recording signal V2 itself is output as the image signal V4.

The calculation example (c) corresponds to an intermediate saturation edge as shown in FIGS. 40C and 40E. In this example, in order to emphasize the black components at the edge portion, when the developing colors are magenta, cyan, and yellow, a 50% color recording signal V2 is output as the image signal V4; when the developing color is black (Bk), a sum of a 50% image signal V2 and a 50% density signal M2 is output by the adder 116 (to be described later).

The calculation example (f) corresponds to a calculation of a non-edge portion of a black character shown in FIG. 40A. In this example, in order to improve a connection between signals with the edge portion recorded in a single color, when the developing colors are magenta, cyan, and yellow, the image signal V4 which is reduced to ¾ of the color recording signal V2 is output by the adder 116; when the developing color is black (Bk), the image signal V4 as a sum of a signal obtained by reducing the color reducing signal V2 to ¾ and a signal obtained by reducing the density signal M2 to ¼ is output by the adder 116.

This will be described in more detail with reference to FIGS. 41A to 41C and FIG. 42. In the following description, V2(M) corresponds to a density signal when the phase signal PHASE=0 (corresponding to magenta). Similarly, V2(C) corresponds to a density signal when the phase signal PHASE=1 (corresponding to cyan). Similarly, V2(Y) corresponds to a density signal when the phase signal PHASE=2 (corresponding to yellow). Similarly, V2(Bk) corresponds to a density signal when the phase signal PHASE=3 (corresponding to black).

ⓑ in FIG. 41A represents a black character portion, and is an edge portion corresponding to the calculation example (a) in FIG. 42. In this case, the color recording signal V2 becomes "0", and the density signal M2 is output as the image signal V4.

ⓒ in FIG. 41A is a black non-edge portion corresponding to the calculation example (f) in FIG. 42. The image signals V4(Y), V4(M), and V4(C) when the developing colors are magenta, cyan, and yellow are respectively given by the recording image signals V2(Y)×¾, V2(M)×¾, and V2(C)×¾; when the developing color is black (Bk), the image signal V4 as a sum of the recording signals V2(Y)×¾, V2(M)×¾, and V2(C)×¾, and the color recording signal V2(Bk) is output.

ⓓ in FIG. 41B represents an edge portion corresponding to the calculation example (c) shown in FIG. 42. When the developing colors are magenta, cyan, and yellow, the image signals V4(Y), V4(M), and V4(C) are respectively given by the recording image signals V2(Y)×½, V2(M)×½, and V2(C)×½; when the developing color is black (Bk), the image signal V4 as a sum of the recording image signals V2(Y)×½, V2(M)×½, and V2(C)×½ and the color recording signal V2(Bk)×½ is output.

ⓔ in FIG. 41C represents a portion where an intermediate saturation occurs at an edge portion of a black character. This portion is processed in the same manner as for the edge portion ⓓ in FIG. 41B. A non-edge portion is processed by black judgement in the same manner as the portion ⓒ in FIG. 41A, thus decreasing a color signal of the color character edge portion.

The above-mentioned calculations are executed by the multiplier 114 and the adder 116 shown in FIG. 7. The multiplier 114 and the adder 116 execute the above-mentioned calculations for the image recording signal V2 and the density signal M2 on the basis of multiplication coefficient signals GAIN1 and GAIN2 determined by the edge signal EDGE, the delayed black image analysis signal BL1, the delayed mixing analysis signal UNK1, the delayed color analysis signal COL1, and the delayed cancel signal CAN1 (judgement signals).

Figures 43, 44:
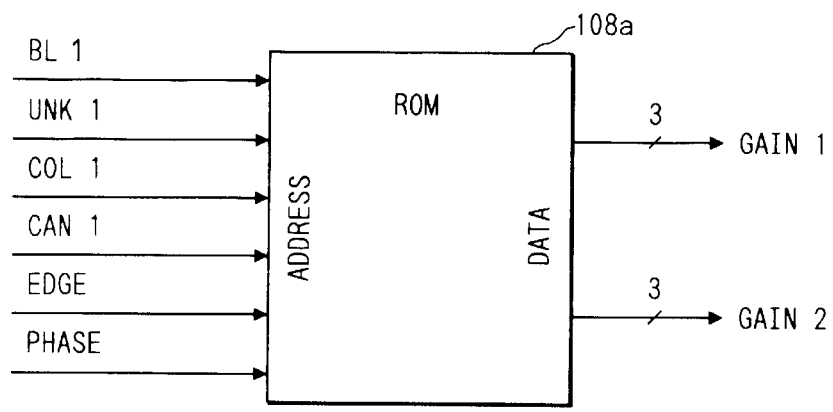
FIG. 43 is a block diagram for explaining an arrangement of a multiplication coefficient generation unit shown in FIG. 7.
FIG. 44 shows a data table for explaining an operation of FIG. 43.

FIG. 43 is a block diagram for explaining an arrangement of the multiplication coefficient generation unit 108 shown in FIG. 7. A ROM 108a outputs two 3-bit multiplication coefficient signals GAIN1 and GAIN2 using a data table shown in FIG. 44 which is addressed by the 5-bit judgement signals EDGE, BL1, UNK1, COL1, and CAN1, and the 2-bit phase signal PHASE. Note that the two multiplication coefficient signals GAIN1 and GAIN2 are four times actual gains, and are multiplied with ¼ by the multipliers 114 and 115 shown in FIG. 45, thus obtaining desired calculation outputs.

Figure 45:
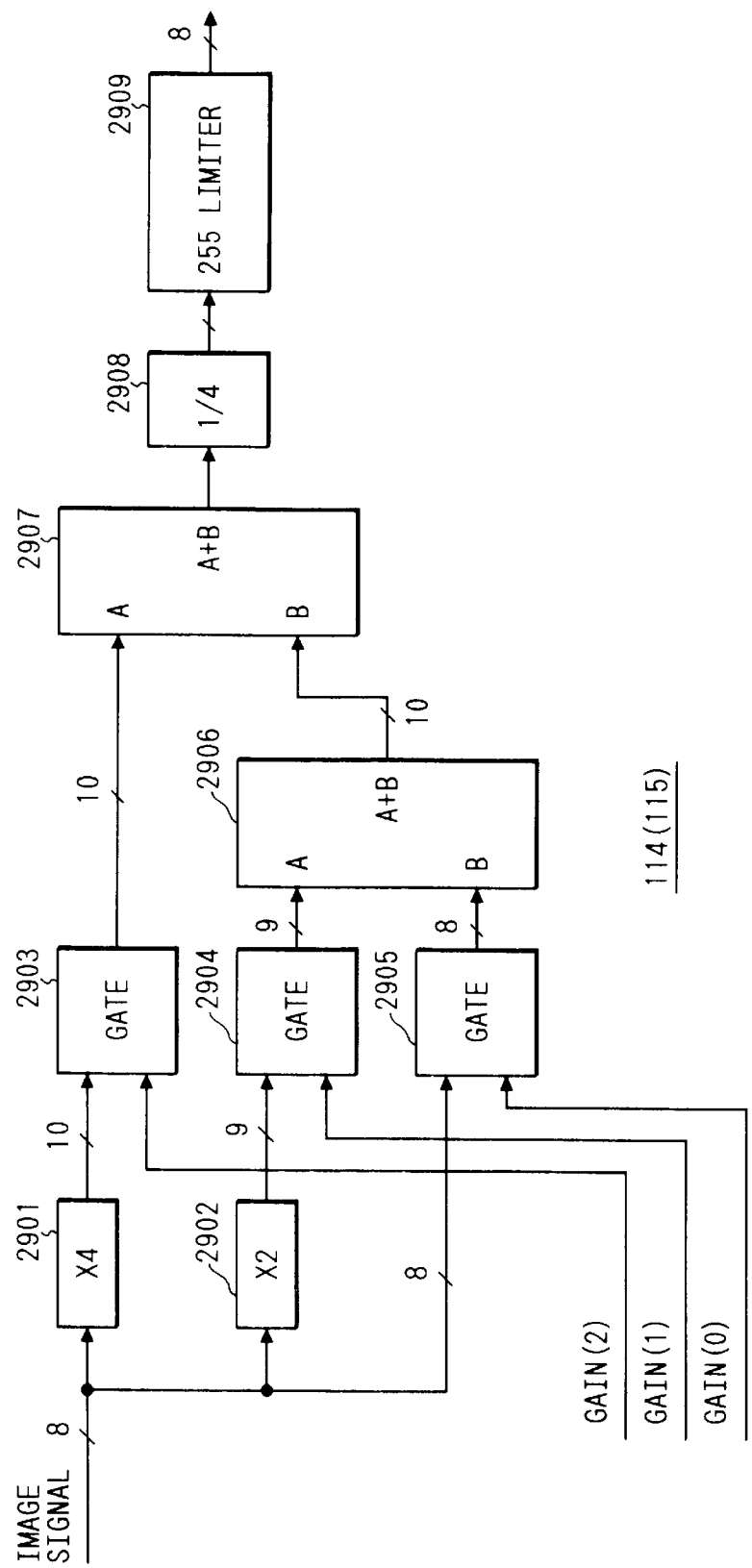
FIG. 45 is a block diagram for explaining a detailed arrangement of a multiplier shown in FIG. 7.

FIG. 45 is a block diagram for explaining a detailed arrangement of the multipliers 114 and 115 shown in FIG. 7. The arrangement and operation of these multipliers will be described below.

An 8-bit image signal is multiplied with 4 and 2 by bit-shift type multipliers 2901 and 2902, respectively, and the 8-bit image signal and the multiplied signals are selected by gates 2903 to 2905 in response to 3-bit gain signals GAIN(2), GAIN(1), and GAIN(0). The selected signals are then added by adders 2906 and 2907. Thereafter, the sum signal is multiplied with ¼ by a bit-shift type divider 2908. Thereafter, 9-bit data exceeding "255" is rounded to 8-bit data within a range of 255 by a 255 limiter 2909, thereby outputting the image signal V4.

As described above, the color recording signal V2 and the density signal M2 weighted by the color judgement signals and the character edge judgement signals are input to the filter circuit 117 serving as a spatial filter.

Figure 46:
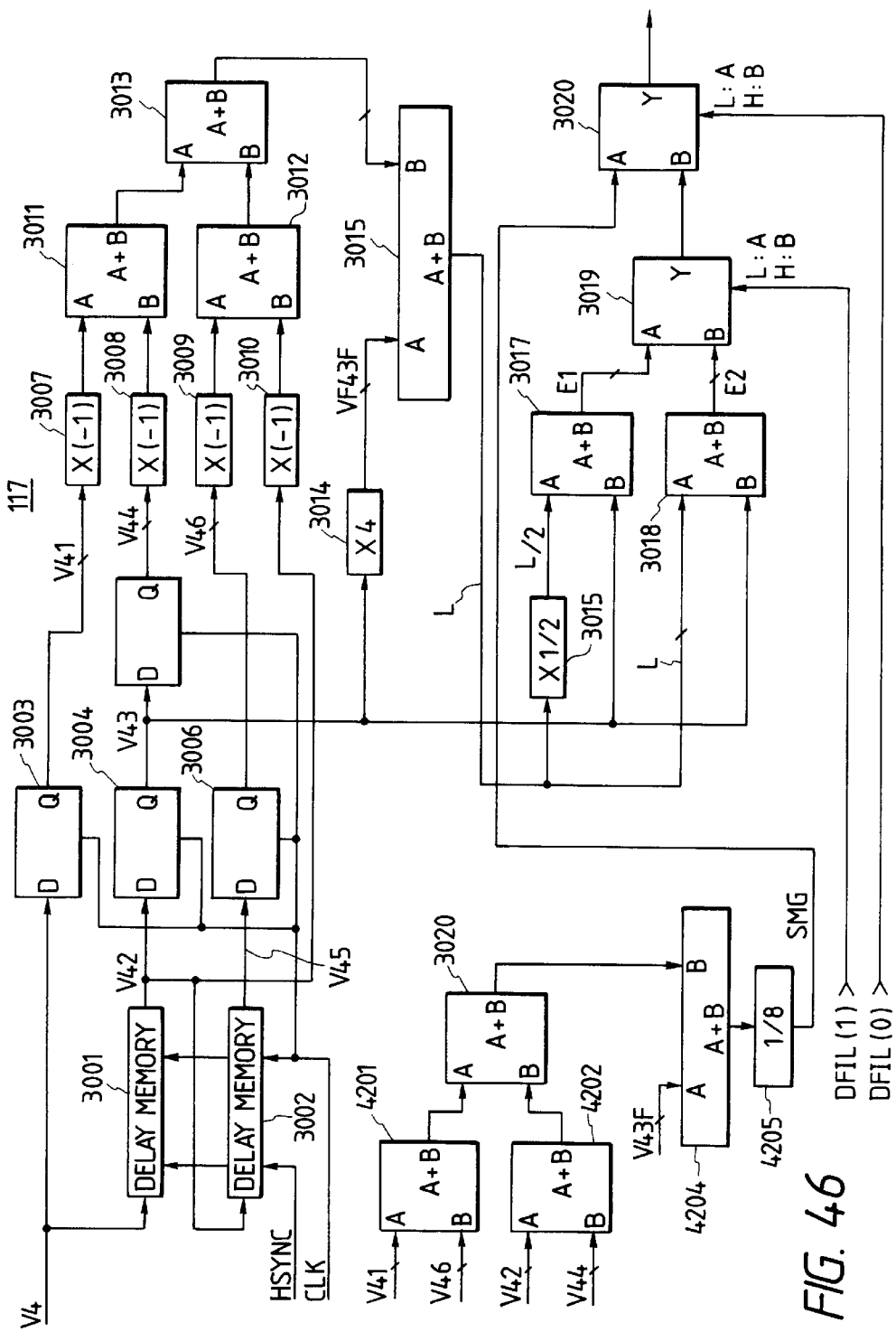
FIG. 46 is a block diagram for explaining a detailed arrangement of a filter circuit shown in FIG. 7.

FIG. 46 is a circuit diagram for explaining a detailed arrangement of the filter circuit 117 shown in FIG. 7. FIG. 46 exemplifies a case wherein the filter circuit 117 comprises an emphasis filter employing a 3×3 (pixel) Laplacian filter. The Laplacian multipliers can be switched between ½ and 1.

The arrangement and operation of the filter circuit 117 will be described below.

Image signals V4, V42, and V45 of three lines generated by line memories 3001 and 3002 are delayed by one clock each by flip-flops 3003 to 3006. In this case, an objective pixel corresponds to a pixel signal V43. Pixel signals V41, V42, V44, and V46 are multiplied with "−1" by multipliers 3007 to 3010 to constitute a Laplacian filter, and are added by adders 3011, 3012, and 3013. A signal V43F obtained by multiplying 4 with the pixel signal V43 as the objective pixel by a multiplier 3014 is added to the sum output from the adder 3013 by an adder 3015, thus generating Laplacian output L.

The Laplacian output L is multiplied with ½ by a multiplier 3016. An adder 3017 adds the objective pixel signal V43 and L/2 to generate a low-level edge emphasis signal E1. An adder 3018 adds the pixel signal V43 and the Laplacian output L to generate a high-level edge emphasis signal E2. The two edge-emphasized signals and the pixel signal V43 as the objective pixel itself are selected in accordance with control signals DFIL(1) and DFIL(0), thereby outputting an image signal V5. Note that when the control signal DFIL(1) is "0" and the control signal DFIL(0) is "1", the low-level edge emphasis signal E1 is selected; when the control signal DFIL(1) is "1" and the control signal DFIL(0) is "1", the high-level edge emphasis signal E2 is selected. When the control signal DFIL(0) is "0", the pixel signal V43 which is not edge-emphasized is selected by selectors 3019 and 3020, and is output as the image signal V5.

The control signals DFIL(1) and DFIL(0) are output from the filter control signal generation unit 109 (to be described later).

In this embodiment, a black character edge portion is edge-emphasized at high level to obtain a sharp black character edge.

A non-character edge portion is not edge-emphasized to prevent a change in color by edge emphasis. Intermediate saturation and color-character edge portions are low-level edge-emphasized so that a sharp edge portion can be recorded, and a change in color by edge emphasis is not so conspicuous.

When the judgement signal CAN1 is "1", no edge emphasis is executed since the judgement signals BL1 and UNK1 are generated by color misregistration at a color character edge portion.

The arrangement and operation of the filter control signal generation unit 109 will be described below with reference to FIGS. 47 and 48.

Figure 47:
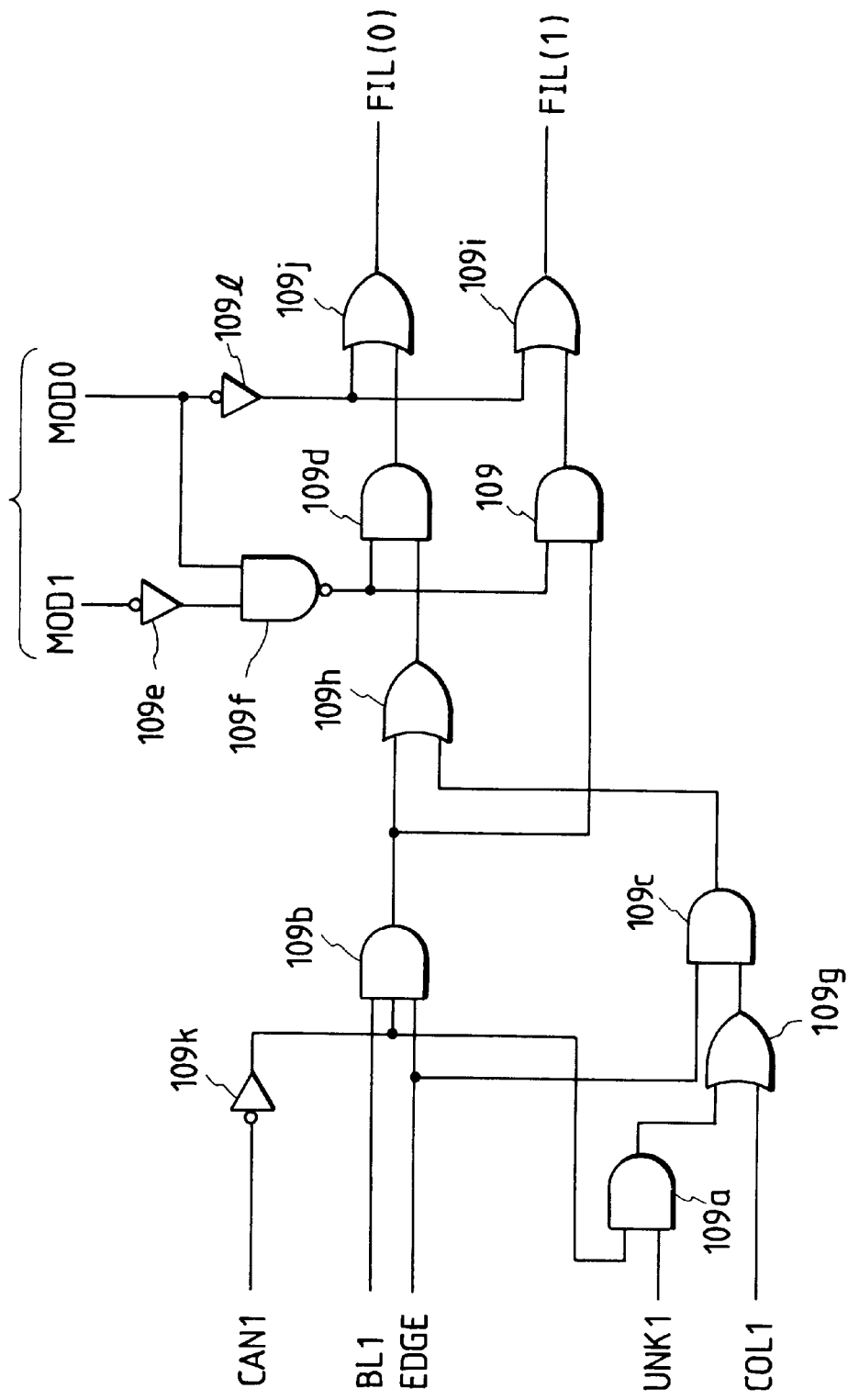
FIG. 47 is a block diagram for explaining a detailed arrangement of a filter control signal generation unit shown in FIG. 7.

FIG. 47 is a circuit diagram for explaining a detailed arrangement of the filter control signal generation unit 109 shown in FIG. 7. The unit 109 includes AND gates 109a to 109e, a NAND gate 109f, OR gates 109g to 109j, and inverters 109k to 109m.

Figures 48, 49:
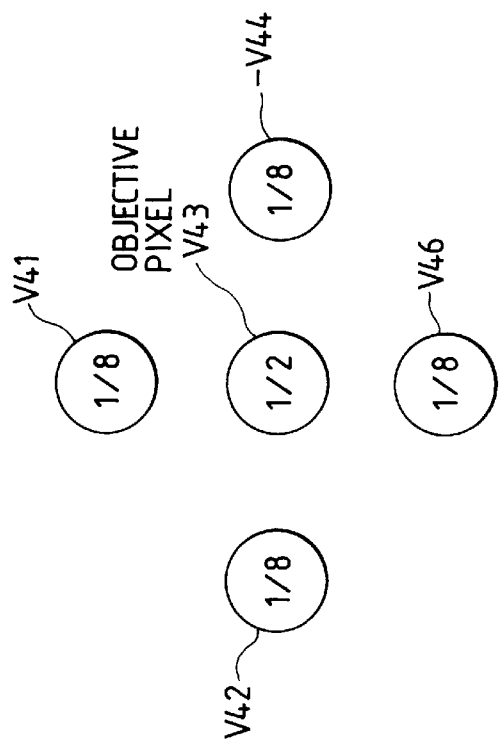
FIG. 48 is a table for explaining the relationship between a control signal output from the filter control signal generation unit shown in FIG. 47 and filter processing.
FIG. 49 is a view for explaining smoothing filter processing in the image reading apparatus according to the present invention.

FIG. 48 is a view for explaining the relationship between the control signals DFIL(1) and DFIL(0) output from the filter control signal generation unit 109 and filter processing. When the character/photograph mode is set as shown in (a) in FIG. 48, the filter processing is executed while the mode signals MOD0 and MOD1 are switched according to an image area to change the control signals DFIL(1) and DFIL(0), thereby executing corresponding low-level edge processing.

When the character or photograph mode is set as shown in (b) in FIG. 48, both the control signals DFIL(1) and DFIL(0) go to "1", and high-level edge processing is performed on the entire copy surface.

Furthermore, in the photograph mode shown in (c) in FIG. 48, the control signals DFIL(1) and DFIL(0) go to "0", and smoothing processing is performed on the entire copy.

In the character/photograph mode in the above embodiment, an area which is judged as an edge by the character edge judgement unit 107 includes a halftone area (screen area) 1903 shown in FIG. 26. When such a screen original is read by the 3-line sensor 210 in units of pixels, the regularity of a charge-coupled device (CCD) constituting the 3-line sensor 210 and the regularity of the screen original cause moiré stripes. In order to prevent this, in this embodiment, for an original area which is not judged as a character edge (an area having a high possibility of a screen portion), the filter circuit 117 multiplies ½ with the pixel signal V43 representing an objective pixel, and multiplies ⅛ with the remaining four adjacent pixel signals V41, V42, V44, and V46 by a smoothing filter shown in, e.g., FIG. 49, thereby generating a smoothing signal (smoothing filter signal) SMG.

More specifically, in FIG. 46, adders 4201 to 4204 add four pixel signals V41, V42, V44, and V46 around the objective pixel, and add the sum signal to a pixel signal V43F obtained by multiplying 4 with the pixel signal V43 as the objective pixel. The obtained sum signal is then multiplied with ⅛ by a bit-shift type divider 4205 to obtain the smoothing signal (smoothing filter signal) SMG.

In the filter circuit 117, since the objective pixel is delayed by one line and one clock, control signals FIL(1) and FIL(0) from the filter control signal generation unit 109 are delayed by one line and one clock by the line memory 121, and are then input to the filter circuit 117 as the delayed filter switching signals DFIL(1) and DFIL(0).

The arrangement and operation of the gamma conversion unit 118 shown in FIG. 7 will be described below with reference to FIGS. 50 and 51.

Figure 50:
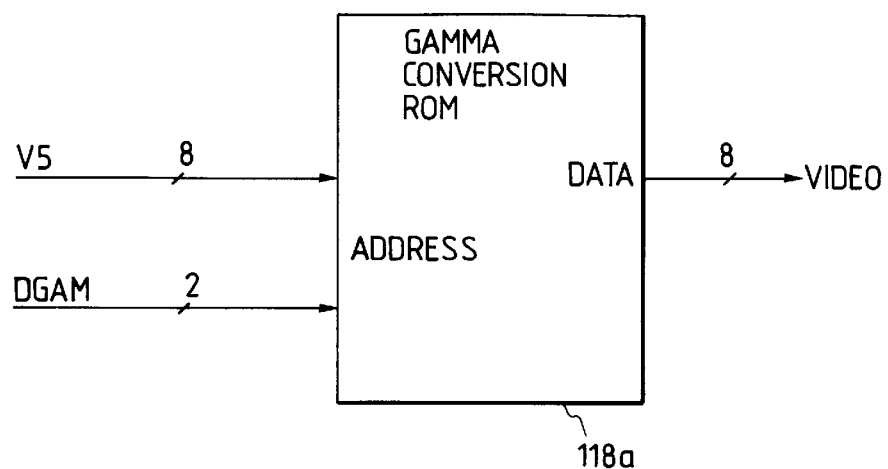
FIG. 50 is a block diagram for explaining an arrangement of a gamma conversion unit shown in FIG. 7.

FIG. 50 is a block diagram for explaining an arrangement of the gamma conversion unit 118 shown in FIG. 7.

In FIG. 50, a gamma conversion ROM 108a is addressed by the image signal V5 and a delayed selection control signal DGAM to output, e.g., an 8-bit video signal VIDEO to the PWM modulation unit 119 of the printer unit 202.

Figure 51:
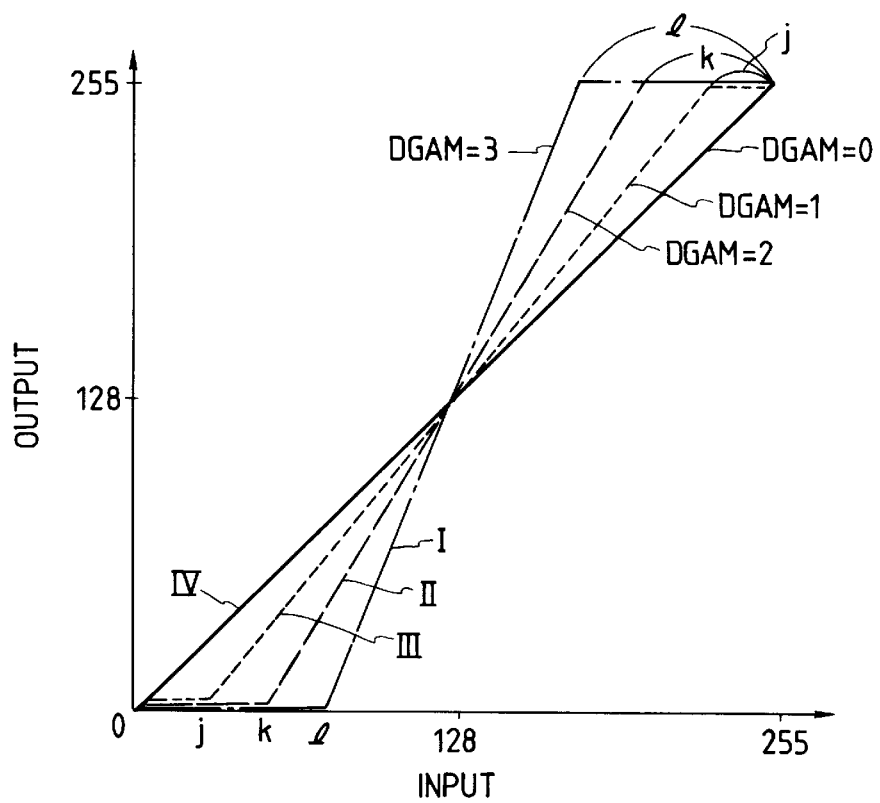
FIG. 51 is a graph for explaining gamma conversion characteristics in the image reading apparatus according to the present invention.

More specifically, four gamma conversion characteristics I to IV shown in FIG. 51 are selected according to the content of the delayed selection control signal DGAM. For example, when the delayed selection control signal DGAM is "0", gamma conversion characteristics I is selected to a non-character edge portion.

When the delayed selection control signal DGAM is "1" (in the case of color character edge detection), conversion characteristics wherein outputs of "0" and "255" are generated in response to inputs corresponding to an interval j on both the "0" and "255" sides within a range of "0" to "255", and are connected by a straight line having an inclination of 255/(255-2j) are selected (gamma conversion characteristics II). In this case, the gamma conversion ROM 118a outputs a lower-density video signal VIDEO in response to an input near "0" as a low-density input, outputs a high-density video signal VIDEO in response to an input near "255" as a high-density input, and outputs a higher-density video signal VIDEO in response to an input near "128" as an intermediate density, so that a change in density of the input near "128" as the intermediate density is emphasized to be able to record a sharp character edge.

When the delayed selection control signal DGAM is "2" (in the case of intermediate saturation character edge detection), gamma conversion characteristics III are selected. In this case, an interval k larger than the interval j employed when the delayed selection control signal DGAM is "1" is set, thus recording a sharp character edge. However, since the linearity between inputs and outputs tends to be unbalanced, color tones cannot be guaranteed. Thus, these characteristics are selected upon recording of the intermediate saturation character edge.

When the delayed selection control signal DGAM is "3", gamma conversion characteristics IV having a larger interval l than the interval k are selected, and are applied to a black character edge which is required to be sharp.

The delayed selection control signal DGAM serving as the gamma conversion characteristic switching signal is generated by the gamma switching signal generation unit 110 shown in FIG. 52 (to be described later) and is delayed by one line and one clock by the delay memory 121.

Figures 52, 53:
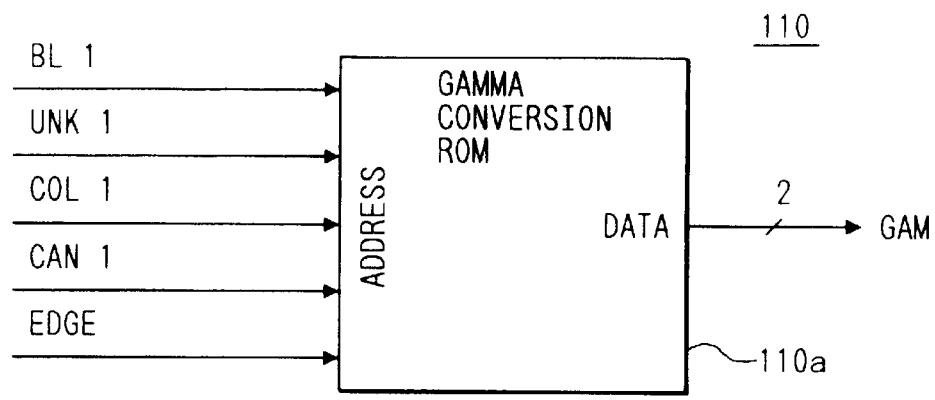
FIG. 52 is a block diagram for explaining an arrangement of a gamma switching signal generation unit shown in FIG. 7.
FIG. 53 is a view for explaining functional processing of the gamma switching signal generation unit shown in FIG. 52.

FIG. 52 is a block diagram for explaining an arrangement of the gamma switching signal generation unit 110 shown in FIG. 7. A gamma switching conversion ROM 110a is addressed by the 5-bit judgement signals EDGE, BL1, UNK1, COL1, CAN1, and the edge signal EDGE to output a selection control signal GAM to the delay memory 121 when the relation shown in, e.g., FIG. 53 is satisfied.

For example, when a black character edge portion is detected (edge signal EDGE="1" and judgement signal BL1="1"), the selection control signal GAM becomes "3". When an intermediate saturation character edge portion is detected (edge signal EDGE="1" and judgement signal UNK="1"), the selection control signal GAM becomes "2". In either case, when the judgement signal CAN1 indicating that the judgement signal BL1 is set to be "1" or the judgement signal UNK1 is set due to color misregistration is "1", the selection control signal GAM becomes "0" not to emphasize a character edge.

The arrangement of the PWM modulation unit 119 shown in FIG. 7 will be described below with reference to FIGS. 54 and 55.

Figure 54:
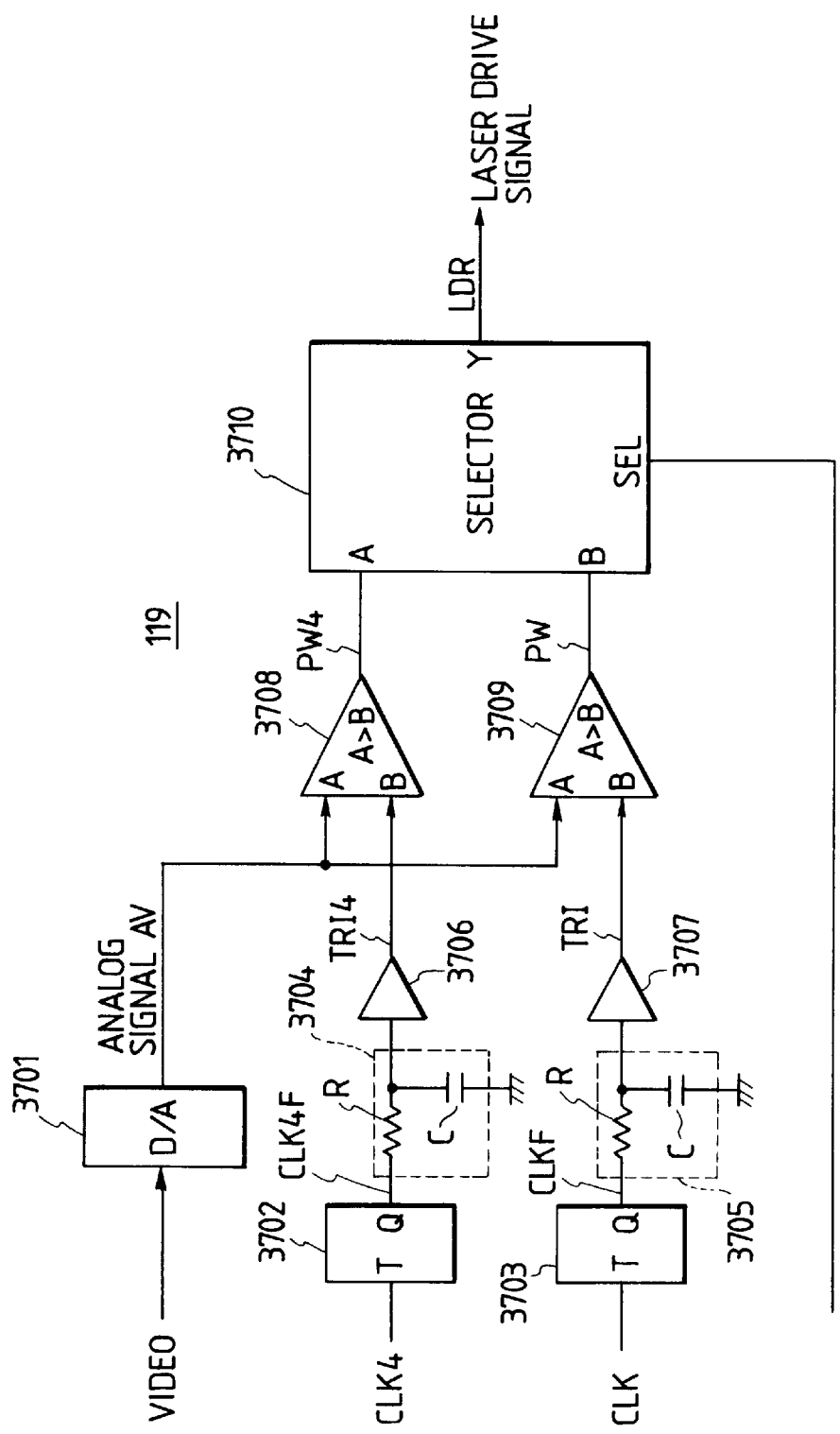
FIG. 54 is a circuit diagram for explaining a detailed arrangement of a PWM modulation unit shown in FIG. 7.
Figure 55:
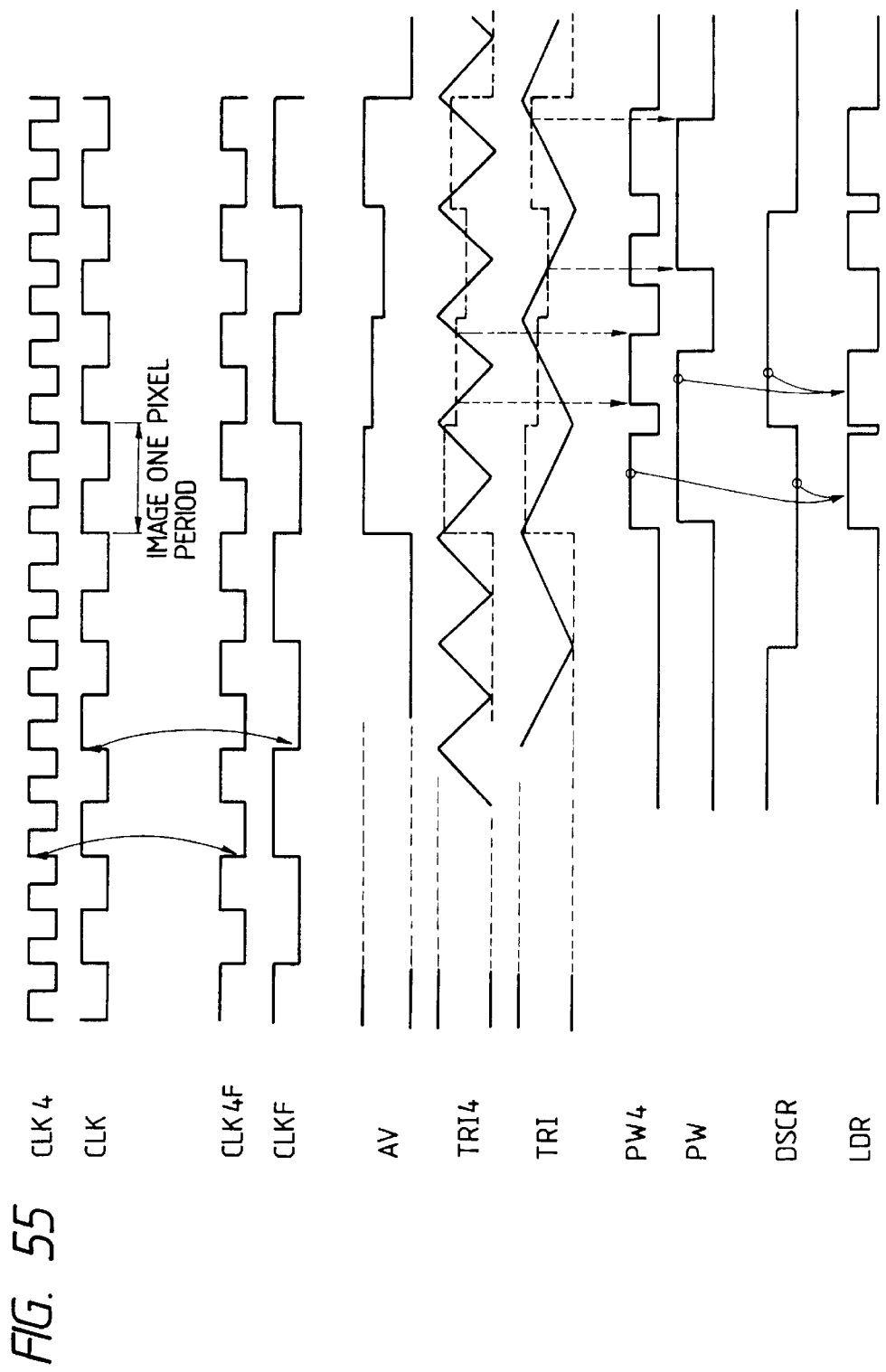
FIG. 55 is a timing chart for explaining an operation of FIG. 54.

FIG. 54 is a circuit diagram for explaining a detailed arrangement of the PWM modulation unit 119 shown in FIG. 7, and FIG. 55 is a timing chart for explaining the operation of FIG. 54.

The arrangement and operation will be described below.

The video signal VIDEO is converted into an analog video signal AV by a D/A converter 3701, and the analog signal is then input to comparators 3708 and 3709. The pixel clock CLK synchronous with the video signal VIDEO and a screen clock CLK4 having a frequency twice that of the clock CLK are frequency-divided with ½ by toggle flip-flops 3702 and 3703 in synchronism with the horizontal sync signal HSYNC to be converted into the pixel clock CLK and the screen clock CLK4 having a duty ratio of 50%. The pixel clock CLK and the screen clock CLK4 are converted to triangular waves by integrators 3704 and 3705 each comprising a resistor R and a capacitor C. The peaks of these triangular waves are adjusted to an output dynamic range of an A/D converter by amplifiers 3706 and 3707. The adjusted triangular waves are compared with the analog video signal AV by analog comparators 3708 and 3709, respectively. In this manner, the analog video signal AV is converted to two PWM signals PW4 and PW. Thereafter, one of the PWM signals PW4 and PW is selected by a selector 3710 in accordance with the delayed screen control signal DSCR output from the delay memory 121. The selected signal is input to a drive circuit of a laser unit (not shown) as a laser drive signal LDR.

More specifically, a triangular wave TRI4 obtained by integrating a clock CLK4F obtained by frequency-dividing the screen clock CLK4 with ½ is a triangular wave for one pixel period of an image.

Since the triangular wave TRI4 is substantially realistically changed over the entire output range of the D/A converter 3701, the triangular wave TRI4 is compared to the analog video signal AV, so that the analog video signal AV is PWM-modulated to the PWM signal PW4 to have one pixel interval of an image as one period.

Similarly, since a triangular wave TRI is formed by a clock CLKF obtained by frequency-dividing the pixel clock CLK with ½, the analog video signal AV is PWM-modulated to the PWM signal PW based on the triangular wave TRI to have two pixel intervals of an image as one period.

In this manner, the PWM signal PW4 PWM-modulated by one pixel period is recorded by a printer at the same resolution as the pixel clock CLK. However, when image recording is performed using the PWM signal PW4, sufficient gray scale level expression cannot be obtained due to the feature of the electrostatic photographic process used in the printer since a basic density unit is as small as one pixel.

In contrast to this, since the PWM signal PW reproduces a density in units of two pixels, sufficient gray scale level expression can be obtained. However, a recording resolution is half that of the PWM signal PW4.

In this embodiment, the PWM signals PW4 and PW are selected by the delayed screen control signal DSCR according to a kind of image, thereby switching the PWM signals PW4 and PW in units of pixels.

More specifically, for a black character edge, an intermediate saturation character edge portion, and its non-edge portion, the PWM signal PW4 is selected to place an importance on resolution. For a color character edge portion and its non-edge portion, the PWM signal PW is selected to place an importance on color tone. However, it is experimentally demonstrated that in an original consisting of fine color characters like a map, the PWM signal PW4 which places an importance on resolution is preferably selected for a color character edge while sacrificing color tone.

The delayed screen control signal DSCR is generated based on a screen control signal SCR output from the screen switching signal generation unit 111 shown in FIG. 7. The arrangement and operation of the screen switching signal generation unit 111 shown in FIG. 7 will be described below with reference to FIG. 56.

Figure 56:
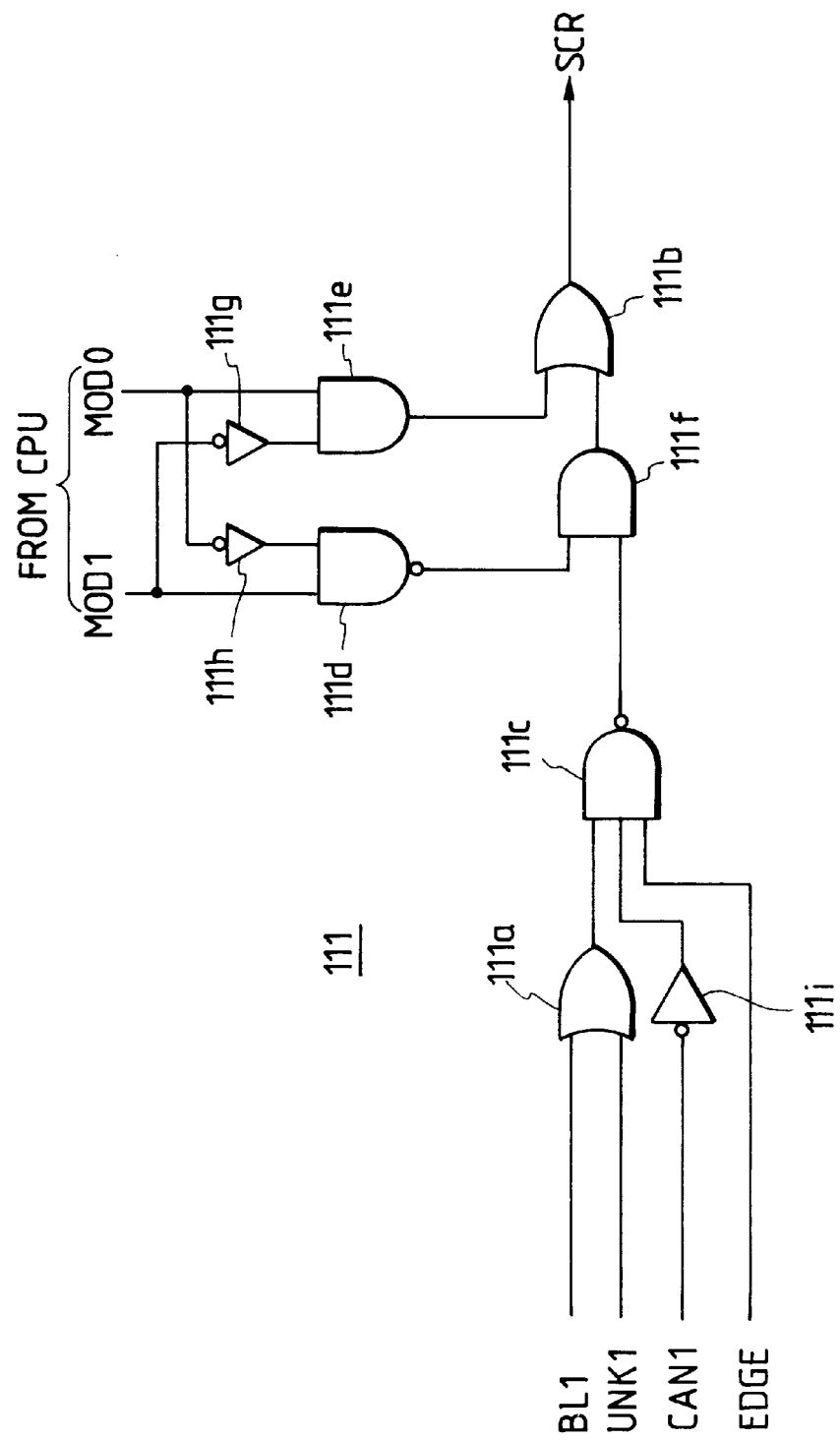
FIG. 56 is a circuit diagram for explaining an arrangement of a screen switching signal generation unit shown in FIG. 7.

FIG. 56 is a circuit diagram for explaining an arrangement of the screen switching signal generation unit 111 shown in FIG. 7. This unit includes OR gates 111a and 111b, NAND gates 111c and 111d, an AND gate 111f, and inverters 111g to 111i.

As can be seen from FIG. 56, when the judgement signals EDGE, BL1, UNK1, COL1, and CAN1 are gated and a judgement output is output from the NAND gate 111c to the AND gate 111f, the screen control signal SCR is set to be "1" or "0" according to the mode signals MOD0 and MOD1 input to one input terminal of the AND gate 111f.

More specifically, in the character mode, the mode signals MOD0 and MOD1 become "0" and "1", respectively, and the screen control signal always becomes "0", thus selecting the PWM signal PW4.

In the photograph mode, the mode signals MOD0 and MOD1 become "1" and "0", respectively, and the screen control signal SCR always becomes "1", thus selecting the PWM signal PW.

Furthermore, in the character/photograph mode or the map mode, since the mode signals MOD0 and MOD1 become "1" and "1" or "0" and "0", respectively, and when a black character area is detected, i.e., when the judgement signal BL1 is "1", the PWM signal PW4 is selected; otherwise, the PWM signal PW is selected.

In this manner, the delayed screen control signal DSCR shown in FIG. 55 goes to LOW level for a portion to be developed with a black toner in a black or intermediate saturation character edge portion, and during this period, the PWM signal PW4 is output as the laser drive signal LDR. In this case, for a character edge portion suffering from color misregistration (judgement signal CAN1="1") even if it is judged as a character edge portion, the PWM signal PW4 is not selected to prevent degradation of quality of a recording image due to emphasized color misregistration.

More specifically, a black character edge requires a sharp character edge, but a color character edge places an importance on reproduction of colors of an original.

In a black character edge portion, there are no M, C, and Y toners, as shown in FIG. 41A. In addition, there is no black toner by the function of the masking processing unit 105. In an intermediate saturation character edge portion, there are black, yellow, magenta, and cyan toners to some extent, as shown in FIG. 41B.

In this embodiment, the character edge portion 107 can be used with the PWM signal PW4 having one pixel period only when a black toner is used.

Thus, the sharpness of a black character edge which contains less color components can be realized like in the first embodiment. For a color character edge containing a small number of color components, only a black component can be sharply recorded, and gray scale levels of color components can be assured, thus guaranteeing color reproducibility.

In the above embodiment, the screen control signal SCR is obtained by gating the judgement signals EDGE, BL1, UNK1, COL1, and CAN1 by the screen switching signal generation unit 111. The phase signal PHASE output from the control unit 401 may be gated to decode that a developing color is black, thereby outputting the screen control signal SCR.

In the above embodiment, for an original which includes both characters and a photograph, priority reproduction kind setting keys 4214a and 4214b serving as overemphasis setting means may be arranged to be able to select a degree of clearly copying characters or faithfully copying a photograph. A character priority mode in a photograph mode or a photograph priority mode in a photograph mode may be set stepwise to analyze a set degree of overemphasis. Detection conditions are varied together with the slice levels $T_1$ to $T_3$ shown in FIG. 30 to select reproduction directivity of character or photograph in a photograph original.

Figure 57:
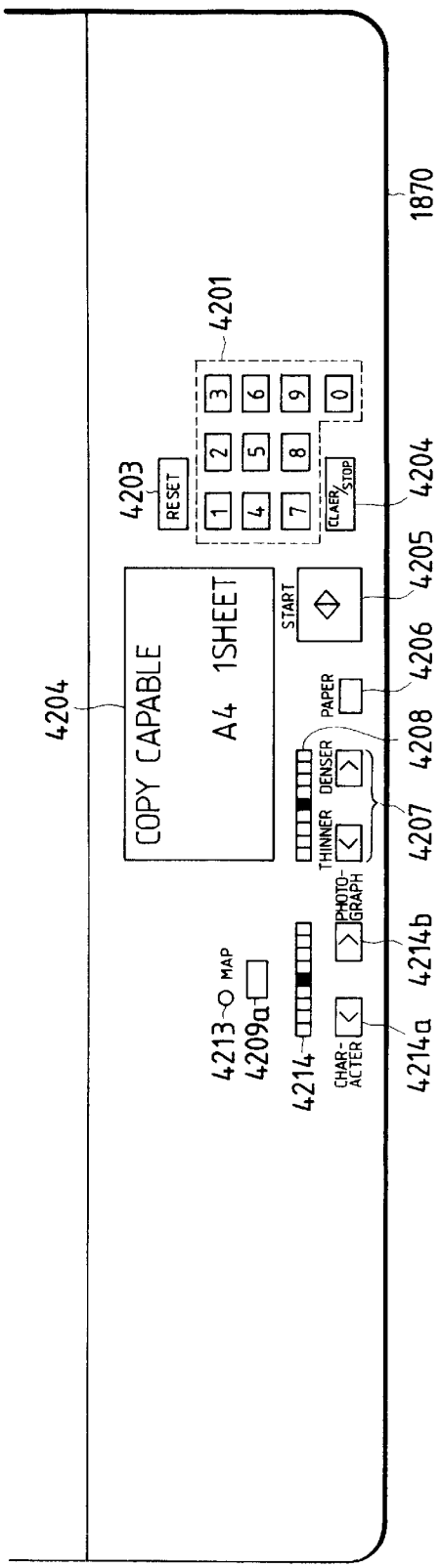
FIG. 57 is a plan view for explaining an arrangement of an operation unit in an image reading apparatus according to another embodiment of the present invention.

FIG. 57 is a plan view for explaining an operation unit of an image reading apparatus according to another embodiment of the present invention. A reproduction directivity indicator 4214 comprises, e.g., LEDs. Upon depression of the priority reproduction kind setting keys 4214a and 4214b, the indicator 4214 indicates the selected degree of overemphasis.

When the leftmost LED of the reproduction directivity indicator 4214 is turned on upon operation of the priority reproduction kind setting keys 4214a and 4214b, the "character most priority mode" is determined, and read image signals are processed like in the character mode of the above embodiment.

When the rightmost LED of the reproduction directivity indicator 4214 is turned on upon operation of the priority reproduction kind setting keys 4214a and 4214b, the "photograph mode priority model", is determined, and read image signals are processed like in the photograph mode of the above embodiment.

Upon depression of a map mode setting key 4209a, a mode indicator 4213 is turned on to indicate that the "map mode" is selected.

When an original read mode characteristic set by a mode setting means, e.g., the map mode setting key 4209a is overemphasized in a character priority read mode or a photograph priority read mode by the priority reproduction kind setting key 4214a as the overemphasis setting means, a condition setting means (CPU 1871 in this embodiment) varies at least one judgement condition of the first to third detection means according to the degree of overemphasis of the mode characteristics overemphasized by the priority reproduction kind setting key 4214a, so that characters or a photograph can be faithfully separated with good selectivity from an original including both characters and a photograph.

When the map mode setting key 4209a is depressed, the "map mode" is set; otherwise, read image signals are judged in the same manner as in the character/photograph mode in the above embodiment. In this embodiment, the directivity of overemphasis of the mode by the priority reproduction kind setting key 4214a is judged, and detection conditions are varied with the slice levels $T_1$ to $T_3$ shown in FIG. 30 according to the degree of overemphasis, so that reproduction directivity of characters or a photograph in a photograph original can be selected. In particular, as the degree of photograph overemphasis is higher, the values of the slice levels $T_1$ to $T_3$ are increased to eliminate a judgement error caused by noise in a photograph.

As described above, an apparatus according to this embodiment comprises a mode setting means for setting and inputting a plurality of original read modes corresponding to kinds of original, a first detection means for detecting a continuous change in density while analyzing an image signal based on a first judgement condition, a second detection means for detecting a change in density in a specific direction while analyzing the image signal based on a second judgement condition setting means for varying the first judgement condition for the first detection means and the second judgement condition for the second detection means according to an original read mode input from the mode setting means, and a character area separation processing means for separating a character edge area from the image signal on the basis of the first and second judgement conditions set by the condition setting means. Thus, judgement conditions for faithfully identifying and judging elements to be reproduced from various originals can be varied depending on original read modes, so that optimal judgement conditions for a desired original can be set. Therefore, a kind judgement error of a read image signal can be prevented with high precision, and a video signal to be subjected to faithful image reproduction processing can be generated.

In addition, the apparatus also comprises a third detection means for detecting an achromatic color portion while analyzing color image signals output from an image sensor by color separation on the basis of a third judgement condition, and a second character area separation processing means for separating an achromatic color character edge area from the color image signals on the basis of detection results of the first to third detection means. Thus, a color character can be faithfully separated from a color image original, and a kind judgement error of a read color image signal can be prevented with high precision, thus generating a video signal to be subjected to faithful color image reproduction processing.

Furthermore, the apparatus also comprises an overemphasis setting means for continuously overemphasizing an original read mode characteristic set by the mode setting means to be a character or photograph priority read mode characteristic, and a condition setting means for continuously varying a judgement condition of at least one of the first to third detection means according to a degree of overemphasis of the mode characteristic overemphasized by the overemphasis setting means. When an original image including both a photograph and characters is to be reproduced, directivity for an importance on a kind of original to be reproduced can be desirably selected. Therefore, an image signal which can realistically or faithfully reproduce a photograph or characters from an original including both a photograph and characters can be supplied to a host apparatus such as a printer.

The apparatus comprises a mode setting means for setting and inputting a plurality of original read modes corresponding to kinds of original, a conversion means for comparing density levels of surrounding pixels including an objective pixel of an image signal with a judgement density level to convert an image signal into a predetermined density signal, a judgement level varying means for varying the judgement density level on the basis of the original read mode set by the mode setting means, and a character area separation processing means for separating a character edge area from an image signal on the basis of the predetermined density level signal output from the conversion means according to the judgement density level varied by the judgement level varying means. Thus, the conversion reference of the density level of the read image signal can be varied according to the original read mode, and a judgement error of characters and dots can be greatly reduced, thus generating an image signal which can faithfully reproduce an original image.

The judgement level varying means varies the judgement density level so that a detection ratio of high-density level pixel vs. low-density level pixel is set in a low-density pixel priority mode. Therefore, a low-density original can be detected with very high sensitivity, and read pixels can be reliably judged as a character edge.

The conversion means converts the density levels of surrounding pixels including the objective pixel of the image signal into the predetermined density level signal on the basis of a conversion look-up table. Therefore, an input image signal can be converted into a desired density level signal at high speed with a very simple arrangement.

The conversion means converts the density levels of surrounding pixels including the objective pixel of a color image signal into the predetermined density level signal on the basis of a conversion look-up table. A character original can be reliably separated and detected from a halftone original, in particular, an intermediate saturation original, and an image signal which can reliably reproduce a desired color character and a color screen image can be generated.

Note that an input means for inputting an image may comprise an external equipment such as an interface for inputting an image from a computer or an image developed according to a command from a computer, a still video camera, a video camera, and the like, or a reception unit of a communication line, or the like in addition to an image scanner for reading an original image.

The map mode need only be a mode for processing an image which includes both a screen portion and characters regardless of its name.

The printer unit 202 may comprise a color ink-jet printer, a color thermal transfer printer, a color dot printer, and the like in addition to the color laser beam printer. In particular, the present invention can be applied to a printer having a head for causing film boiling by heat energy to inject liquid droplets, as disclosed in U.S. Pat. Nos. 4,723,129 and 4,740,793.

What is claimed is:

1. An image processing apparatus comprising:
   a) input means for inputting an image signal;
   b) detection means for detecting a feature of an input image on the basis of the image signal; and
   c) setting means for setting a detection mode of said detection means,
   wherein the detection mode includes at least a first detection mode for detecting an edge portion surrounded by a screen portion and a second detection mode for detecting an edge portion surrounded by a halftone portion, and
   wherein said setting means guides the setting of the first detection mode and the second detection mode.

2. An apparatus according to claim 1, wherein the feature is an edge of an image.

3. An apparatus according to claim 1, wherein the feature is a screen portion of an image.

4. An apparatus according to claim 1, wherein said detection means includes first detection means for detecting an edge of the image according to continuity of a rapid change in density of the image signal.

5. An apparatus according to claim 4, wherein said detection means includes second detection means for detecting a screen portion of the image according to a change in density in a specific direction of the image signal.

6. An apparatus according to claim 5, further comprising processing means for processing the image signal according to a detection result of said detection means and performing image reproduction.

7. An apparatus according to claim 6, wherein said processing means comprises judgement means for judging a black line image portion of the image.

8. An apparatus according to claim 7, wherein said processing means reproduces the black line image using only a black recording agent.

9. An apparatus according to claim 1, wherein said setting means comprises manual key input means.

10. An image processing method comprising:
    a) inputting an image signal;
    b) detecting a feature of an input image on the basis of the image signal; and
    c) setting a detection mode in said detecting step,
    wherein the detection mode includes at least a first detection mode for detecting an edge portion surrounded by a screen portion and a second mode for detecting an edge portion surrounded by a halftone, and
    wherein said setting step guides the setting of the first detection mode and the second detection mode.

11. A method according to claim 10, wherein the feature is an edge of an image.

12. A method according to claim 10, wherein the feature is a screen portion of an image.

13. A method according to claim 10, wherein said detecting step includes a first detection step for detecting an edge of the image according to continuity of a rapid change in density of the image signal.

14. A method according to claim 13, wherein said detecting step includes a second detection step for detecting a screen portion of the image according to a change in density in a specific direction of the image signal.

15. A method according to claim 14, further comprising a processing step for processing the image signal according to a detection result of said detecting step and performing image reproduction.

16. A method according to claim 15, wherein said processing step comprises a judgement step for judging a black line image portion of the image.

17. A method according to claim 16, wherein said processing step reproduces the black line image using only a black recording agent.

18. A method according to claim 10, wherein said setting step comprises a step of using manual key input means.

* * * * *

UNITED STATES PATENT AND TRADEMARK OFFICE
CERTIFICATE OF CORRECTION

PATENT NO. : 6,192,152 B1
DATED : February 20, 2001
INVENTOR(S) : Masahiro Funada et al.

It is certified that error appears in the above-identified patent and that said Letters Patent is hereby corrected as shown below:

Title page,
Item [63], Related U.S. Application Data, "continuation-in-part" should read -- continuation --.

Drawings,
Sheet 18, Figure 25, "REARISTICALLY" should read -- REALISTICALLY --.

Column 1,
Line 3, "contniuation-in-part" should read -- continuation --.

Column 7,
Line 35, "PWM-modulates" should read -- PWM modulates --.

Column 12,
Line 66, MIN ≤ W" should read -- MIN ≤ WMN --.

Column 13,
Line 48, "NAX" should read -- MAX --.

Column 23,
Line 47, "dispersely" should read -- dispersedly --.

Column 26,
Line 42, "width" should read -- width of --.

Column 27,
Line 3, "iike" should read -- like --.

UNITED STATES PATENT AND TRADEMARK OFFICE
CERTIFICATE OF CORRECTION

PATENT NO.    : 6,192,152 B1
DATED         : February 20, 2001
INVENTOR(S)   : Masahiro Funada et al.

It is certified that error appears in the above-identified patent and that said Letters Patent is hereby corrected as shown below:

<u>Column 31,</u>
Line 32, "is" should read -- to be --; and
Line 33, "not" should read -- so as not --.

Signed and Sealed this

Twenty-third Day of April, 2002

Attest:

JAMES E. ROGAN
*Attesting Officer*     *Director of the United States Patent and Trademark Office*